US007092552B2

(12) United States Patent
Harrington et al.

(10) Patent No.: US 7,092,552 B2
(45) Date of Patent: *Aug. 15, 2006

(54) SYSTEM AND METHOD FOR MEASURING AND QUANTIZING DOCUMENT QUALITY

(75) Inventors: Steven J. Harrington, Webster, NY (US); Jose Fernando Naveda, Henrietta, NY (US); Rhys Price Jones, Rochester, NY (US); Nathan Sarr, Rochester, NY (US); Nishant Atul Thakkar, Rochester, MN (US); Paul G. Roetling, Grand Island, NY (US)

(73) Assignee: Xerox Corporation, Stamford, CT (US)

( * ) Notice: Subject to any disclaimer, the term of this patent is extended or adjusted under 35 U.S.C. 154(b) by 41 days.

This patent is subject to a terminal disclaimer.

(21) Appl. No.: 10/881,157

(22) Filed: Jun. 30, 2004

(65) Prior Publication Data
US 2005/0028075 A1    Feb. 3, 2005

Related U.S. Application Data

(60) Provisional application No. 60/491,042, filed on Jul. 30, 2003, provisional application No. 60/491,043, filed on Jul. 30, 2003.

(51) Int. Cl.
*G06K 9/00* (2006.01)
(52) U.S. Cl. .................................... 382/112; 382/286
(58) Field of Classification Search ................ 382/112, 382/292, 317; 715/518, 519, 542
See application file for complete search history.

(56) References Cited

U.S. PATENT DOCUMENTS 5,018,207 A *  5/1991  Purdum .................... 382/1
5,424,945 A *  6/1995  Bell ......................... 364/419.2
5,600,732 A     2/1997  Ott et al. .................. 382/112
5,687,250 A    11/1997  Curley et al. ............. 382/112
5,963,641 A    10/1999  Crandall et al. ........... 380/2
6,345,130 B1   2/2002   Dahl ........................ 382/286

(Continued)

FOREIGN PATENT DOCUMENTS

EP          0986270 A2     3/2000

(Continued)

OTHER PUBLICATIONS

Engledrum, Peter G.; Image Quality Modeling: Where Are We; IS&T's 1999 PIC Convference; pp. 251-255; Imcotek; Winchester, MA 01890; pge@imotek.com.

(Continued)

*Primary Examiner*—Andrew W. Johns
(74) *Attorney, Agent, or Firm*—Basch & Nickerson LLP; Michael J. Nickerson

(57) ABSTRACT

Text, images, and/or graphics of electronic documents should be organized and laid out in a two-dimensional format for presentation to the viewer. The best such layout depends upon the content present, the creator's intent, the output device, and the viewer's interests. To analyze the qualitative nature of the layout in quantifiable terms, the electronic document is measure using various quantifiable factors; such as, balance, uniformity, white space management, alignment, consistency, legibility, etc.; that impact a qualitative nature of a document. Such quantifiable factors are then used to quantize the aesthetics, ease of use, eye-catching ability, interest, communicability, comfort, and convenience of the document.

18 Claims, 43 Drawing Sheets

U.S. PATENT DOCUMENTS

| | | | |
|---|---|---|---|
| 6,571,000 B1 * | 5/2003 | Rasmussen et al. | 382/112 |
| 6,671,405 B1 * | 12/2003 | Savakis et al. | 382/203 |
| 6,748,097 B1 | 6/2004 | Gindele et al. | 382/112 |
| 6,795,580 B1 * | 9/2004 | Janko et al. | 382/199 |
| 2005/0028074 A1 | 2/2005 | Harrington et al. | 715/500 |
| 2005/0028076 A1 | 2/2005 | Harrington et al. | 715/500 |
| 2005/0028096 A1 | 2/2005 | Harrington et al. | 715/530 |
| 2005/0028097 A1 | 2/2005 | Harrington et al. | 715/530 |
| 2005/0028098 A1 | 2/2005 | Harrington et al. | 715/530 |
| 2005/0028099 A1 | 2/2005 | Harrington et al. | 715/530 |

FOREIGN PATENT DOCUMENTS

| | | |
|---|---|---|
| EP | 1109132 A2 | 6/2001 |
| EP | 1168245 A2 | 1/2002 |

OTHER PUBLICATIONS

Govindaraju, V.; Srihari, S.; Assessment of Image Quality to Predict Readability of Documents; SPIE vol. 2660; pp. 333-342; State University of New York at Buffalo; Buffalo, NY 14260; (govlnd, srihari)@cedar.buffalo.edu.

Shin, H.; Dalal, E.; Rasmussen, R.; Predicting Customer Preference from Objective Image Quality Metrics for Monochrome Document Products; SPIE vol. 5294 ©2004; pp. 155-164; Xerox Corporation, Webster, NY, USA

* cited by examiner

FIG. 60
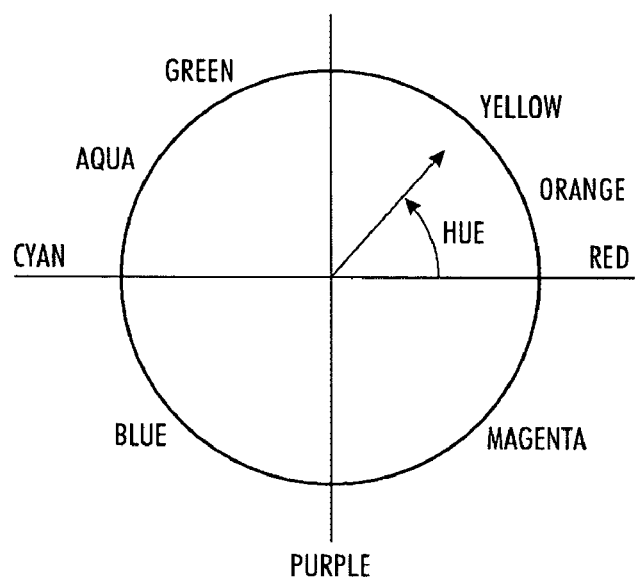
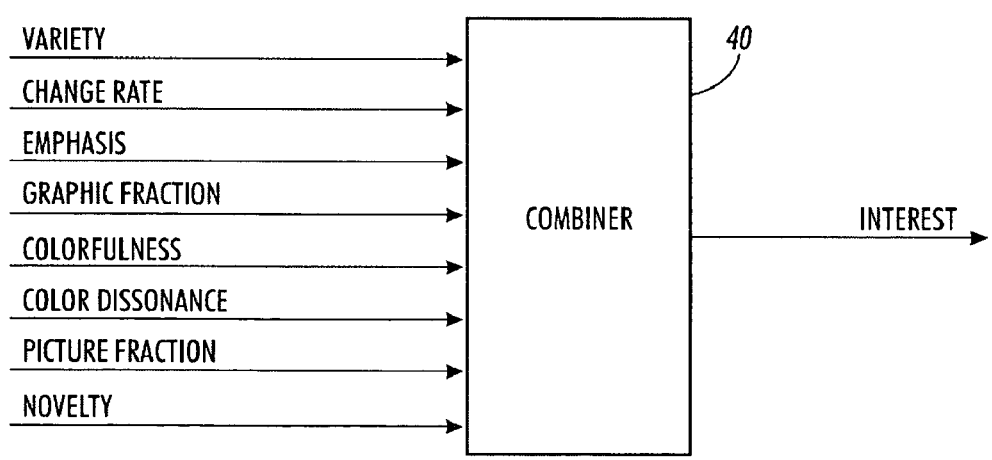
FIG. 61

FIG. 87

SYSTEM AND METHOD FOR MEASURING AND QUANTIZING DOCUMENT QUALITY

PRIORITY INFORMATION

This application claims priority under 35 U.S.C. §119(e) from U.S. Provisional Patent Application, Ser. No. 60/491,043, filed on Jul. 30, 2003, and from U.S. Provisional Patent Application, Ser. No. 60/491,042, filed on Jul. 30, 2003. The entire contents of U.S. Provisional Patent Application, Ser. No. 60/491,043, and U.S. Provisional Patent Application, Ser. No. 60/491,042, are hereby incorporated by reference.

FIELD OF THE PRESENT INVENTION

The present invention generally relates to the field of document layout, design, and analysis and, more particularly, to methods which is quantitatively measure a document's quality based on characteristics inherent in the document itself.

BACKGROUND OF THE PRESENT INVENTION

When documents are created, many decisions must be made as to style, content, layout, and the like. The text, images, and graphics must be organized and laid out in a two-dimensional format with the intention of providing a presentation to the viewer which will capture and preferably maintain their attention for the time sufficient to get the intended message across. Different style options are available for the various content elements and choices must be made. The best choices for style and layout depend upon content, intent, viewer interests, etc. In order to tell if a set of choices made as to the look and feel of the final version of the document were good or bad, one might request feedback from a set of viewers after viewing the document and compile the feedback into something meaningful from which the document's creators or developers can make alterations, changes, or other improvements. This cycle repeats until the document's owners are satisfied that the final version achieves the intended result.

Factors that contribute to the quality and effectiveness of layout and style decisions for a document are the handling of groups of content elements as style and layout choices affect groups of content. A group is a collection of content elements. Group membership is a property of the logical structure of the document. The neighborhood of groups can be considered a layout property. While layout structure often matches the logical structure, there is no requirement that it do so.

Preferably, one would like to have a quantitative measure of various value properties of the document (measures of the document "goodness") based on properties inherent in the document itself. In this manner the document itself provides a level of quantitative feedback. For instance, one property that developer's would like to be able to measure would be how easy it is to use a document. A measure for the ease of use of a document can be used in evaluating or making document design decisions.

One aspect of the ease of use of a document is one's ability to tell which elements belong to a group and which do not. The style and layout decisions that are made in the presentation of a document can affect the degree of group identity that it conveys. In evaluating a document's design for its ease of use, it is useful to have a measure of the degree of group identity. Considerations for ease-of-use with respect to groups include spatial coherence, spatial separation, alignment separation, heading separation, background separation, and/or style separation. Measures for various characteristics of content, feature, and the like could be weighted by intent, relevance, and other parameters and these could then be combined to obtain one or more overall measures for the document itself. If one had a method for evaluating properties inherent in the document itself then such a measure could be used during the document development process to help determine optimal presentation.

An aspect of the ease of use of a document is its searchability. Searchability can be defined as the degree to which the document structurally supports the finding of a desired content element. A document with high searchability provides aids that help in finding desired content. In general, a document with high searchability measure is easier to use because it is easy to locate the portion of the document containing the information of interest.

Another aspect of a document's ease of use is the document's degree of distinguishability. The distinguishability of content can be defined as the ability to identify one particular content element from another content element within the document. Distinguishability is important in establishing the context for the information disclosed by the element. It can reduce confusion about what that element is and to what group or setting it belongs. It can also aid in locating a desired element. The distinguishability of the document elements is therefore a contributing factor to the ease of use of the document.

Another property that would be desirable to be able to quantitatively measure is the ability of the document to hold the viewer's attention and interest. Wile much of the document's ease of use depends upon the actual content and its relevance to the viewer, there can also be a contribution from the style with which that content is presented. If a measure of the effect of style decisions on ease of use could be defined it could be used in determining a measure of optimal presentation.

Documents can present content in ways that make it easier to locate individual items. This can be referred to as 'locateability'. A way to distinguish one content object from another object is to evaluate the target object's locatability, i.e., how easy it is to find an object within the document. This is a little different from distinguishability, which tells how well an item can be differentiated from its neighbors. Structural aids such as layout of tables or bullet lists help the document viewer to locate objects. Presenting content in a table allows its location to be identified by row or column. The presence of headings for the rows and columns can further increase the ease of locating items. Presenting content items in a list introduces an ordering that aids in locating them, and the use of list bullets or item numbers aids further. Separability and distinguishability contribute to the locatability of an object.

Measures for various aspects of content, features, and the like could be weighted by intent, relevance, and other parameters and these could then be combined to obtain one or more overall measures for the document itself. If one had a method for evaluating such properties inherent in the document itself then such a measure could be used during the document development process to help determine optimal presentation.

Therefore, it is desirable to provide a methodology to measure the quality of a document in a quantifiable way. Moreover, it is desirable to provide a quantifiable measurement of quality which is useable in evaluating the document and improving its quality so as to add value to the information being conveyed through the document.

SUMMARY OF THE PRESENT INVENTION

A first aspect of the present invention is a method for quantifying a measure of quality of a document. The method measures a predetermined set of characteristics of the document; quantizes the measured predetermined set of characteristics of the document; and generates a quantized aesthetic value for the document based on a predetermined combining function, the predetermined combining function combining the quantized measured predetermined set of characteristics, the quantized aesthetic value being a measure of quality of the document.

A second aspect of the present invention is a method for quantifying a measure of quality of a document. The method measures a predetermined set of characteristics of the document; quantizes the measured predetermined set of characteristics of the document; generates a quantized aesthetic value for the document based on a predetermined aesthetic combining function, the predetermined aesthetic combining function combining a predetermined subset of the quantized measured predetermined set of characteristics; generates a quantized ease of use value for the document based on a predetermined ease of use combining function, the predetermined ease of use combining function combining a predetermined subset of the quantized measured predetermined set of characteristics; generates a quantized eye-catching ability value for the document based on a predetermined eye-catching ability combining function, the predetermined eye-catching ability combining function combining a predetermined subset of the quantized measured predetermined set of characteristics; generates a quantized interest value for the document based on a predetermined interest combining function, the predetermined interest combining function combining a predetermined subset of the quantized measured predetermined set of characteristics; generates a quantized convenience value for the document based on a predetermined convenience combining function, the predetermined convenience combining function combining a predetermined subset of the quantized measured predetermined set of characteristics; generates a quantized comfort value for the document based on a predetermined comfort combining function, the predetermined comfort combining function combining a predetermined subset of the quantized measured predetermined set of characteristics; generates a quantized communicability value for the document based on a predetermined communicability combining function, the predetermined communicability combining function combining a predetermined subset of the quantized measured predetermined set of characteristics; and generates a quantized quality value for the document based on a predetermined quality combining function, the predetermined quality combining function combining the generated quantized aesthetic value, the generated quantized ease of use value, the generated quantized eye-catching ability value, the generated quantized interest value, the generated quantized convenience value, the generated quantized comfort value, and the generated quantized communicability value.

A third aspect of the present invention is a method for quantifying a measure of quality of a document. The method measures a predetermined set of characteristics of the document; quantizes the measured predetermined set of characteristics of the document; and generates a quantized ease of use value for the document based on a predetermined combining function, the predetermined combining function combining the quantized measured predetermined set of characteristics, the quantized ease of use value being a measure of quality of the document.

A fourth aspect of the present invention is a method for quantifying a measure of quality of a document. The method measures a predetermined set of characteristics of the document; quantizes the measured predetermined set of characteristics of the document; and generates a quantized eye-catching ability value for the document based on a predetermined combining function, the predetermined combining function combining the quantized measured predetermined set of characteristics, the quantized eye-catching ability value being a measure of quality of the document.

A fifth aspect of the present invention is a method for quantifying a measure of quality of a document. The method measures a predetermined set of characteristics of the document; quantizes the measured predetermined set of characteristics of the document; and generates a quantized interest value for the document based on a predetermined combining function, the predetermined combining function combining the quantized measured predetermined set of characteristics, the quantized interest value being a measure of quality of the document.

A sixth aspect of the present invention is a method for quantifying a measure of quality of a document. The method measures a predetermined set of characteristics of the document; quantizes the measured predetermined set of characteristics of the document; and generates a quantized comfort value for the document based on a predetermined combining function, the predetermined combining function combining the quantized measured predetermined set of characteristics, the quantized comfort value being a measure of quality of the document.

A seventh aspect of the present invention is a method for quantifying a measure of quality of a document. The method measures a predetermined set of characteristics of the document; quantizes the measured predetermined set of characteristics of the document; and generates a quantized convenience value for the document based on a predetermined combining function, the predetermined combining function combining the quantized measured predetermined set of characteristics, the quantized convenience value being a measure of quality of the document.

Another aspect of the present invention is a method for quantifying a measure of quality of a document. The method measures a predetermined set of characteristics of the document; quantizes the measured predetermined set of characteristics of the document; and generates a quantized communicability value for the document based on a predetermined combining function, the predetermined combining function combining the quantized measured predetermined set of characteristics, the quantized communicability value being a measure of quality of the document.

A further aspect of the present invention is a method for quantifying a measure of quality of a document. The method measures a predetermined set of characteristics of the document; quantizes the measured predetermined set of characteristics of the document; generates a quantized aesthetic value for the document based on a predetermined aesthetic combining function, the predetermined aesthetic combining function combining a predetermined subset of the quantized measured predetermined set of characteristics; generates a quantized ease of use value for the document based on a predetermined ease of use combining function, the predetermined ease of use combining function combining a predetermined subset of the quantized measured predetermined set of characteristics; and generates a quantized quality value for the document based on a predetermined quality combining function, the predetermined quality combining function combining the generated quantized aesthetic value and the generated quantized ease of use value.

A tenth aspect of the present invention is a method for quantifying a measure of quality of a document. The method measures a predetermined set of characteristics of the document; quantizes the measured predetermined set of characteristics of the document; generates a quantized aesthetic value for the document based on a predetermined aesthetic combining function, the predetermined aesthetic combining function combining a predetermined subset of the quantized measured predetermined set of characteristics; generates a quantized ease of use value for the document based on a predetermined ease of use combining function, the predetermined ease of use combining function combining a predetermined subset of the quantized measured predetermined set of characteristics; generates a quantized eye-catching ability value for the document based on a predetermined eye-catching ability combining function, the predetermined eye-catching ability combining function combining a predetermined subset of the quantized measured predetermined set of characteristics; and generates a quantized quality value for the document based on a predetermined quality combining function, the predetermined quality combining function combining the generated quantized aesthetic value, the generated quantized ease of use value, and the generated quantized eye-catching ability value.

A further aspect of the present invention is a method for quantifying a measure of quality of a document. The method measures a predetermined set of characteristics of the document; quantizes the measured predetermined set of characteristics of the document; generates a quantized eye-catching ability value for the document based on a predetermined eye-catching ability combining function, the predetermined eye-catching ability combining function combining a predetermined subset of the quantized measured predetermined set of characteristics; generates a quantized ease of use value for the document based on a predetermined ease of use combining function, the predetermined ease of use combining function combining a predetermined subset of the quantized measured predetermined set of characteristics; and generates a quantized quality value for the document based on a predetermined quality combining function, the predetermined quality combining function combining the generated quantized eye-catching ability value and the generated quantized ease of use value.

A further aspect of the present invention is a method for quantifying a measure of quality of a document. The method measures a predetermined set of characteristics of the document; quantizes the measured predetermined set of characteristics of the document; generates a quantized interest value for the document based on a predetermined interest combining function, the predetermined eye-catching ability combining function combining a predetermined subset of the quantized measured predetermined set of characteristics; generates a quantized ease of use value for the document based on a predetermined ease of use combining function, the predetermined ease of use combining function combining a predetermined subset of the quantized measured predetermined set of characteristics; and generates a quantized quality value for the document based on a predetermined quality combining function, the predetermined quality combining function combining the generated quantized interest value and the generated quantized ease of use value.

Another aspect of the present invention is a method for quantifying a measure of quality of a document. The method measures a predetermined set of characteristics of the document; quantizes the measured predetermined set of characteristics of the document; and generates a quantized eye-catching ability value for the document based on a predetermined eye-catching ability combining function, the predetermined eye-catching ability combining function combining a predetermined subset of the quantized measured predetermined set of characteristics; generates a quantized interest value for the document based on a predetermined interest combining function, the predetermined interest combining function combining a predetermined subset of the quantized measured predetermined set of characteristics; and generates a quantized quality value for the document based on a predetermined quality combining function, the predetermined quality combining function combining the generated quantized eye-catching ability value and the generated quantized interest value.

Another aspect of the present invention is a method for quantifying a measure of quality of a document. The method measures a predetermined set of characteristics of the document; quantizes the measured predetermined set of characteristics of the document; and generates a quantized eye-catching ability value for the document based on a predetermined eye-catching ability combining function, the predetermined eye-catching ability combining function combining a predetermined subset of the quantized measured predetermined set of characteristics; generates a quantized comfort value for the document based on a predetermined comfort combining function, the predetermined comfort combining function combining a predetermined subset of the quantized measured predetermined set of characteristics; and generates a quantized quality value for the document based on a predetermined quality combining function, the predetermined quality combining function combining the generated quantized eye-catching ability value and the generated quantized comfort value.

A further aspect of the present invention is a method for quantifying a measure of quality of a document. The method measures a predetermined set of characteristics of the document; quantizes the measured predetermined set of characteristics of the document; generates a quantized aesthetics value for the document based on a predetermined aesthetics combining function, the predetermined aesthetics combining function combining a predetermined subset of the quantized measured predetermined set of characteristics; generates a quantized interest value for the document based on a predetermined interest combining function, the predetermined interest combining function combining a predetermined subset of the quantized measured predetermined set of characteristics; and generates a quantized quality value for the document based on a predetermined quality combining function, the predetermined quality combining function combining the generated quantized aesthetics value and the generated quantized interest value.

A further aspect of the present invention is a method for quantifying a measure of quality of a document. The method measures a predetermined set of characteristics of the document; quantizes the measured predetermined set of characteristics of the document; generates a quantized interest value for the document based on a predetermined interest combining function, the predetermined interest combining function combining a predetermined subset of the quantized measured predetermined set of characteristics; generates a quantized ease of use value for the document based on a predetermined ease of use combining function, the predetermined ease of use combining function combining a predetermined subset of the quantized measured predetermined set of characteristics; and generates a quantized quality value for the document based on a predetermined quality combining function, the predetermined quality combining function combining the generated quantized interest value and the generated quantized ease of use value.

Another aspect of the present invention is a method for quantifying a measure of quality of a document. The method measures a predetermined set of characteristics of the document; quantizes the measured predetermined set of characteristics of the document; and generates a quantized aesthetics value for the document based on a predetermined aesthetics combining function, the predetermined aesthetics combining function combining a predetermined subset of the quantized measured predetermined set of characteristics; generates a quantized communicability value for the document based on a predetermined communicability combining function, the predetermined communicability combining function combining a predetermined subset of the quantized measured predetermined set of characteristics; and generates a quantized quality value for the document based on a predetermined quality combining function, the predetermined quality combining function combining the generated quantized aesthetics value and the generated quantized communicability value.

Another aspect of the present invention is a method for quantifying a measure of quality of a document. The method measures a predetermined set of characteristics of the document; quantizes the measured predetermined set of characteristics of the document; and generates a quantized communicability value for the document based on a predetermined communicability combining function, the predetermined communicability combining function combining a predetermined subset of the quantized measured predetermined set of characteristics; generates a quantized ease of use value for the document based on a predetermined ease of use combining function, the predetermined ease of use combining function combining a predetermined subset of the quantized measured predetermined set of characteristics; and generates a quantized quality value for the document based on a predetermined quality combining function, the predetermined quality combining function combining the generated quantized communicability value and the generated quantized ease of use value.

A further aspect of the present invention is a method for quantifying a measure of quality of a document. The method measures a predetermined set of characteristics of the document; quantizes the measured predetermined set of characteristics of the document; generates a quantized aesthetics value for the document based on a predetermined aesthetics combining function, the predetermined aesthetics combining function combining a predetermined subset of the quantized measured predetermined set of characteristics; generates a quantized comfort value for the document based on a predetermined comfort combining function, the predetermined communicability combining function combining a predetermined subset of the quantized measured predetermined set of characteristics; and generates a quantized quality value for the document based on a predetermined quality combining function, the predetermined quality combining function combining the generated quantized aesthetics value and the generated quantized comfort value.

A further aspect of the present invention is a method for quantifying a measure of quality of a document. The method measures a predetermined set of characteristics of the document; quantizes the measured predetermined set of characteristics of the document; and generates a quantized comfort value for the document based on a predetermined comfort combining function, the predetermined comfort combining function combining a predetermined subset of the quantized measured predetermined set of characteristics; generates a quantized ease of use value for the document based on a predetermined ease of use combining function, the predetermined ease of use combining function combining a predetermined subset of the quantized measured predetermined set of characteristics; and generates a quantized quality value for the document based on a predetermined quality combining function, the predetermined quality combining function combining the generated quantized comfort value and the generated quantized ease of use value.

Another aspect of the present invention is a method for quantifying a measure of quality of a document. The method measures a predetermined set of characteristics of the document; quantizes the measured predetermined set of characteristics of the document; and generates a quantized aesthetics value for the document based on a predetermined aesthetics combining function, the predetermined aesthetics combining function combining a predetermined subset of the quantized measured predetermined set of characteristics; generates a quantized convenience value for the document based on a predetermined convenience combining function, the predetermined convenience combining function combining a predetermined subset of the quantized measured predetermined set of characteristics; and generates a quantized quality value for the document based on a predetermined quality combining function, the predetermined quality combining function combining the generated quantized aesthetics value and the generated quantized convenience value.

Another aspect of the present invention is a method for quantifying a measure of quality of a document. The method measures a predetermined set of characteristics of the document; quantizes the measured predetermined set of characteristics of the document; and generates a quantized convenience value for the document based on a predetermined convenience combining function, the predetermined convenience combining function combining a predetermined subset of the quantized measured predetermined set of characteristics; generates a quantized ease of use value for the document based on a predetermined ease of use combining function, the predetermined ease of use combining function combining a predetermined subset of the quantized measured predetermined set of characteristics; and generates a quantized quality value for the document based on a predetermined quality combining function, the predetermined quality combining function combining the generated quantized convenience value and the generated quantized ease of use value.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein:

FIG. 60 illustrates an example of a hue angle according to the concepts of the present invention;

FIG. 61 illustrates a conceptual circuit for quantifiably measuring interest according to the concepts of the present invention;

FIG. 87 illustrates an example of intimidation according to the concepts of the present invention;

DESCRIPTION OF THE SPECIFICATION

Figure 1:
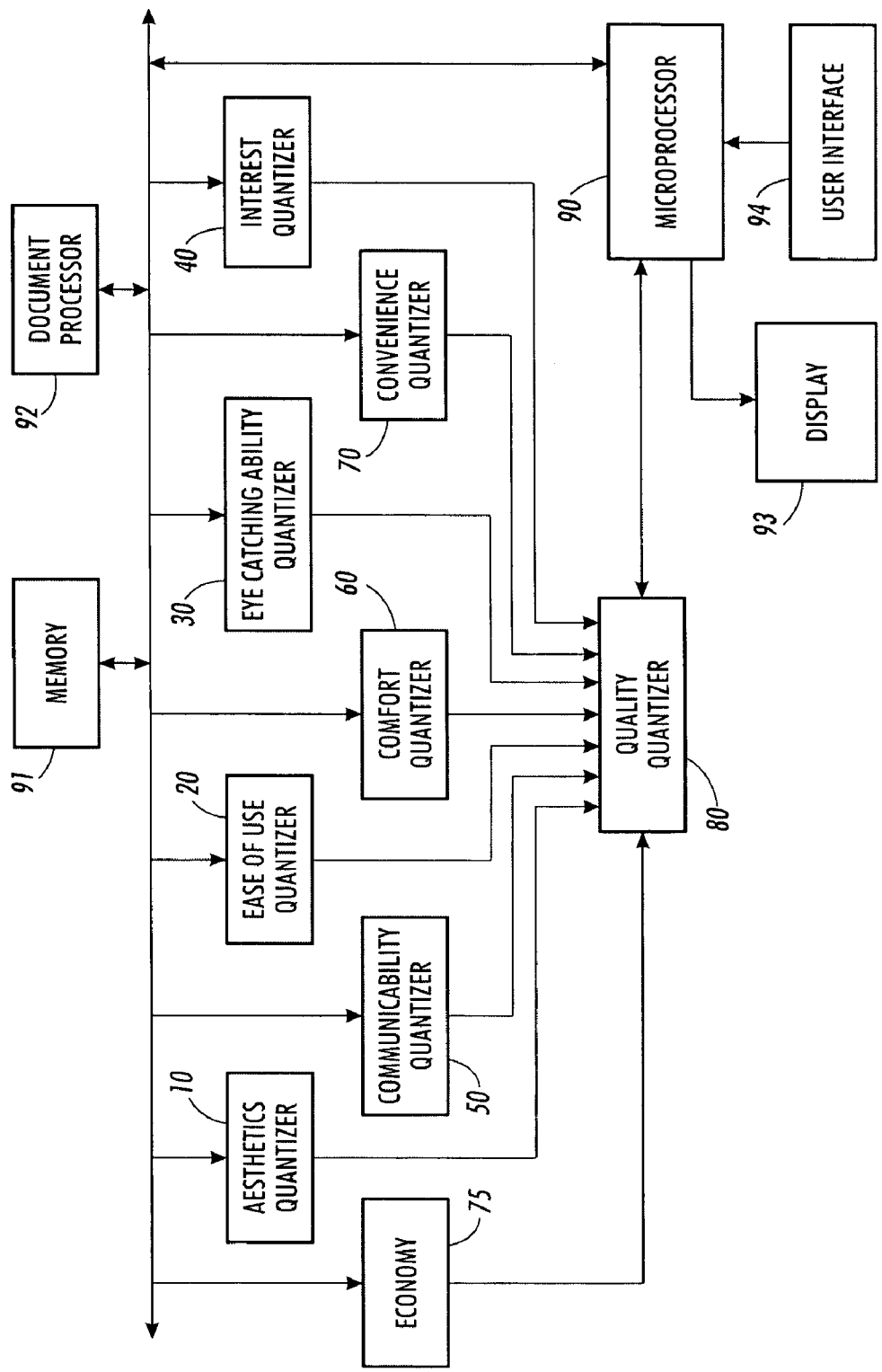
FIG. 1 is a block diagram illustrating an architectural layout for quantifiably measuring document quality according to the concepts of the present invention.

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention, as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions may have been purposely drawn disproportionately so that the features and concepts of the present invention could be properly illustrated.

The present invention is directed to various methods for quantifying various document properties to assist document developers in determining document quality. Quality can have several competing aspects and the overall quality can depend not only on the absolute properties of the document, but also on the relative importance of these properties to the beholder. One aspect or class of document quality is its aesthetics, which is its beauty, the degree to which pleasure can be derived from its appearance. Often this property is manifested in the degree of displeasure generated by an ugly layout.

Another aspect or class contributing to the quality of a document is the effectiveness with which it communicates information to the user. Documents are vessels of information, and the ease at which the viewer can gather and understand the information can be an important factor in how well the document does its job.

A third aspect or class that contributes to the quality of a document is its ease of use. A factor that contributes to the ease of use is how convenient the document is, that is, can it be used with a minimum of effort. A second factor contributing overall ease of use is content grouping. Information often has some logical organization and documents can reflect this organization by grouping the content. The effectiveness with which the document coveys this grouping and enables the viewer to capitalize on it contributes to the ease of use.

A fourth aspect or class that enters into document quality is the degree to which the user is comfortable with it. Documents that create anxiety are generally not as desirable as those that the viewer finds soothing and familiar.

A fifth aspect or class that is an important contributor to the quality of some documents is the degree to which they can catch the eye of the viewer. Advertisements for example, strive to capture the attention and not to be easily overlooked A sixth aspect or class that is similar is the ability for the document to maintain interest. It is one thing to capture the attention, but another to hold it and to avoid boredom as the document is used.

A seventh aspect or class of quality can be the economy of the document, both to the creator and to the viewer. If the other contributors to quality are the same, then a lower cost version of a document is generally considered better than a more expensive one. While other factors may also contribute to document quality, the measuring of these seven aspects or classes provides a good basis for evaluating document quality.

The aspects or classes listed as contributing to document quality (with the exception of economy) are usually considered soft and ill-defined concepts; however, these properties can be quantified. The method for measuring and quantifying these attributes is to first identify document features that contribute to the property. Quantifiable measures of the individual features are then devised. And finally, the individual feature values are combined to form an overall score for the more abstract property.

FIG. 1 is a block diagram illustrating an architectural layout for quantifiably measuring document quality according to the concepts of the present invention. As illustrated in FIG. 1, the quantization of a document's quality can be carried out in by a system architecture that includes a memory 91, a document processor circuit 92, microprocessor 90, user interface 94, and a display 93. The memory 91 may store for processing purposes a portion of a document, a page of the document, a portion of a page of a document, a document, or multiple documents.

The display 93 may display the document or portion thereof that is being quantized with respect to quality. The display 93 may also display the various options that a user can choose though the user interface 94 with respect to the classes that the user wishes to quantize or the various parameters that a user can choose though the user interface 94, which are to be measured within the chosen quantization class.

The quantization architecture of FIG. 1 further includes various circuits for measuring/quantizing various aspects or classes of document quality. These circuits include aesthetics quantizer 10, ease of use quantizer 20, eye catching ability quantizer 30, interest quantizer 40, communicability quantizer 50, comfort quantizer 60, convenience quantizer 70, and economy quantizer 75. Each of these (except the economy quantizer, for which measures and methods are well known) will be discussed in more detail below.

Figure 2:
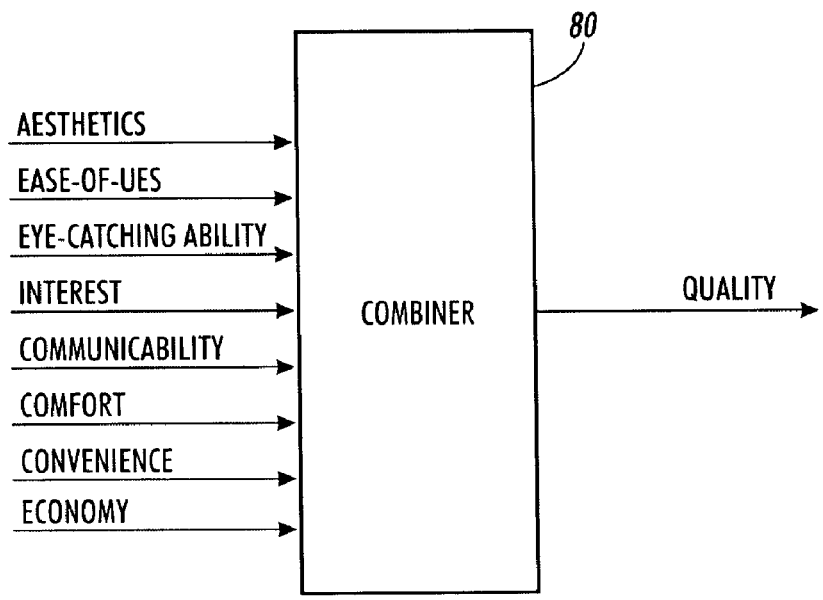
FIG. 2 illustrates a conceptual circuit for quantifiably measuring document quality according to the concepts of the present invention.

On the other hand FIG. 2 illustrates a single quality quantizer or combiner 80 that receives measured and/or calculated quantized values representing aesthetics, ease of use, eye catching ability, interest, communicability, comfort, and/or convenience. Quality quantizer or combiner 80 processes these values based upon a predetermined algorithm so as to generate a quality quantization value for the document or portion of the document being analyzed. If alternate or additional measures of quality are considered, they would also be combined at combiner 80.

Each value thereof is based on properties inherent in the document itself. The values are individually combined into an overall value or score for the document. Other methods for measuring, assigning, or otherwise associating a quantifiable value for document quality should be considered within the scope of the present invention; such that the present invention is directed to not only in the particular methods put forth, but also in the much broader concept of determining a value for document quality.

In a preferred embodiment of the present invention, each rule is defined to produce a value ranging between 0 and 1 such that 0 means low value and 1 means high value. This enables quantized quality values to be calculated and combined to form the overall document quality measure.

If $V_i$ is the value calculated for the $i^{th}$ rule, the document quality measure $V_Q$ is formed as a function E of these contributions such that: $V_Q=E(V_1, V_2, \ldots V_N)$. The combining function E can be as simple as a weighted average of the contributions. However, because any bad contributor can ruin the document quality no matter how good the others are, a linear combination is not preferred.

An alternative is: $V_Q=(\Sigma w_i(V_i)^{-p})^{-1/p}$. In a preferred embodiment, the $w_i$ factors are weights that specify the relative importance of each rule and should sum to one. The exponent 'p' introduces a non-linearity that can make one bad value overwhelm many good ones. The larger the value of the exponent 'p' is, the greater this effect A further alternative is: $V_Q=(\Sigma w_i(d+V_i)^{-p})^{-1/p}-d$. The $w_i$ factors are weights that specify the relative importance of each rule and should sum to one. The exponent 'p' introduces a non-linearity that can make one bad value overwhelm many good ones. The parameter d is a number slightly larger than 0. The larger the value of the exponent 'p' is, the greater this effect.

Other combining functions are, for example, the product of the contributions. If weighting of the contribution is desired, this can be achieved by: $V_Q=\Pi V_i^{wi'}$.

It is noted that the illustrations show circuits or circuit for the quality quantization process, this process may also be performed in software by the microprocessor and/or firmware. The quantization is not limited to specific circuits, but any combination of software and/or hardware that is able to carry out the below described methodologies.

Aesthetics

Figure 3:
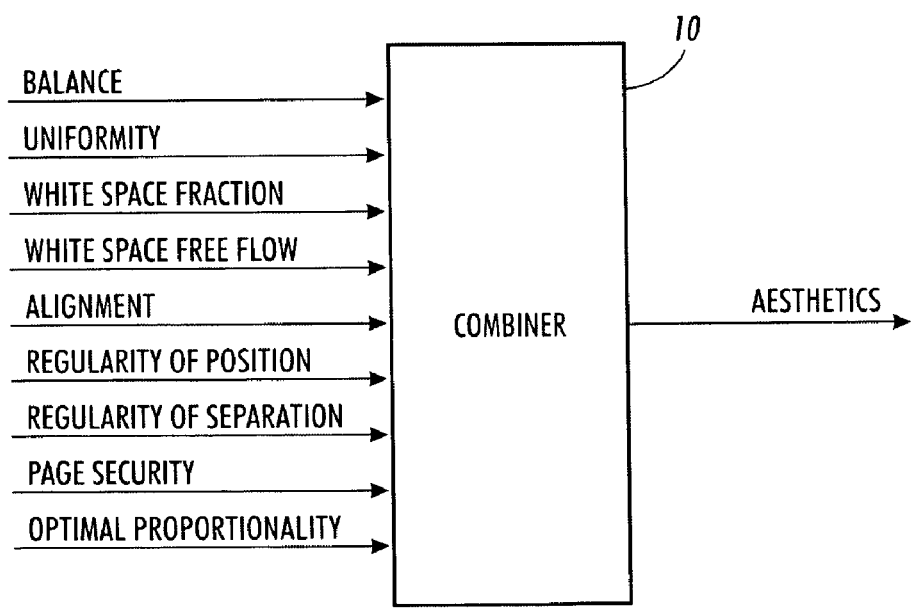
FIG. 3 illustrates a conceptual circuit for quantifiably measuring document aesthetics according to the concepts of the present invention.

For the case of document aesthetics, the methods herein are used to generate quantifiable values for the contributing features of: balance, uniformity, white-space fraction, white-space free-flow, alignment, regularity, page security, and/or aspect ratio (optimal proportionality). As illustrated in FIG. 3, a combining circuit 10 (the aesthetics quantizer 10 of FIG. 1) receives measured and/or calculated quantized values representing balance, uniformity, white-space fraction, white-space free-flow, alignment, regularity, page security, and/or aspect ratio (optimal proportionality) and processes these values based upon a predetermined algorithm so as to generate an aesthetic quantization value for the document or portion of the document being analyzed.

Each value thereof is based on properties inherent in the document itself The values are individually combined into an overall value or score for the document. Other methods for measuring, assigning, or otherwise associating a quantifiable value for document quality should be considered within the scope of the present invention; such that the present invention is directed to not only in the particular methods put forth, but also in the much broader concept of determining a value for document quality.

In a preferred embodiment of the present invention, each rule is defined to produce a value ranging between 0 and 1 such that 0 means low value and 1 means high value. This enables quantized quality values to be calculated and combined to form the overall document quality measure.

If $V_i$ is the value calculated for the $i^{th}$ rule, the document quality measure $V_A$ is formed as a function E of these contributions such that: $V_A=E(V_1, V_2, \ldots V_N)$. The combining function E can be as simple as a weighted average of the contributions. However, because any bad contributor can ruin the document quality no matter how good the others are, a linear combination is not preferred.

An alternative is: $V_A=(\Sigma w_i(V_i)^{-p})^{-1/p}$. In a preferred embodiment, the $w_i$ factors are weights that specify the relative importance of each rule and should sum to one. The exponent 'p' introduces a non-linearity that can make one bad value overwhelm many good ones. The larger the value of the exponent 'p' is, the greater this effect A further alternative is: $V_A=(\Sigma w_i(d+V_i)^{-p})^{-1/p}-d$. The $w_i$ factors are weights that specify the relative importance of each rule and should sum to one. The exponent 'p' introduces a non-linearity that can make one bad value overwhelm many good ones. The parameter d is a number slightly larger than 0. The larger the value of the exponent 'p' is, the greater this effect.

Other combining functions are, for example, the product of the contributions. If weighting of the contribution is desired, this can be achieved by: $V_A=\Pi V_i^{wi'}$.

It is noted that the illustrations show circuits or circuit for the aesthetics quantization process, this process may also be performed in software by the microprocessor and/or firmware. The quantization is not limited to specific circuits, but any combination of software and/or hardware that is able to carry out the below described methodologies.

As illustrated in FIG. 3, one of the parameters or factors used in determining aesthetics is the measurement and quantization of the document's balance or balance in page layout.

Figure 5:
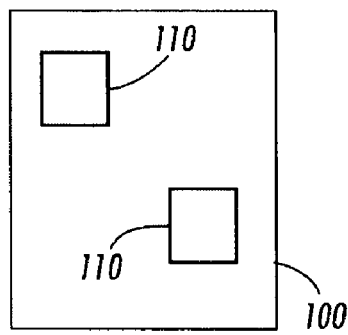
Figure 6:
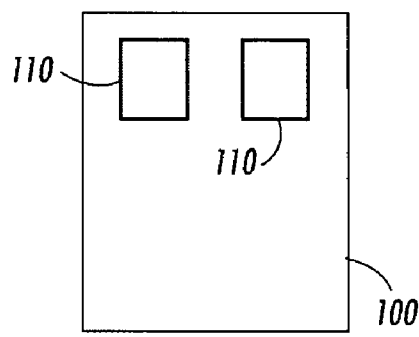
Figure 7:
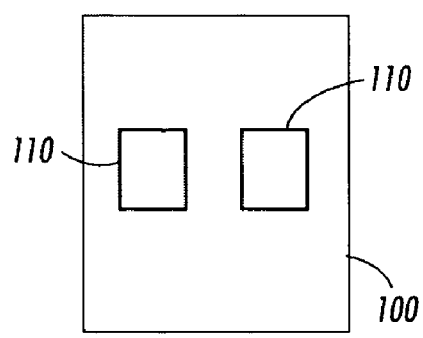

In a preferred embodiment of the present invention, there are at least two primary ways of defining balance. There is an overall balance where the center of visual weight is at the visual center of a page of a document; as illustrated by FIG. 5 with objects 110 on document 100 having substantially a center of visual weight equal to a visual center of a page of a document; and a left-right balance; as illustrated by FIGS. 6 and 7 with objects 110 on document 100 where the weight of object 110 on the left side of the page is matched by the weight of object 110 at the same vertical position on the right side of the page. Other definitions for balance are to be considered within the scope of the present invention.

Figure 4:
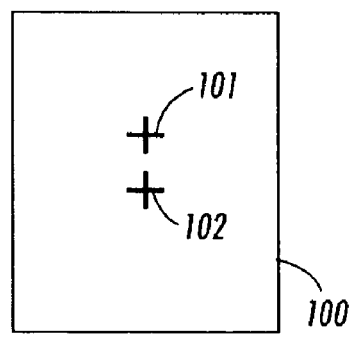
FIGS. 4 to 7 illustrate examples of visual balance according to the concepts of the present invention.
Figure 8:
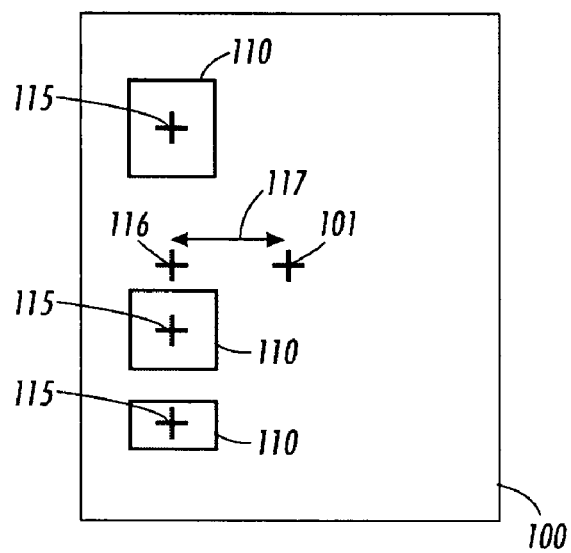
FIGS. 8 and 9 illustrate examples of quantifiably measuring visual balance according to the concepts of the present invention.

The overall balance is calculated by determining the center of visual weight 102 of FIG. 4 and noting how much it differs from the visual center of the page 101 of FIG. 4. FIG. 8 provides a detail example of determining the overall balance of a page of a document.

As illustrated in FIG. 8, if the visual weight of an object i (110 of FIG. 8) is $M_i$ (115 of FIG. 8) and the object's center is positioned at $(x_i, y_i)$, the center of visual weight for the page layout 116 is at $(x_m, y_m)$ where $x_m=(\Sigma x_i M_i)/(\Sigma M_i)$ and $y_m=(\Sigma y_i M_i)/(\Sigma M_i)$ are the sums of all objects on the page. Objects 110, as used herein, may refer to paragraphs, pictures, graphics, etc.

If the visual center of the page 116 is at $(x_c, y_c)$ and the maximum x and y distances (117 shows the x distance) an object can be from the visual center 102 are $d_x$ and $d_y$, a balance value can be calculated as: $V_{OB}=1-[(((x_m-x_c)/d_x)^2+((y_m-y_c)/d_y)^2)/2]^{1/2}$.

Note that one can, in a similar way, compute the balance of subclasses of objects by considering only objects belonging to the subclasses. For example, one could compute the visual balance of all pictorial images on the page, or the visual balance of all text blocks.

Figure 9:
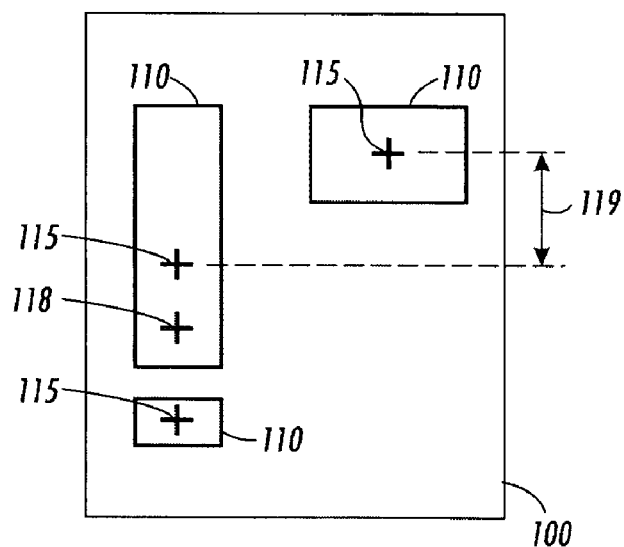

For left-right balance, the center of visual weight (118 of FIG. 9) for the x component is calculated as given above. However, for the y component, what is desired is that the left and right halves have the same position, rather than the total being centered. This is achieved by calculating the center of weight for the left side (118) as: $y_L=(\Sigma y_i M_i)/(\Sigma M_i)$ where the sums are over the portions of objects 110 with $x_i<x_c$. Similarly, $y_R=(\Sigma y_i M_i)/(\Sigma M_i)$ where the sums are over the portions of objects with $x_i>x_c$.

If a content object spans both the left and right sides of the page, for the purposes of this calculation, the object is divided along the vertical centerline of the page. The left and right divisions of the object are then entered into the left and right sums, respectively. If the page height is $d_h$, a left-right balance value is: $V_{LR}=1-[(((x_m-x_c)/d_x)^2+((y_L-y_R)/d_h)^2)/2]^{1/2}$. It is noted that other definitions are possible.

One might, for example, raise these balance values to powers in order to express the idea that balance is non-linear. Ideally, one would perform the psychophysical experiments to measure human response to balance and define a function that matches that response.

The above expressions make use of the visual weight of an object. To first order, this can be defined as the objects area times its optical density. However, other psychological effects can also be included. Examples include color carrying more weight than gray; round shapes carrying more weight than rectangular, and positioning at the top of the page giving more weight than at the bottom.

As illustrated in FIG. 4, balance is defined with respect to the visual center of the page 101. The visual center 101 lies halfway between the left and right edges of the page, but it is not halfway between the top and bottom. Typically, the visual center 101 is taken to be offset a twentieth of the page height towards the top from the geometric center 102.

Figure 10:
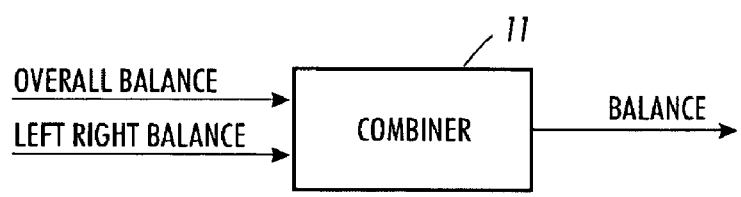
FIG. 10 illustrates a conceptual circuit for quantifiably measuring visual balance according to the concepts of the present invention.

The balance, as illustrated in FIG. 10, is considered a combination of two approaches described above. In FIG. 10, the quantized overall balance value is derived by a combining of the overall balance and the left-right balance using a balance quantizer or combiner circuit 11.

One approach is: $V_{b1}=1-[w_{ob}(1-V_{ob})^{-q}+w_{LR}(1-V_{LR})^{-q}]^{-1/q}$. The weights $w_{ob}$ and $w_{LR}$ give the relative importance of the two balance approaches and should sum to 1. If either of the balance measures is near 1 (good), the overall result is also near 1. The exponent 'q' determines how strong this behavior is.

It is noted that the illustration shows a circuit for the balance quantization process, this process may also be performed in software by the microprocessor and/or firmware. The quantization is not limited to specific circuits, but any combination of software and/or hardware that is able to carry out the below described methodologies.

Figure 11:
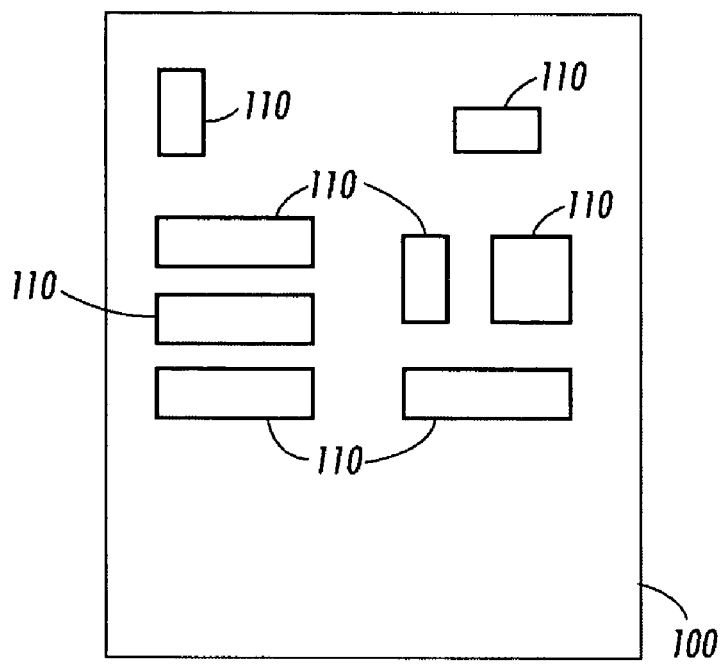
FIGS. 11 and 12 illustrate examples of non-uniform distribution of content objects over a page according to the concepts of the present invention.
Figure 12:
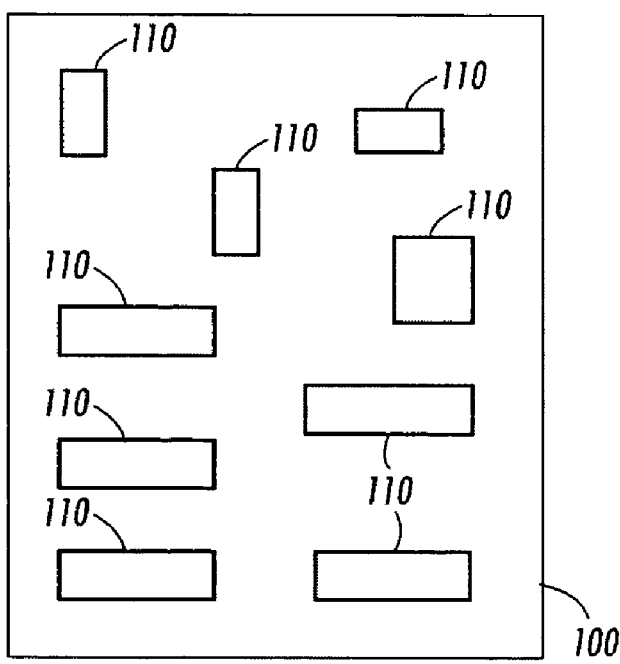

As illustrated in FIGS. 11 and 12, another parameter or factor used in determining aesthetics is the measurement and quantization of the document's uniformity.

In a preferred embodiment of the present invention, it is preferred to have content objects 110 distributed uniformly over a page 100, as illustrated in FIG. 12, and not clumped together, as illustrated in FIG. 11. However, for other values, such as attention grabbing, it may be beneficial to have clustered and even unbalanced positioning. Uniformity is preferred.

Non-uniformity is defined herein as the variance of the visual density. For a portion of a page, a visual density is determined by it's the visual weight of the objects contained within the portion, divided by it's the portion's area such that: $D_i=\Sigma M_j/A_i$ where the sum is over objects j contained in page portion i. Densities are preferably scaled to range between 0 and 1. A rescale may be needed if visual weight includes factors in addition to the optical density that alter the range of values. An average page density can also be defined as the sum of the visual weights for all objects on the page divided by the imageable area of the page.

The imageable area $Ap_i$ is typically the area of the page excluding margins. $D_{AV}\Sigma M_i/Ap_i$. A non-uniformity value is calculated by dividing the imageable area into a small number of portions and comparing the visual density for portions to the average page density.

A non-uniformity value can be calculated as the difference between the visual density for the portion of the page and the average page density, which is squared and weighted by the portion's area. Subtracting 1 this gives a uniformity value. In other words, a non-uniformity value van be defined as $V_{NU}=1-(\Sigma(D_i-D_{av})^2 A_i)/\Sigma A_i$.

The average page density can also be calculated for each page individually, or an overall average page density can be determined from the visual weight of all objects on portions of all pages and the area of all pages.

An alternative to calculating a single non-uniformity value for the document directly is to calculate non-uniformity values for individual pages and then combines the page values by some means such as an average, or by a non-linear scheme that might, for example, yield a low result if any page has a low value. Other uniformity measures are possible, for example, the true variance in the densities can be calculated and used to give non-uniformity. Alternatively, a function is constructed from measured human responses to differing uniformities.

Figure 13:
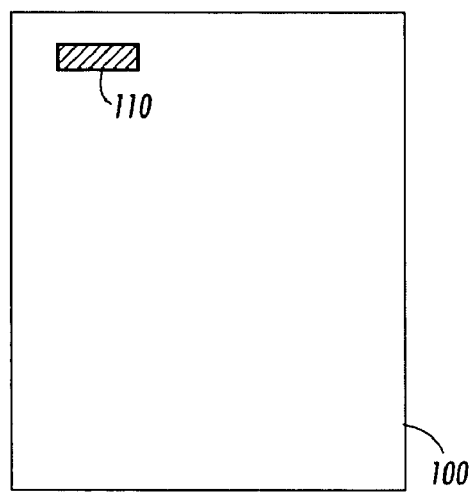
FIGS. 13 to 15 illustrate examples of white space fraction according to the concepts of the present invention.
Figure 14:
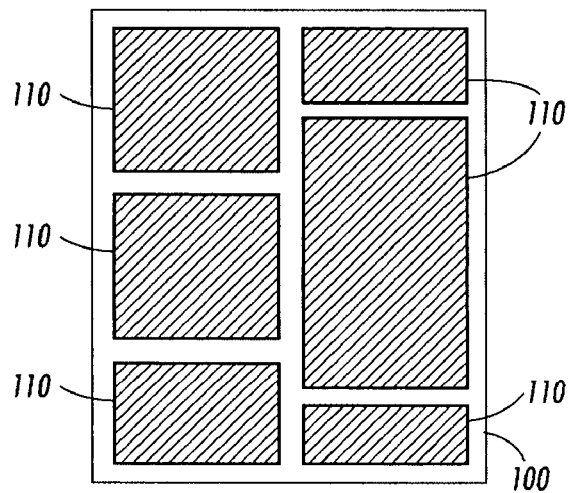
Figure 15:
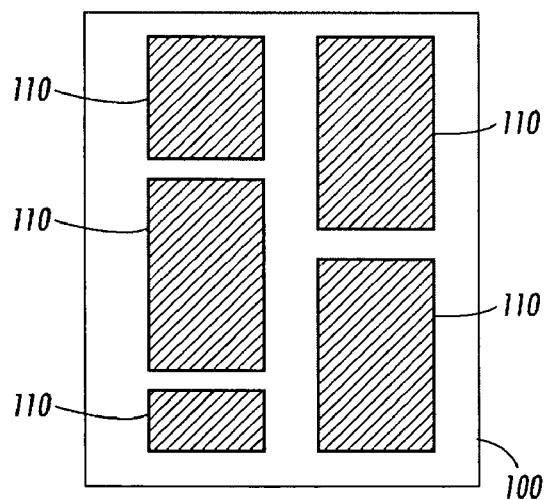
Figure 16:
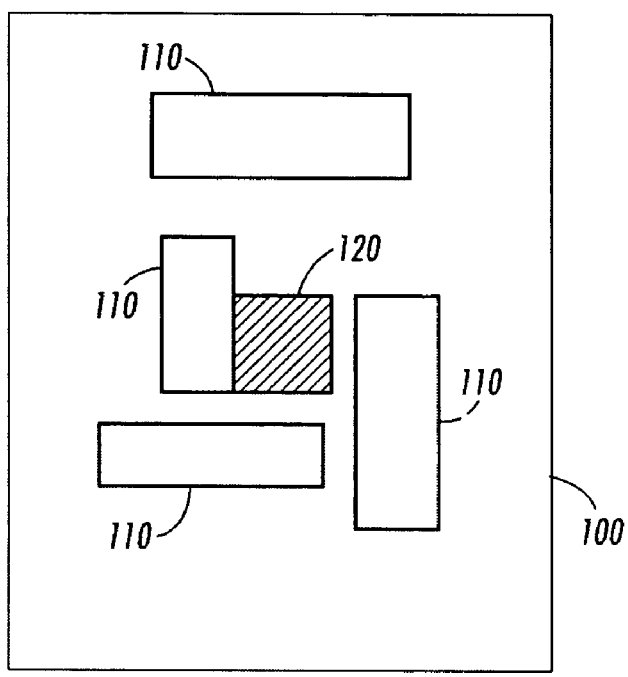
FIG. 16 illustrates an example of trapped white space according to the concepts of the present invention.
Figure 17:
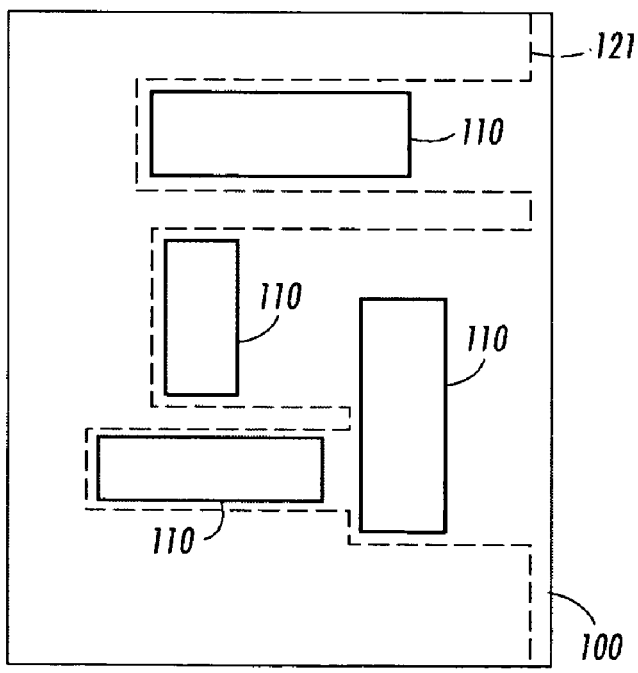
FIGS. 17 to 20 illustrate examples of quantifiably measuring trapped white space according to the concepts of the present invention.
Figure 18:
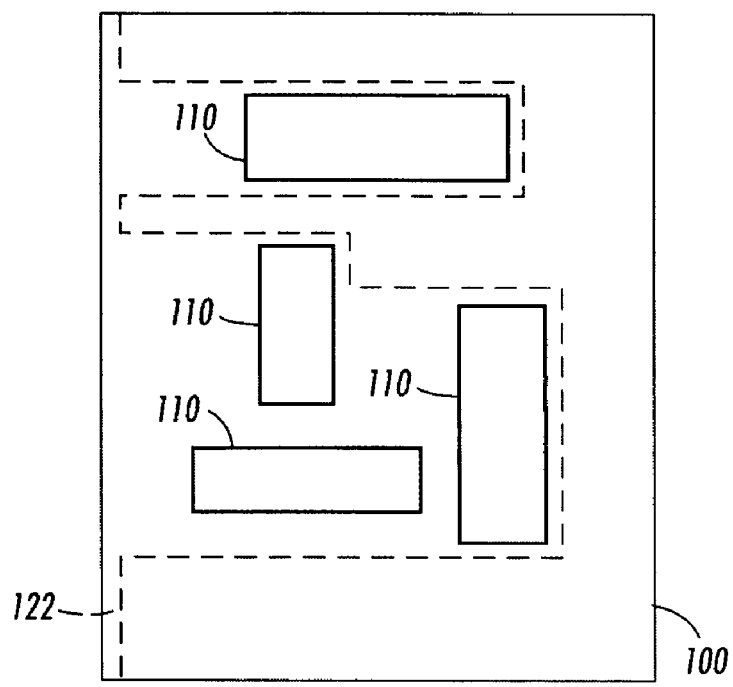
Figure 19:
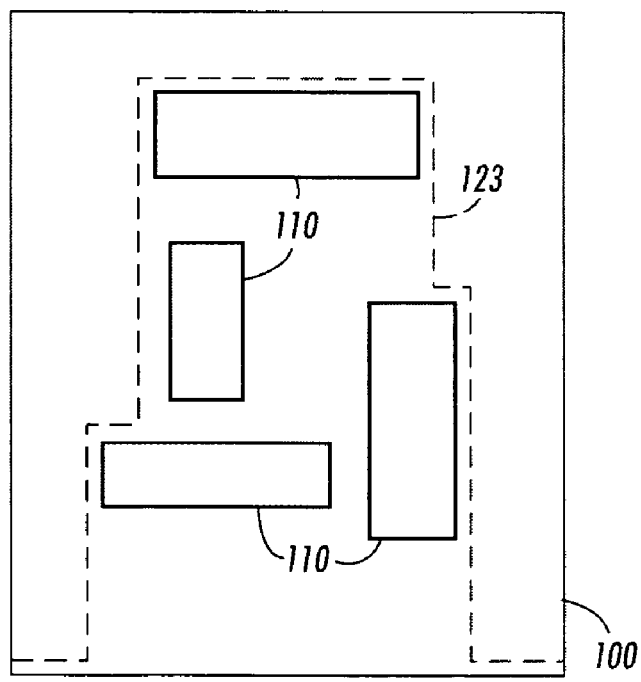
Figure 20:
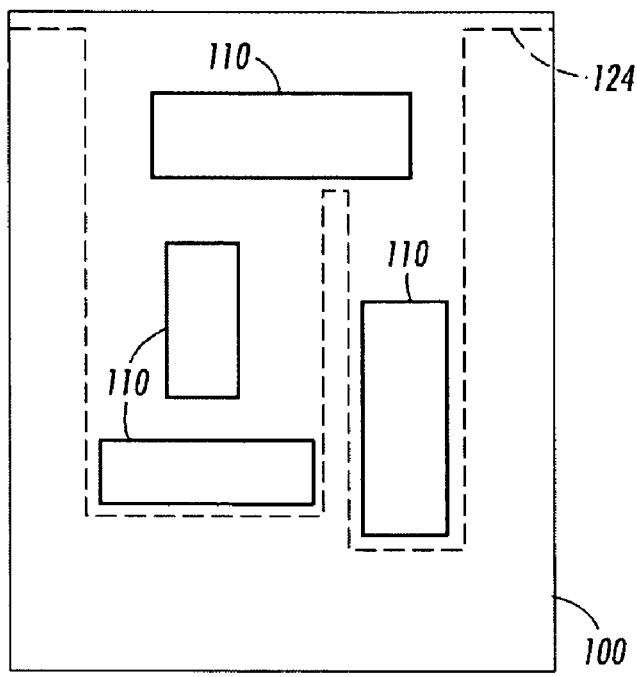
Figure 21:
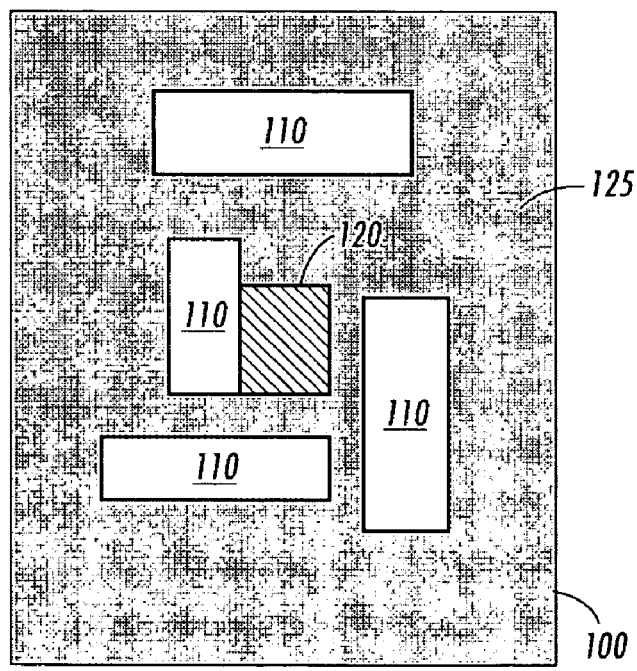
FIG. 21 illustrates an example of defining the trapped white space according to the concepts of the present invention.

As illustrated in FIGS. 13 to 15, another parameter or factor used in determining aesthetics is the measurement and quantization of the document's white space fraction.

In a preferred embodiment of the present invention, a good page design is one with white space (including margins) totaling about half of the total page area. The non-white space area can be estimated by totaling the areas of the content objects.

In FIG. 13, the white space fraction, the amount of area not associated with an object 110 on page 100, totals more than half of the imageable area and thus it is undesirable. In FIG. 14, the white space fraction, the amount of area not associated with an object 110 on page 100, totals less than half of the imageable area and thus it is also undesirable. Lastly, in FIG. 15, the white space fraction, the amount of area not associated with an object 110 on page 100, totals about half of the imageable area and thus it is optimal.

The total object area 110 can be scaled by the total page area AP and the difference between this value and the desired 50% can be found. Squaring the difference to give a positive number produces a measure of how much the layout differs from the 50% rule. Scaling by 4 to get a number ranging between 0 and 1 and then subtracting this from 1 gives the white space fraction quantization value. Thus: $V_{ws}=1-4((\Sigma A_i/A_p)-0.5)^2$.

Other measures of the effect of the white space fraction on document aesthetics and on document quality are envisioned herein and should be considered within the scope of the present invention, for example, a function of measured human responses to differing white space fractions.

As illustrated in FIGS. 16 to 21, another parameter or factor used in determining aesthetics is the measurement and quantization of the document's trapped white space.

In a preferred embodiment of the present invention, it is desired that there should not be any large blocks of white space trapped, in the middle of the page, by content. The white space should always be connected to the margins.

To quantize this class of trapped white space, an efficient method of detecting trapped white space is illustrated in FIGS. 16 to 21 and discussed in more detail below.

The class of trapped white space is primarily concerned with relatively large blocks of white space. One way that efficiency, as used herein, can be improved is by performing a trapped white space analysis at a coarse resolution. The approach taken is to determine the area of all white space that can be accessed directly from the margins. This area then gets added to the area of the content objects (110 of FIG. 16) and compared to the area of the page. Any difference becomes the amount of trapped white space (120 of FIG. 16).

To achieve this, four profiles (FIGS. 17–20) of white space are accessible from the four margins of the document constructed. These profiles are preferably stored in arrays at the coarse resolution. Call the arrays, for example: TopProf, BottomProf, LeftProf and RightProf. Elements of the TopProf and BottomProf arrays are initialized to the page height, while the LeftProf and RightProf arrays are initialized to the page width.

Next all content objects 110 are stepped through and for each, their left (FIG. 17), right (FIG. 18), top (FIG. 19), and bottom (FIG. 20) boundary positions 121, 122, 123, and 124, respectively, are found. This information is used to update the profile arrays.

For points from the left to right boundary, the value stored in the TopProf array is compared to the top boundary and the array value is replaced with the top value if top is smaller. The difference between the bottom boundary and the page height is compared to the BottomProf array value and updated with the smaller result. This is captured in the following:

```
for ( x = L; x < R; x++)
{
if (T < TopProf[x])
TopProf[x] = T;
if (H − B < BottomProf[x])
BottomProf[x] = H − B};
}
```

Here L, R, T, B contain the left, right, top, and bottom boundary positions of the content object respectively, and H is the page height. Similar calculations update the LeftProf and RightProf arrays for the content object.

Total white space area (125 of FIG. 21) connected to the page edges can be found by examining the entire page and comparing and checking each point position against the profile arrays. A sum of all points that lie between a page edge and the corresponding profile boundary is computed. Summing all points in this manner avoids double counting of areas where profiles overlap. Pseudo-code to do the computation follows:

```
Freeflow = 0;
for (x = 0; x < W; x++)
{
    for (y = 0; y < H; y++)
    {
```

-continued

```
        if (x < LeftProf[y] || W − x < RightProf[y]
            || y < TopProf[x] || H − y < BottomProf[x])
            Freeflow = Freeflow + pixelArea;
    }
}
```

If the total area covered by the content objects (being careful not to double count areas where objects overlap) is ContentArea and area of the page is: PageArea=W*H, the white space free-flow value becomes: $V_{WF}$=(Freeflow+ContentArea)/PageArea.

A white space free-flow measure for the overall document can be defined as an average of the white space free-flow for the individual pages. Non-linear combinations are also possible such as taking the root of the average of powers of the page values.

Other measures of the effect of trapped white space on aesthetics and on document quality are envisioned herein and should be considered within the scope of the present invention, for example, a function of measured responses to differing degrees of trapped white space.

Figure 22:
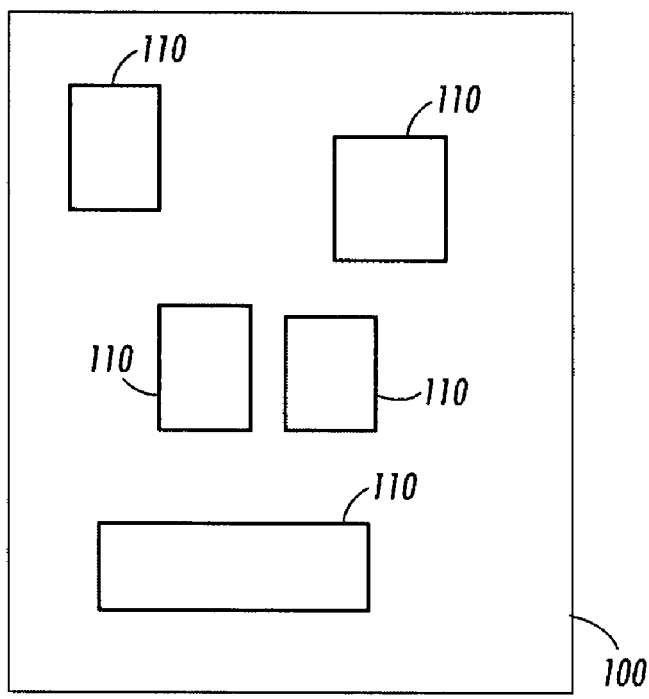
FIGS. 22 to 24 illustrate examples of alignment according to the concepts of the present invention.
Figure 23:
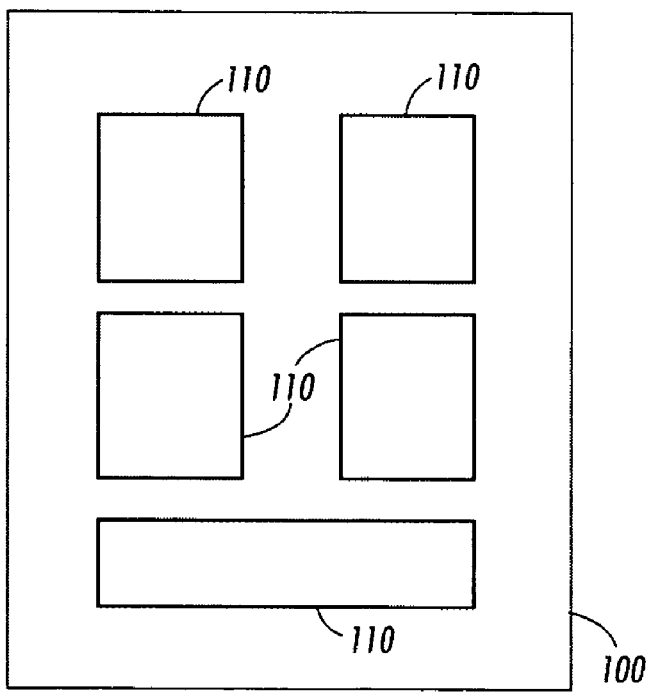
Figure 24:
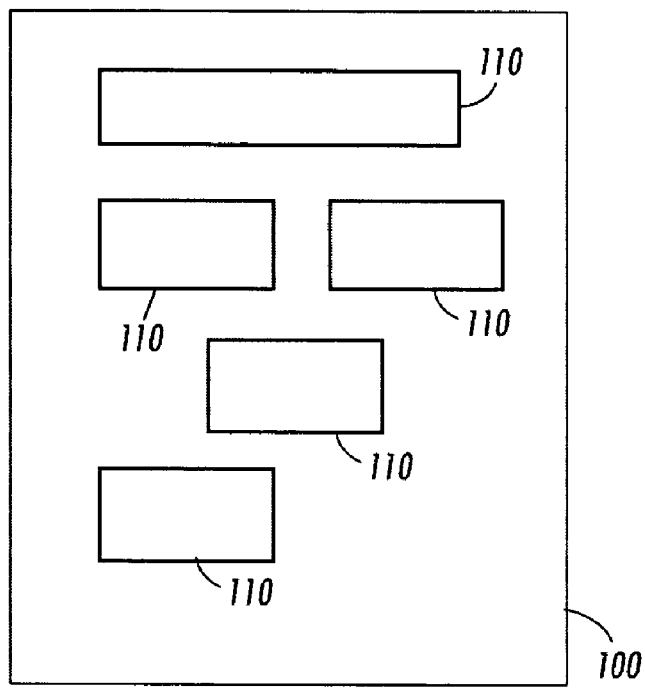

As illustrated in FIGS. 22 to 24, another parameter or factor used in determining aesthetics is the measurement and quantization of the document's alignment.

In a preferred embodiment of the present invention, it is desirable for the content objects to be displayed in an aligned pattern. The alignment might be for all left edges to have the same x value. Alternatively, it might be for all objects to share the same centerline. If right edges are aligned as well as left ones, this is better still. Similarly, rows of objects should be vertically aligned.

FIG. 22 illustrates objects 110 on a page 100 that are poorly aligned. On the other hand, FIG. 23 illustrates objects 110 on a page 100 that are well aligned.

A method for calculating an alignment measure, which can be applied to object's left edges, right edges or horizontal centerlines, is disclosed. The method also applies to tops, bottoms, and vertical centers. Each application yields a different alignment measure. These are then all combined for an overall alignment measure.

The alignment measure can be applied to all content objects, or alternatively, can be applied to a restricted set of objects such as all objects belonging to a logical group in the document structure. Alignment can also be restricted to objects of a given type, such as all paragraphs, or all pictorial images.

Each alignment metric may be built on a page basis and provides a quantifiable indication of how well different components on the page are aligned. With this approach the individual page alignments can be combined to form an alignment measure for the entire document. Alternatively, alignment values can be calculated using document objects across multiple pages. When components are aligned well, then the number given by the metric is one. When components are not aligned well, the metric gives a number smaller than one. Advantageously, changing the position of the components on the page changes this number in a smooth and continuous way.

Figure 25:
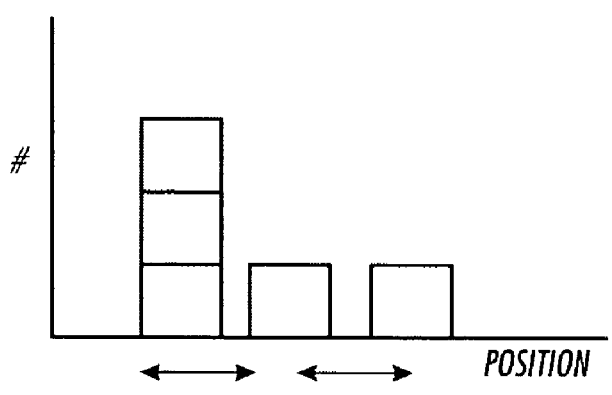
FIG. 25 illustrates an example of quantifiably measuring and graphically plotting alignment with respect to a left edge according to the concepts of the present invention.

To achieve this, first, a histogram of edge (or center) position (FIG. 25) is created reflecting the distance objects 110 on page 100 are from an edge, in the illustration of FIG. 24, the edge is the left edge. The histogram is preferably created at lower resolutions than the actual positioning. This reduces alignment sensitivity as well as saving on memory and computation requirements.

If the histogram array is called EdgeCount, and if the edge position for an object is x, and the resolution reduction factor is b, for each content object EdgeCount[b*x]+=1. Strong alignment will result in most positions contributing to the same histogram element. If one is interested in the alignment of the left edges of objects, the histogram is filled using left-edge positions. Alignments for right, top, or bottom edges and center positions are intended to be calculated similarly.

The alignment measure depends on the distances between neighboring entries in the histogram. The closer together the entries are, the higher the score. This dependence must be non-linear. Otherwise, any moving of an object closer to its neighbor is canceled by the moving of the object away from its neighbor on the other side. The non-linear function used for entries separated by a distance z is: $A/(A+z)$ where A is a constant that controls how fast values fall away from 1 as the distance between entries increases.

If two edges were aligned and the distance separating them was z=0, this yields 1. This provides a contribution for the strength of the entries at that position.

In other words, if a position has n edges contributing, n−1 separations exist between edges of distance zero. As such, there should be a contribution of n−1 from an entry count of n as well as the contribution from the separations between neighboring entry positions. If the total number of components were NumberOfObjects, the maximum contribution, if they were all perfectly aligned, would be NumberOfObjects−1. Divide by this value to normalize the score so that the final result ranges between 0 and 1.

The calculation of the alignment is described by the following:

```
while (EdgeCount[i] is 0)
    i = i + 1;
align = EdgeCount[i] − 1;
for (j = i+1; j < b*W; j++)
    if (EdgeCount[j] is not 0)
        { align = align + A/(A+j−i) + EdgeCount[j] − 1;
          i = j;
        }
align = align / (NumberOfObjects − 1);
```

The above applies to left edges, right edges and center positions to calculate alignment measures referred to as: $align_L$, $align_R$, and $align_C$. The only difference is in which edge values fill the EdgeCount histogram array. The alignment measures for the edges and center are combined in a manner similar to that used to combine the previously discussed balance measures. Thus: $align_H = 1 - (w_L(1-align_L)^{-q} + w_R(1-align_R)^{-q} + w_C(1-align_C)^{-q})^{-1/q}$; where $w_L$, $w_R$, and $w_C$, are weights of the relative importance of each of the three alignments and the exponent 'q' controls how strongly one alignment dominates.

In a similar way, alignment measures are calculated for the top, bottom, and vertically centered positions, referred to herein as: $align_T$, $align_B$, and $align_M$. These are combined into a vertical alignment measure $align_V$. Advantageously, one could combine the horizontal and vertical alignments herewith even though both have already contributed to a measure of document quality. Thus: $V_{alH} = align_H$, and $V_{alV} = align_V$. An overall alignment measure for a page can be defined as a weighted sum of the horizontal and vertical contributions: $V_{al} = w_V V_{alV} + (1-w_V) V_{alH}$.

Figure 26:
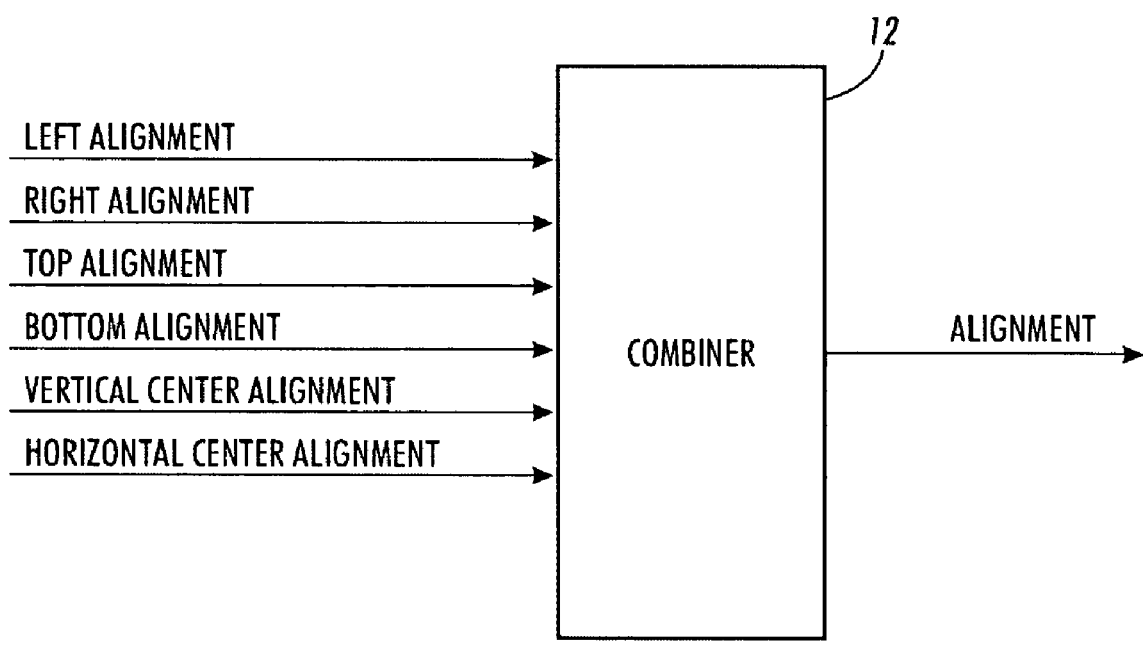
FIG. 26 illustrates a conceptual circuit for quantifiably measuring document alignment according to the concepts of the present invention.

The alignment, as illustrated in FIG. 26, is considered a combination of the left alignment, right alignment, top alignment, bottom alignment, vertical center alignment, and horizontal center alignment values described above. In FIG. 26, the quantized alignment value is derived by a combining of the left alignment, right alignment, top alignment, bottom alignment, vertical center alignment, and horizontal center alignment values using an alignment quantizer or combiner circuit 12.

It is noted that the illustration shows a circuit for the alignment quantization process, this process may also be performed in software by the microprocessor and/or firmware. The quantization is not limited to specific circuits, but any combination of software and/or hardware that is able to carry out the below described methodologies.

An overall document alignment can be formed as a combination of alignment values determined for separate pages. Alternatively, an overall document alignment can be calculated by considering all content objects at once without separating them according to page. When values from separate pages are combined, an average may be used as the combining mechanism, but alternatives are possible. A method of combining that yields a low result if any of the pages have low values may be preferred. Techniques such as taking the reciprocal root of the average of reciprocal powers are an example of such a combining method.

Other measures of the effect of alignment on document aesthetics and on document quality are envisioned herein and should be considered within the scope of the present invention, for example, a function of measured responses to differing degrees of alignment.

As illustrated in FIGS. 27 to 30, another parameter or factor used in determining aesthetics is the measurement and quantization of the document's regularity.

In a preferred embodiment of the present invention, when multiple alignment positions occur, it is best to space those alignment positions in a regular fashion. In other words, it is better if rows and columns of a table have relatively the same heights and widths.

Figure 27:
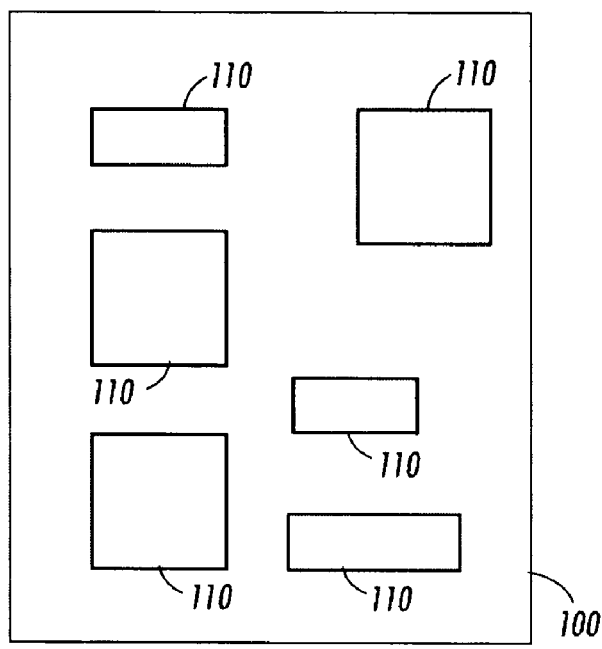
FIGS. 27 to 30 illustrate examples of document regularity according to the concepts of the present invention.
Figure 28:
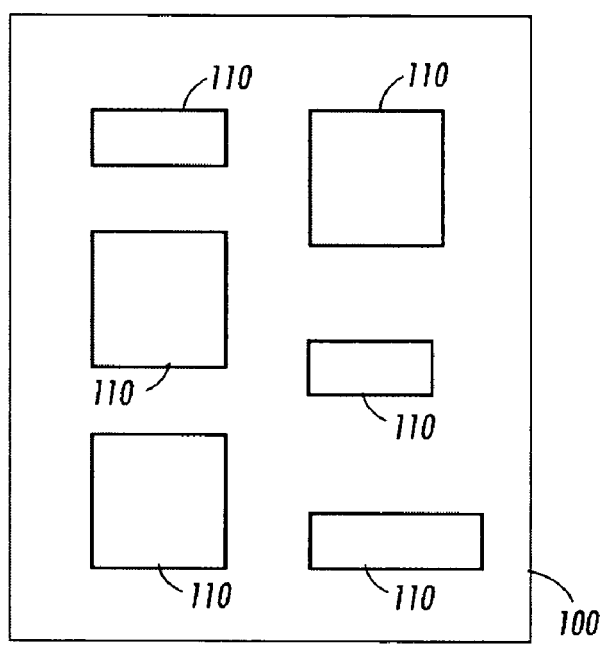
Figure 29:
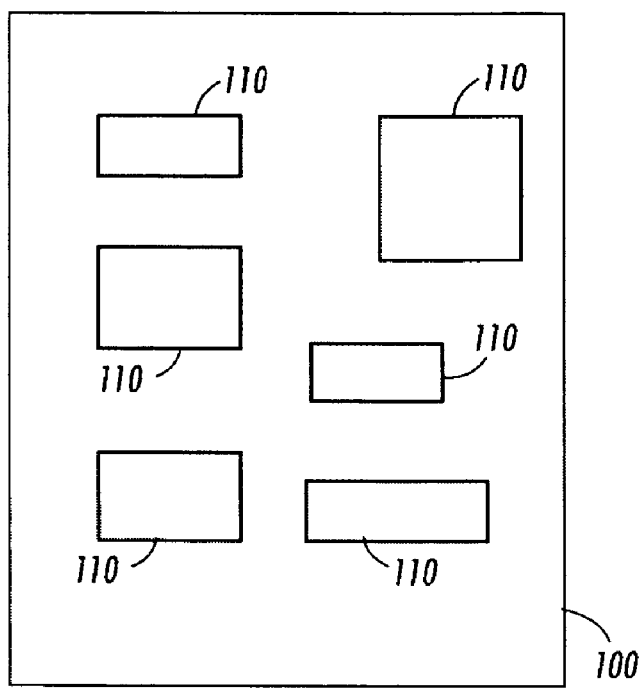
Figure 30:
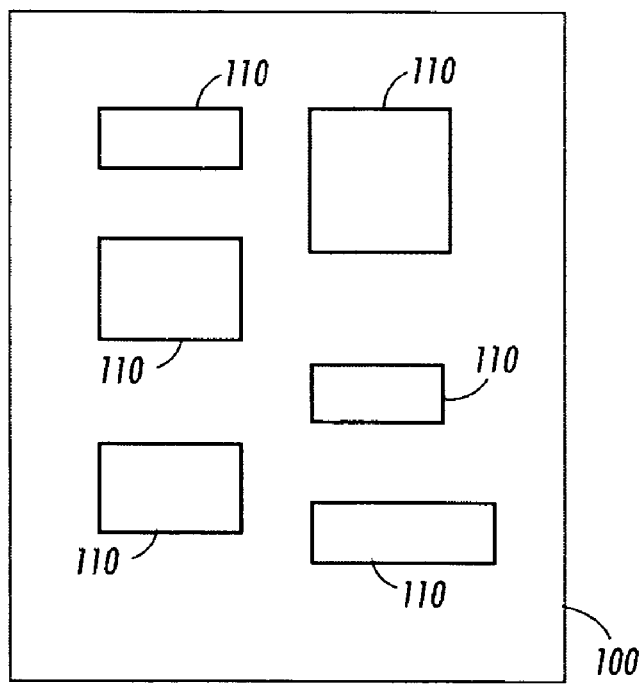

FIG. 27 illustrates an example of low position regularity of objects 110 on page 100, while FIG. 28 illustrates an example of high position regularity of objects 110 on page 100. FIG. 29 illustrates an example of low spacing regularity of objects 110 on page 100, while FIG. 30 illustrates an example of high spacing regularity of objects 110 on page 100.

One way to measure regularity is to identify the neighbors of each object (110) and then consider the distance between corresponding edges of the object and its neighbors (e.g. the left edge of the object and the left edge of its neighbors). But because the identification of neighbors can be expensive, a simpler approximation is often preferred.

If it were assumed that the document has been designed such that objects are strongly aligned, there would be a sharp peak in a histogram of the distances between alignment positions. The alignment positions are the peaks identified in the alignment histogram described above. This processing can be extended to capture distances between alignment peaks and to store them in a new histogram referred to herein as: SepCount

```
if (EdgeCount [0] > EdgeCount [1])
{
    peakCount++;
    SepCount[1]++;
```

-continued

```
            prevPeak = 0;
    }
    else
            prevPeak = -1;
    for (i = 1; i < b*W - 1; i++)
            if (EdgeCount [i-1] < EdgeCount [i] &&
            EdgeCount [i+1] <
EdgeCount [i])
            {
                peakCount++;
                SepCount[i - prevPeak]++;
                prevPeak = i;
            }
            if (EdgeCount [b*W-1] > EdgeCount [b*W-2])
            {
                peakCount++;
                SepCount[i - prevPeak]++;
            }
```

Once the SepCount histogram has been created, process it in the same way as the EdgeCount histogram was processed for alignment with the exception of dividing by peakCount instead of NumberOfObjects.

```
    while (SepCount [i] is 0)
            i = i + 1;
    preg = SepCount [i] - 1;
    for (j = i+1; j < b*W; j++)
            if (SepCount [j] is not 0)
            {
                preg = preg + A/(A+j-i) + SepCount [j] - 1;
                i = j;
            }
    preg = preg / (peakCount - 1);
```

This provides a measure of regularity, but it will be dependent on which alignment measure is used in the extraction of alignment position separations. While all six alignments can be used and the results combined, the left alignment is preferred for determining horizontal regularity and the top alignment is preferred for finding vertical regularity.

Advantageously, these regularity measures can be combined into the document quality measure as: $V_{RH}$ and $V_{RV}$ where $V_{RH}$=preg calculated when EdgeCount is filled with left edge positions and $V_{RV}$=preg calculated when EdgeCount is filled with top edge position. An overall position regularity value can be defined as a weighted sum of the horizontal and vertical contributions.

Other measures of the effect of position regularity on document aesthetics and on document quality are envisioned herein and should be considered within the scope of the present invention, for example, a function of measured responses to differing position regularities.

A uniform separation between objects can also be calculated to determine document quality. This is a measure of spacing regularity preferably calculated in a manner similar to alignment and positional regularity. However, in this instance, the array of data values corresponding to Edge-Count, contains the histogram of spacing values between objects.

To determine spacing values for horizontal spacing regularity for each object, first determine the closest object (if any) that lies to the right and which overlaps in the vertical direction. The spacing then becomes the distance from the right edge of the current object and the left edge of that object's neighbor. A similar calculation determines separations for the vertical direction.

If performance is an issue, an approximation of spacing can be created without the cost of identifying object neighbors by examining arrays of edge positions (as were generated for the alignment calculation). For horizontal spacing, step through the array of right edge positions. For each position determine the first left edge to the right of this location from the left edge array. The separation value becomes the distance between the right and left edge positions. To account for the possibility that more than one object may have an edge at these locations, enter into the histogram the product of the count of edges from the right and left edge histograms at these locations. The sum of these products is then used to normalize the final result instead of NumberOfObjects as in the alignment calculation. The approximate separation count is then given by:

```
    for (i = 0; i < b*W - 1; i++)
    if(LeftEdgeCount [i] !=0)
    {
            j = i + 1;
            while (RightEdgeCount[j] = = 0)
            {
                j = j + 1;
            }
            totalSepCount += LeftEdgeCount[i] * RightEdgeCount[j];
            SpacSepCount[j - i] += LeftEdgeCount[i] * RightEdgeCount[j];
    }
```

Here LeftEdgeCount and RightEdgeCount contain the values of the EdgeCount array when filled with left-edge values and right-edge values respectively. For vertical separations the calculation is analogous with the use of top and bottom edge values. The calculation of the spatial regularity measure would follow as:

```
    while (SpacSepCount [i] is 0)
            i = i + 1;
    sreg = SpacSepCount [i] - 1;
    for (j = i+1; j < b*W; j++)
    if (SpacSepCount [j] is not 0)
            {
                sreg = sreg + A/(A+j-i) + SpacSepCount [j] - 1;
                i = j;
            }
    sreg = sreg / (totalSepCount - 1);
```

An approximation of the vertical spacing histogram is determined in the same manner using the top and bottom edge-position arrays. Advantageously, regularity measures can be combined into the document quality measure as: $V_{SH}$ and $V_{SV}$ where $V_{SH}$=sreg when SpacSepCount is computed from left and right edges, while Vsv=sreg when SpacSep-Count is computed from top and bottom edges. An overall separation regularity measure can be defined as the weighted sum of the horizontal and vertical contributions.

Other measures of the effect of spacing regularity on document aesthetics and on document quality are envisioned herein and should be considered within the scope of the present invention, for example, a function of measured responses to differing spacing regularities.

Figure 31:
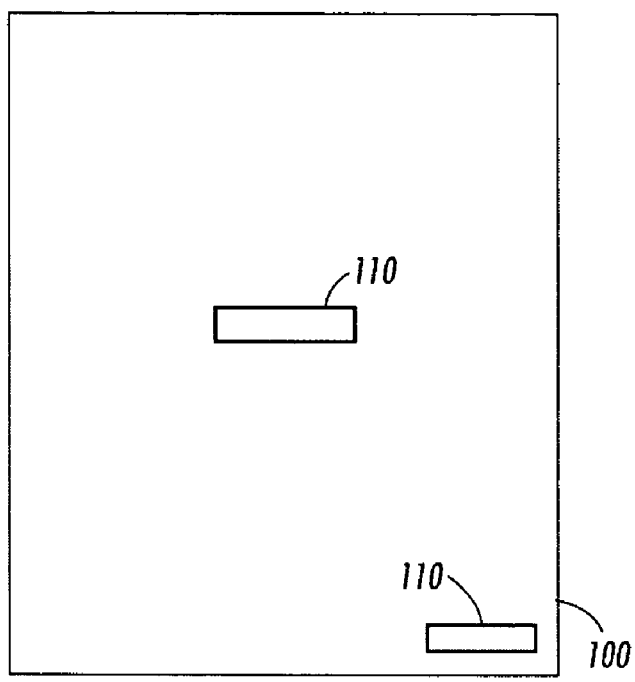
FIG. 31 illustrates an example of page security according to the concepts of the present invention.

As illustrated in FIG. 31, another parameter or factor used in determining aesthetics is the measurement and quantization of the document's page security.

In a preferred embodiment of the present invention, it is preferred that small objects 110 not be positioned at or near the edge of a page 100 as they appear insecure and could fall off. This is particularly true of objects such as page numbers placed outside of the margins.

To quantify the page security of an object, the distance from its center to each of the page edges is determined. The distance may be weighted by which edge is used since an object may appear less secure near a bottom edge than at the top edge. The minimum weighted-distance should be preserved.

If the object center is at $(x_i, y_i)$ and the page size is defined by W×H, for each object, calculate: $ps_i = \min(s_L x_i, s_T y_i, s_R (W-x_i), s_B (H-y_i))$; where $s_L$, $s_T$, $s_R$, and $s_B$ are the left, top right and bottom edge weights. An overall page security value is defined as the minimum of all the object values for the page $PS = \min(ps_i)$. Most objects will appear fine when there is some threshold distance T beyond which one should get a value of 1 for the property. To adjust the measure for this behavior, calculate: $V_{ps} = \min(1, PS*T^{-1})$.

Other measures of the effect of object position on document aesthetics and on document quality are envisioned herein and should be considered within the scope of the present invention, for example, a function of measured responses to differing positions e.g., insecurity of objects positioned near page edges.

Figure 32:
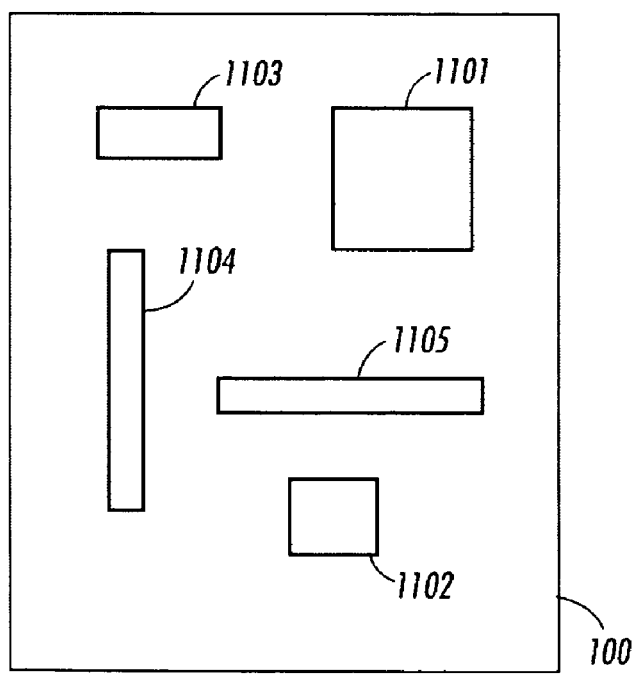
FIG. 32 illustrates an example of page proportionality according to the concepts of the present invention.

As illustrated in FIG. 32, another parameter or factor used in determining aesthetics is the measurement and quantization of the document's optimal proportionality.

In a preferred embodiment of the present invention, certain proportions are more pleasing than others. An aspect ratio between width and height of $R = 2/(1+\sqrt{5}) = 0.618\ldots$ is often ideal. The ratio of width and height of the content on a page is determined and compared to this ratio.

For width and height, the bounding box of the content (1101, 1102, 1103, 1104, and 1105) is preferred. The bounding box is calculated as follows: Step through the content objects and find the minimum left edge, the maximum right edge, and (measuring top down) the minimum top edge and maximum bottom edge. The width is the difference between the maximum right edge and minimum left edge. The height is the difference between the minimum top edge and maximum bottom edge.

Next, determine whether the width or height is the smaller and divide the smaller by the larger to get the aspect ratio A. The absolute difference from the ideal ratio R and scale can be determined to get a number between 0 and 1 as follows: $Var = 1 - |A-R|/R$.

In FIG. 32, object 1101 has a good proportionality or aspect ratio, while object 1102 has a poor proportionality or aspect ratio.

Other measures of the effect of aspect ratio on document aesthetics and on document quality are envisioned herein and should be considered within the scope of the present invention, for example, a function from measured human responses to differing aspect ratios.

Other quantifiable features that contribute to the aesthetics of a document and thereby to the document quality are possible. The particular embodiments describe here are meant to illustrate how a quantifiable aesthetic measure can be constructed and how either directly, or through the aesthetics, they contribute to document quality. Their identification should not rule out the use of other features as appropriate.

Ease of Use

Figure 35:
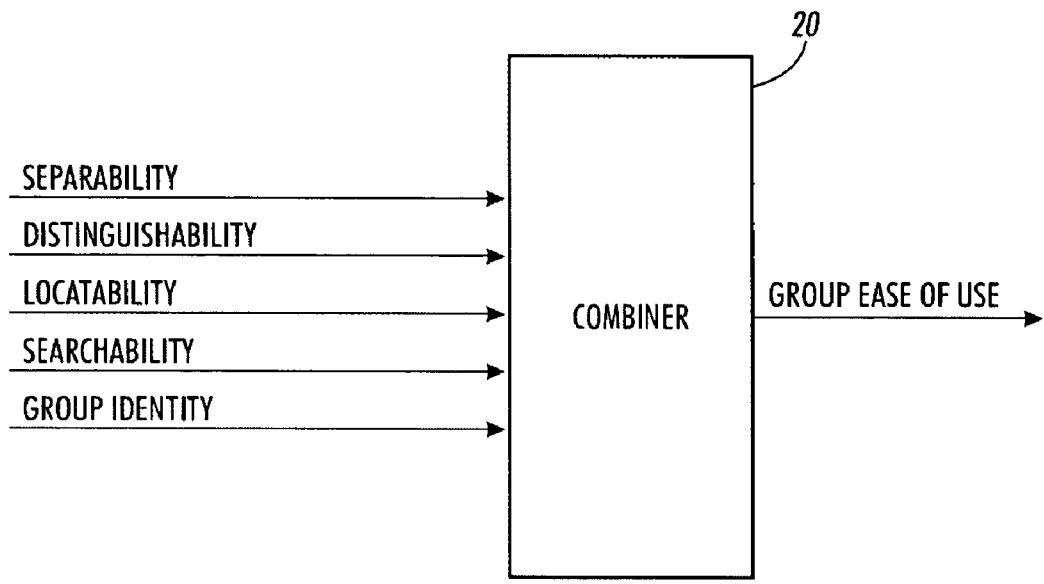
FIG. 35 illustrates a conceptual circuit for quantifiably measuring group ease of use according to the concepts of the present invention.

For the case of document ease of use, the methods herein are used to generate quantifiable values for the contributing features of: separability, distinguishability, locatablility, searchability, and/or group identity. As illustrated in FIG. 35, a combining circuit 20 (the ease of use quantizer 20 of FIG. 1) receives measured and/or calculated quantized values representing separability, distinguishability, locatablility, searchability, and/or group identity and processes these values based upon a predetermined algorithm so as to generate an ease of use quantization value for the document or portion of the document being analyzed.

Each value thereof is based on properties inherent in the document itself The values are individually combined into an overall value or score for the document. Other methods for measuring, assigning, or otherwise associating a quantifiable value for document quality should be considered within the scope of the present invention; such that the present invention is directed to not only in the particular methods put forth, but also in the much broader concept of determining a value for document quality.

In a preferred embodiment of the present invention, each rule is defined to produce a value ranging between 0 and 1 such that 0 means low value and 1 means high value. This enables quantized quality values to be calculated and combined to form the overall document quality measure.

If $V_i$ is the value calculated for the $i^{th}$ rule, the document quality measure $V_A$ is formed as a function E of these contributions such that: $V_{EU} = E(V_1, V_2, \ldots V_N)$. The combining function E can be as simple as a weighted average of the contributions. However, because any bad contributor can ruin the document quality no matter how good the others are, a linear combination is not preferred.

An alternative is: $V_{EU} = (\Sigma w_i(V_i)^{-p})^{-1/p}$. In a preferred embodiment, the $w_i$ factors are weights that specify the relative importance of each rule and should sum to one. The exponent 'p' introduces a non-linearity that can make one bad value overwhelm many good ones. The larger the value of the exponent 'p' is, the greater this effect A further alternative is: $V_{EU} = (\Sigma w_i(d+V_i)^{-p})^{-1/p} - d$. The $w_i$ factors are weights that specify the relative importance of each rule and should sum to one. The exponent 'p' introduces a non-linearity that can make one bad value overwhelm many good ones. The parameter d is a number slightly larger than 0. The larger the value of the exponent 'p' is, the greater this effect.

Other combining functions are, for example, the product of the contributions. If weighting of the contribution is desired, this can be achieved by: $V_{EU} = \Pi V_i^{wi'}$.

It is noted that the illustrations show circuits or circuit for the ease-of-use quantization process, this process may also be performed in software by the microprocessor and/or firmware. The quantization is not limited to specific circuits, but any combination of software and/or hardware that is able to carry out the below described methodologies.

As with the measurement of aesthetics, the measurement of ease of use requires the identification of quantifiable features that contribute to the ease of use. Examples of methods to measure and combine such features are provided.

The features first considered are those that relate to the logical structure of the document, that is, to the organization of the document content into group. In evaluating document quality, content objects of interest need to be identified as to what kind of content these objects are, (e.g., images, paragraphs, headings, titles, blocks, borders, lists, tables, etc.).

This of course will be highly dependent upon the kind of document the document's creator or developer either envisions, or is creating, or has already created.

Figure 33:
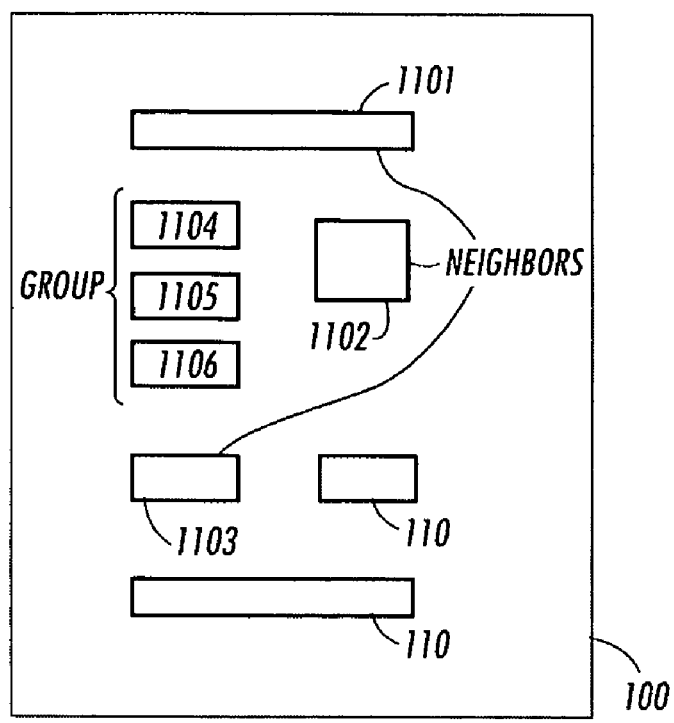
FIG. 33 illustrates an example of separability according to the concepts of the present invention.
Figure 34:
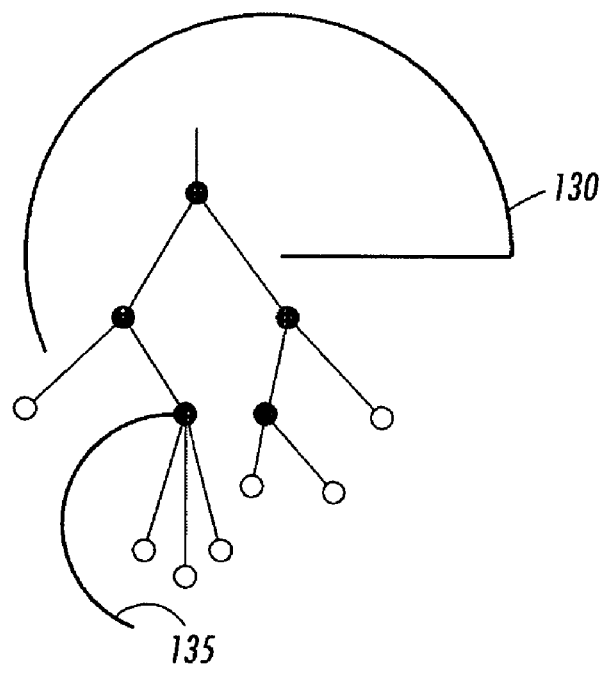
FIG. 34 illustrates an example of group identity according to the concepts of the present invention.

Once the document content of interest has been identified, content needs to be characterized, as illustrated in FIG. 33, as to how content is intended to be grouped such that content can be distinguished from other content, from other content groups, from other content group members (1104, 1105, 1106) or elements, and from neighboring content (1101, 1102, 1103). This can be effectuated by parsing content objects of interest into a tree structure of content, as illustrated in FIG. 34, wherein nodes 135 of the content tree are content groups (i.e., lists, tables, etc.) and leaves of the branches 130 of the content tree are content elements (i.e., paragraphs, images, and the like). It should be understood that one skilled in this art would readily understand the creating of content trees, branches, nodes, etc., along with how to traverse the tree preferably in a computer science context.

Once a content tree has been created, content which is neighboring the content object(s) of interest need to be identified. One procedure takes the content tree and traverses up the tree and identifies neighboring branches thereof Another then moves down the content tree examining elements on the identified neighboring branches. In such a manner, content neighboring the content of interest can be identified.

First a neighbor list associated with content group G is initialized to an empty list. The content tree is traversed upward to identify branches neighboring content group G. The content tree is then traversed downward such that elements of the identified content branches can be examined. Branches are pruned that are considered to exceed a predetermined distance from the node of the group G. Only branches considered as 'nearby' are recursively analyzed. Although the process described herein involves identifying neighbors N of group G, it should be understood that nothing requires group G to actually comprise a group of content as group G can be a single element (paragraphs, images, etc.) of content.

The procedure IsNeighbor(G,N) is used herein to ascertain whether or not a node N is within a threshold distance of content group G, such that node N is to be considered a neighbor N of group G. This can be readily effectuated by calculating a distance between group G and neighbor N and comparing that distance to a threshold variable CloseEnough so as to determine whether Distance(G,N)<CloseEnough.

Distance can be the distance between content borders or alternatively the distance between content centers. With respect to the former, if the content centers of group G are $(x_G, y_G)$ and neighbor N are $(x_N, y_N)$ and the widths and heights of group G and neighbor N are $(w_G, h_G)$ and $(w_N, h_N)$ respectively, then distance can be readily computed by the relationship of: $\max(\text{abs}(x_G-x_N)-(w_G+w_N)/2, 0)+\max(\text{abs}(y_G-y_N)-(h_G+h_N)/2, 0)$. More complex distance calculations such as minimum Euclidean distance between corners can also be used.

The threshold CloseEnough can either be a constant or be adjustable with respect to content size. One can use the square root of the area of object G to determine a threshold value such that: $\text{CloseEnough}=(\text{Area}(G))^{1/2}$. This also can be scaled by factor S where S is typically close to 1 such that: $\text{CloseEnough}=S*(\text{Area}(G))^{1/2}$.

The methods provided for evaluating distance or determining threshold are not to be considered as limiting in scope. Other methods for determining a distance measure for content objects should be considered within the scope of the present invention; such that the present invention is directed to the much broader concept of using a measure of distance between content objects in the context of evaluating document quality.

The following pseudo-code illustrates how the content tree can be traversed. It should be understood that pseudocode provided herein is illustrative, and as such, is intended to be modified by one skilled in the art of computer science and programming without undo experimentation to effectuate implementation hereof in one's own system. Note that group G is the content currently under examination, C is a node, P is a node, and N is used as a convenience index to identify the node being examined.

```
TraverseUp(G, C)
{
    if node C is the root node then return /* done */
    P = parent(C)
    for each child node N of parent P
        if child N is different from C then
            TraverseDown(G, N)
    TraverseUp(G, P)
    return
}
TraverseDown(G, N)
{
    if IsNeighbor(G, N)
        then add node N to the list of neighbors of group G
        otherwise return
    if node N is not a leaf node
        then for each child C of node N
            TraverseDown(G, C)
    return
}
```

The depth in the tree of neighbor node N relative to content group G can be obtained by adding a depth d parameter wherein d+1 is passed in the recursive call to TraverseUp and wherein depth d−1 is passed in the recursive call to TraverseDown. The initial value of depth for d would be zero, i.e., TraverseUp(G, G, 0). Depth can be stored along with other information on the previously described list of neighbor nodes of group G.

Once the document's content has been parsed and neighboring content has been identified for all content objects of interest, various properties respecting content separation can then be determined which will be subsequently used to quantify document quality.

As illustrated in FIGS. 36 to 41, another parameter or factor used in determining ease of use is the measurement and quantization of the document's separability.

In a preferred embodiment of the present invention, a document's degree of overall separability can be ascertained by determining the degree of total separability for the document's content objects of interest contained therein. Individual measures for content object separation includes: spatial separation (FIG. 37), alignment separation (FIG. 38), style separation (FIG. 39), background separation (FIG. 40), and inherent separation (FIG. 41), among others.

Figure 36:
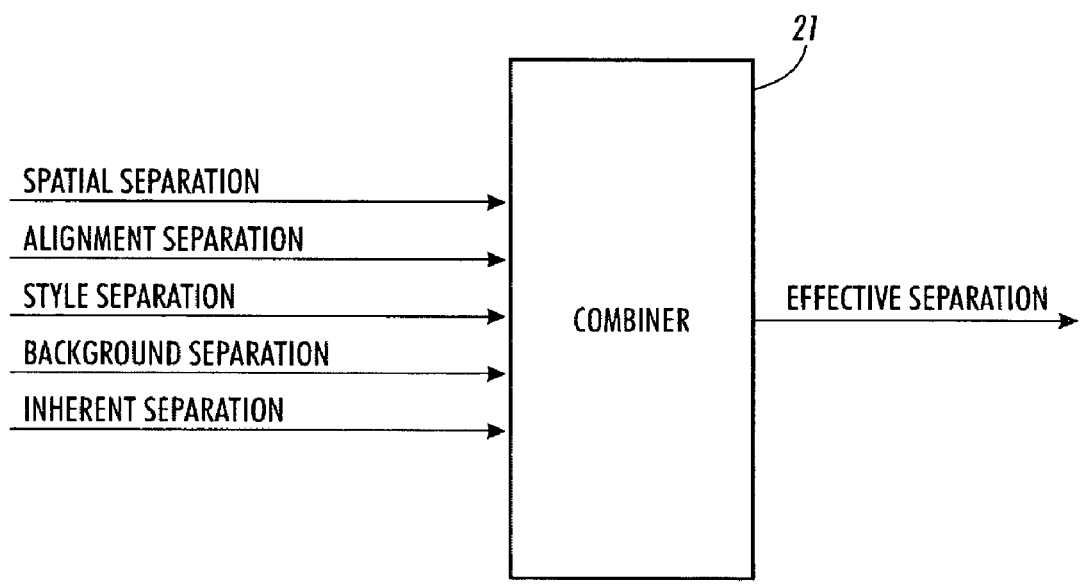
FIG. 36 illustrates a conceptual circuit for quantifiably measuring effective separation according to the concepts of the present invention.

A combination of separation measures, as illustrated in FIG. 36, for content is then useful in evaluating the document content's degree of effective separation of content. Effective separation is useful in evaluating the document content's degree of total separation of content, which, in turn, is useful in evaluating the document's degree or measure of overall separation. Overall separation is subsequently used in assessing document quality.

More specifically, the effective separability, as illustrated in FIG. 36, is considered a combination of the spatial separation, alignment separation, style separation, background separation, and/or inherent separation. In FIG. 36, the quantized alignment value is derived by a combining of the spatial separation, alignment separation, style separation, background separation, and/or inherent separation using an effective separability quantizer or combiner circuit 21.

It is noted that the illustration shows a circuit for the effective separability quantization process, this process may also be performed in software by the microprocessor and/or firmware. The quantization is not limited to specific circuits, but any combination of software and/or hardware that is able to carry out the below described methodologies.

Figure 37:
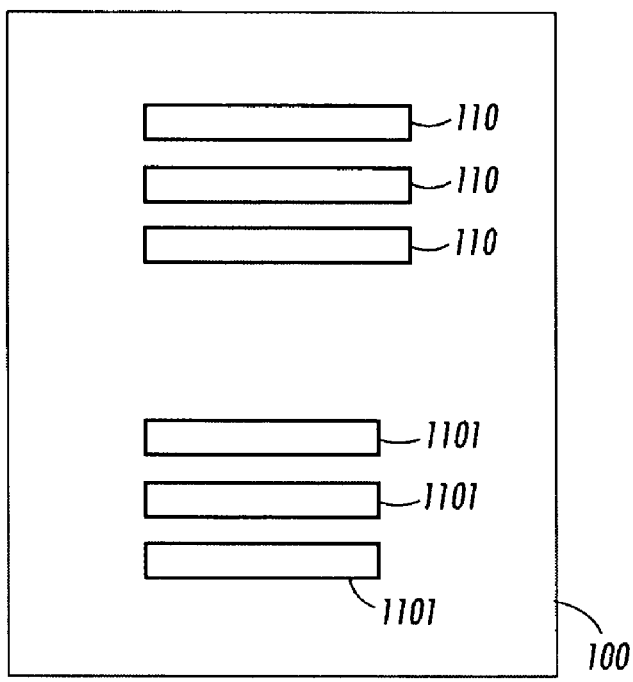
FIGS. 37 to 41 illustrate examples of separation according to the concepts of the present invention.

As illustrated in FIG. 37, another parameter or factor used in determining ease of use is the measurement and quantization of the document's spatial separation.

In a preferred embodiment of the present invention, the spatial separation (SpatialSep) for a group or element can be the minimum of the separation distance between the group or element and each identified neighbors. Using the dimensions of the bounding boxes, (i.e., center position, width, and height) of the content under evaluation, spatial separation can be distances between horizontal and vertical components with a floor of zero. This can be further normalized to yield a value between 0 and 1 by scaling with a maximum separation factor, (e.g., scaling by width ($W_p$) and height ($H_p$) of the page) such that: $(\max(\text{abs}(x_G-x_N)-(w_G+w_N)/2, 0)/W_p + \max(\text{abs}(y_G-y_N)-(h_G+h_N)/2,0)/H_p)/2$.

The particular method provided for evaluating spatial distances between content objects are exemplary and are not to be considered as limiting in scope. Other methods should be considered within the scope of the present invention, for example, a function of measured human responses to differing spatial separations; such that the present invention is directed to the much broader concept of using a measure of spatial separation of content objects in a determination of total separability in the context of evaluating document quality.

Figure 38:
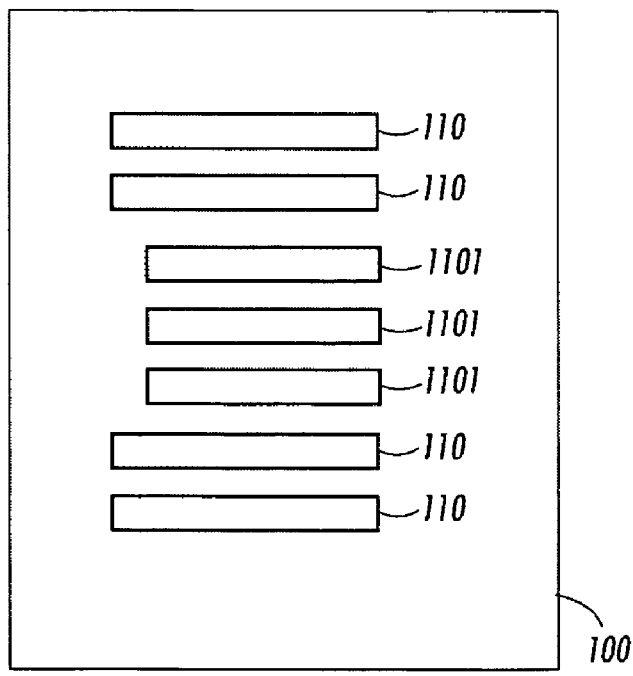

As illustrated in FIG. 38, another parameter or factor used in determining ease of use is the measurement and quantization of the document's alignment separation.

In a preferred embodiment of the present invention, alignment separation, as used herein, means that one or more positions of object G on a particular page matches a corresponding position of neighboring content N. Alignment separation is how well content avoids having corresponding positional matches within a page. Using the left, right, top, bottom ($x_{GL}$, $x_{GR}$, $y_{GT}$, $y_{GB}$) page position of group G (110) and the ($x_{NL}$, $x_{NR}$, $y_{NT}$, $y_{NB}$) page position of neighbor N (1101), alignment separation is the minimum of the absolute differences of their corresponding positions, given by: $\min(\text{abs}(x_{GL}-x_{NL}), \text{abs}(x_{GR}-x_{NR}), \text{abs}(y_{GT}-y_{NT}), \text{abs}(y_{GB}-y_{NB}))$.

Alignment separation can be further normalized to a value between 0 and 1 by dividing by a maximum possible difference in positions (page width $W_p$ and page height $H_p$) of the document page upon which the content resides as expressed by: $\min(\text{abs}(x_{GL}-x_{NL})/W_p, \text{abs}(x_{GR}-x_{NR})/W_p, \text{abs}(y_{GT}-y_{NT})/H_p, \text{abs}(y_{GB}-y_{NB})/H_p)$.

Alternatively, alignment separation can be measured by the sum of the alignment separations between multiple edges as given by: $\min((\text{abs}(x_{GL}-x_{NL})+\text{abs}(x_{GR}-x_{NR}))/W_p, (\text{abs}(y_{GT}-y_{NT})+\text{abs}(y_{GB}-y_{NB}))/H_p)$. Alternatively, $\min(\max(\text{abs}(x_{GL}-x_{NL})/W_p, \text{abs}(x_{GR}-x_{NR})/W_p), \max(\text{abs}(y_{GT}-y_{NT})/H_p, \text{abs}(y_{GB}-y_{NB})/H_p))$.

The methods for evaluating alignment and alignment separation herein are exemplary and are not to be considered as limiting in scope. Other methods should be considered within the scope of the present invention, for example, a function of measured human responses to differing alignment separation amounts; such that the present invention is directed to the much broader concept of using a measure of alignment separation of content objects in a determination of total separability in the context of evaluating document ease of use and document quality.

Figure 39:
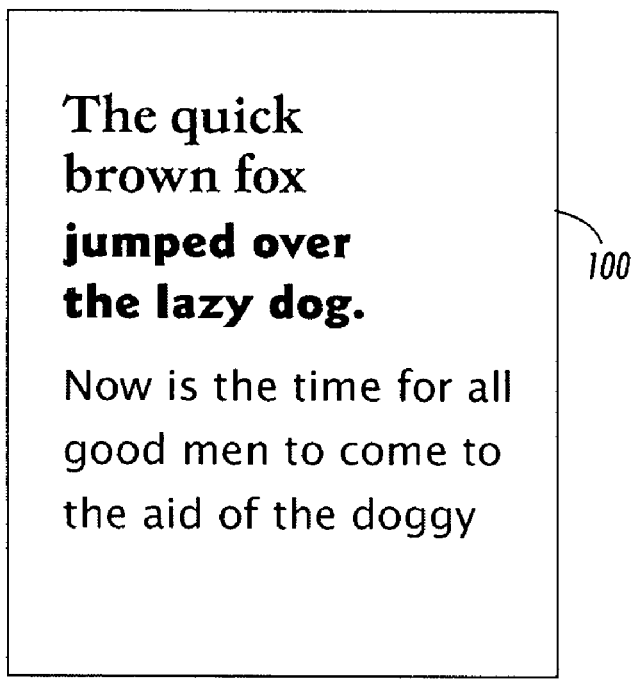

As illustrated in FIG. 39, another parameter or factor used in determining ease of use is the measurement and quantization of the document's style separation.

In a preferred embodiment of the present invention, style separation (StyleSep) is used herein to provide a means by which objects can be further distinguished. To obtain the degree of style separation, content types need to be compared against every other style type and a value assigned for the amount of style separation therebetween. The assignment of such a value would be made as a judgment call by the document developer. For example, one document developer may consider it easier to distinguish TEXT from an IMAGE than it is to distinguish a LIST from a TABLE. Thus, that developer would assign a much smaller style separation value for types LIST vs. TABLE because it is much more difficult to distinguish between these two types of content.

In other words, the degree of style separation is small. Whereas, with regard to the TEXT vs. IMAGE as previously mentioned, the developer may consider it much easier to distinguish between these two types of content. Thus, separations in style is high so type TEXT vs. type IMAGE would be assigned a high value in the table of style separations, e.g., TypeSepTable, which is preferably multi-dimensional and indexed by type.

The table of style separation values (TypeSepTable) contains a value for all types vs. all other types. For instance, content type IMAGE would be assigned a style separation value against all other types of content (e.g., TEXT, IMAGE, GRAPHIC, LIST, TABLE, etc.). As mentioned, the IMAGE vs. TEXT types would have one value for their degree of style separation. The IMAGE vs. GRAPHIC types would have a value for their respective degree of style separation. All types would be stored in a manner, which renders the value for the degree of style separation between two content types readily retrievable.

Once the style separation table has been generated, the value for the separation of style between content group object G and identified neighbor N is readily retrieved from the table of separation values by a function, referred to herein as type ( ), which returns a number for content type. The pre-determined value for the separation between two content types would be retrieved from the table of style separation values by the function's returning a value for type(G) and type(N). In this instance, StyleSep=TypeSepTable[type(G)][type(N)].

When the two objects are both the same type, then one can compare the style values of one object to the corresponding style value of the other. For each style value pair one can calculate a style difference. For numeric parameters such as font size, line spacing, the style difference can be calculated as just the absolute difference of the size values. For multidimensional values such as color, the style difference can be the distance between the values. For enumerated values such as quadding, font family or font style one can use a two-dimensional look-up table indexed by the enumerated values for the two objects to retrieve difference. An overall style separation difference becomes the weighted sum of the various style differences available for the object type. For example: StyleSep=$\Sigma w_i d_i(G, N)$; where the sum is over available style parameters i, and $w_i$ is the weight of the $i^{th}$ style parameter, and $d_i$ is the difference measure for the $i^{th}$ style parameter.

The particular methods for evaluating style separation herein are exemplary and are not to be considered as limiting in scope. Other methods for determining style separation should be considered within the scope of the present invention, for example, a function of measured human responses to differing styles; such that the present invention is directed to not only in the particular method of determining style separation, but also in the much broader concept of using a measure of style separation in a determination of content separability in the context of evaluating document ease of use and document quality.

Figure 40:
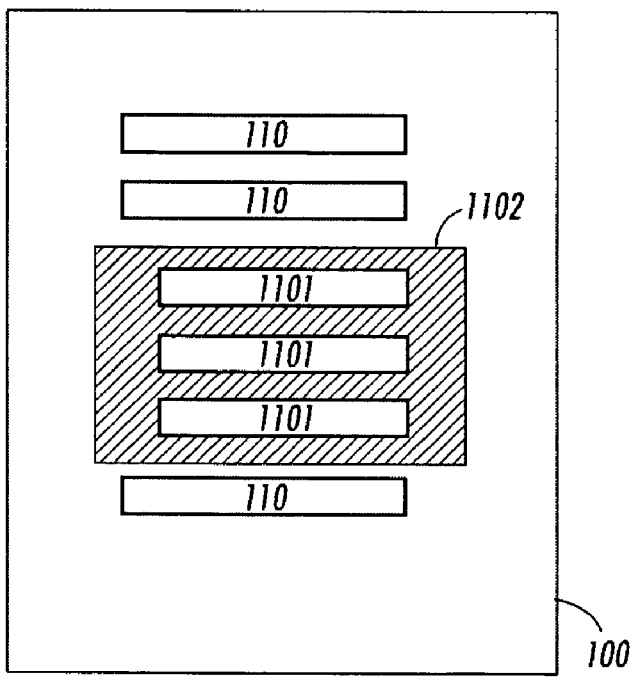

As illustrated in FIG. 40, another parameter or factor used in determining ease of use is the measurement and quantization of the document's background separation.

In a preferred embodiment of the present invention, objects on different color backgrounds can be considered separate and distinct. Thus, background separation can be thought of as the difference in backgrounds 1102 of two objects (110 and 1101). If, for instance, background color 1102 is a style parameter of the object G (1101) or one of its ancestors, the content tree is searched upward until the first object with a specified background is found. The following pseudocode illustrates this.

```
FindBackground(G)
{
    if G specifies a background color
        then return that color
        otherwise
            if G is the root of the content tree
                then return the default background color (e.g. white)
                otherwise
                    return FindBackground( parent(G) )
}
```

If, on the other hand, backgrounds are content objects, such as rectangles that are members of the same group (or perhaps a parent group) as the object in question, another search has to be done. The pseudocode is as follows:

```
FindBackground(G, C)
{
    if C is the root of the content tree
        then return the default background color (e.g. white)
    P = parent(C)
    for each child K of P
        if K is different from C and K is a rectangle and K encloses G
            then return the color of K
    return FindBackground(G, P)
}
```

The test for K enclosing G can be performed, for example, using the bounding box for K and G to ensure that the corners of the bounding box of G are within the corners of the K box.

Once the backgrounds for two objects have been determined, a difference measure can be derived. Differences in color can be determined using the distance in a color space that strives for visual uniformity such as L*a*b* coordinates. Other color spaces can be used as well.

The measure of background separation should not be just distance between colors in color space because once the colors are sufficiently different to easily tell apart, further differences between them does nothing to increase separability. What is preferred is a function of distance that is 1 for all values of color difference except those close to zero. One way to obtain this is by scaling color difference Dc by a large factor and then clamping the results to 1

For example: BackgroundSep=min(s*Dc,1). An alternative is to take the $n^{th}$ root of the difference value to limit the color difference Dc to the range 0 to 1. For example: BackgroundSep=$Dc^{1/r}$. Here, the larger the value of r is, the more closely the colors have to match before they fail to provide background separation.

The particular methods for evaluating background separation herein are exemplary and are not to be considered as limiting in scope. Other methods for determining background separation should be considered within the scope of the present invention, for example, a function of measured human responses to differing backgrounds; such that the present invention is directed to not only in the particular method of computing background separation, but also in the much broader concept of using a measure of background separation in a determination of content separability in the context of evaluating document ease of use and document quality.

Figure 41:
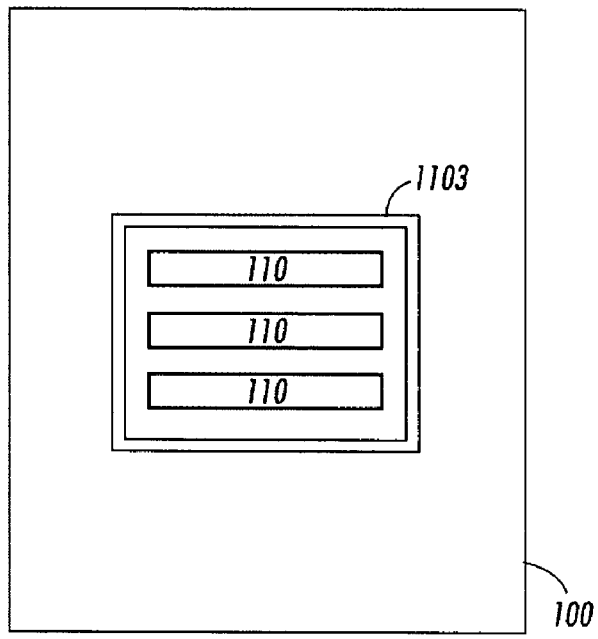
Figure 42:
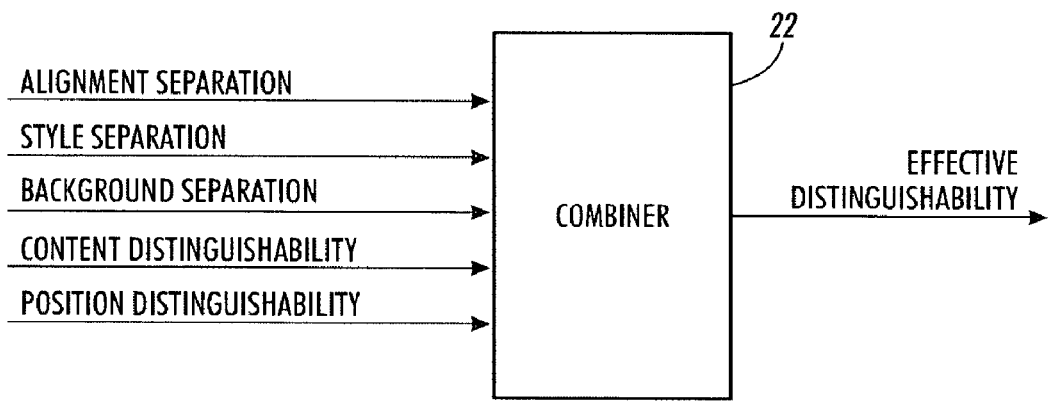
FIG. 42 illustrates a conceptual circuit for quantifiably measuring effective distinguishability according to the concepts of the present invention.

As illustrated in FIG. 41, another parameter or factor used in determining ease of use is the measurement and quantization of the document's inherent separation.

In a preferred embodiment of the present invention, often features are constructed into content objects. Such features are considered inherent to the object itself. An example is an object's border 1103 or an indented first line or other feature that inherently indicates a separation from other objects. Spacing before the paragraph or after the paragraph that is different from the internal line spacing, can also signal a separation. Further, some separators only serve to distinguish on a single boundary, i.e., indicating separation at the top but not at the sides.

As such, to calculate inherent separation, each of the four sides of the object under scrutiny needs to be considered separately. For instance, suppose $w_i$ is a weight that describes the relative importance of the $i^{th}$ feature to the top boundary $fTop_i(G)$. These weights should sum to 1. And, suppose a parameter P determines how strongly a successful separation feature overwhelms other features, and there is a constant c that should be close to 1 but may be slightly larger to avoid division by 0. Then, inherent separation can be defined by: InherentSepTop=$c-[\Sigma w_i*(c-fTop_i(G))^{-P}]^{-1/P}$. Similar expressions define the inherent separation for InherentSepBottom, InherentSepLeft, and InherentSepRight.

One of these InherentSep values may be more appropriate for neighbor N depending upon whether N is mostly above, below, left, or right of object G. For example, given:

$$q1 = w_G*(y_N-y_G)+h_G*(x_N-x_G)) \text{ and}$$

$$q2 = w_G*(y_N-y_G)-h_G*(x_N-x_G) \text{ then:}$$

if q1>0 then if q2>0 then
use InherentSepTop
otherwise
use InherentSepRight
otherwise if q2>0 then
use InherentSepLeft
otherwise
use InherentSepBottom.

Note that neighbor N will also have an inherent separation. Thus, the complementary inherent separations from both object G and neighbor N can be combined as well. For example, if neighbor N is substantially above object G, then use the sum of InherentSepTop of G and InherentSepBottom of N. Alternatively, the maximum of the complementary inherent separations from G and N can be used. The InherentSep from a neighbor is one of the top, bottom, left or right Inherent Separations as chosen above.

The particular methods for evaluating inherent separation herein are exemplary and are not to be considered as limiting in scope. Other methods for determining inherent separation should be considered within the scope of the present invention, for example, a function of measured human responses to differing inherent separation features; such that the present invention is directed to not only in the particular method of computing inherent separation, but also in the much broader concept of using a measure of inherent separation in a determination of content separability in the context of evaluating document ease of use and document quality.

As illustrated in FIG. 36, another parameter or factor used in determining ease of use is the measurement and quantization of the document's effective separation.

In a preferred embodiment of the present invention, contributions to the measure of separability can be combined to form the content object's degree of Effective Separation (EffectiveSep) from a particular neighbor is given by: EffectiveSep=c−[$w^{-p}*(c-SpatialSep)^{-p}+w_a*(c-AlignmentSep)^{-p}+w_S*(c-StyleSep)^{-p}+w_b*(c-BackgroundSep)^{-p}+w_n*(c-InherentSep)^{-p}]^{-1/p}$ where terms $w_x$, $w_a$, $w_s$, $w_b$ and $w_n$ are weights that sum to 1. While other methods of combining the individual separation measures are possible, this has the property that if any of the separation values between object G and neighbor N is close to 1, the Effective Separation will also be close to 1.

The particular method for evaluating effective separation herein is exemplary and not to be considered as limiting in scope. Other methods for determining effective separation should be considered within the scope of the present invention, for example, a function of measured human responses to differing separation devices; such that the present invention is directed to not only in the particular method of determining effective separation, but also in the much broader concept of using a measure of effective separation of content in a determination of content separability in the content of evaluating document ease of use and document quality.

In a preferred embodiment of the present invention, to obtain an overall measure of total separation, an object's total separation from all neighbors, a determination of the minimum of the effective separations between object G, and all its neighbors has to be made.

In this embodiment, this means combining separation values for each neighbor. Total separation can be given by: TotalSep=$min_i$(EffectiveSep$_i$); where EffectiveSep$_i$ is the EffectiveSep value for the i$^{th}$ neighbor, and the minimum is taken over all neighbors. Alternatives with average separations are also envisioned. An averaging method that gives the greatest weight to the closest distance can be defined by the reciprocal root of the sum of reciprocal powers. For example: TotalSep=$[(1/n)*\Sigma(c+EffectiveSepi)^{-p}]^{-1/p}-c$. Here, n is the number of neighbors, c is a small constant to guard against division by zero, and the power p determines how strongly small separations dominate. If an object has no neighbors then its TotalSep value should be 1.

The particular methods for evaluating total separation as provided herein are exemplary and are not to be considered as limiting in scope. Other methods for determining total separation should be considered within the scope of the present invention; such that the present invention is directed to not only in the-method of determining total content separation but in the much broader concept of using a measure of total separation of document content in the evaluation of a document's quality.

An overall separability measure for a document is determined by combining total separations for all document content objects and groups. This can be by a straight average. Although, any object or group with a low separability value may adversely impact the value for the entire document, and therefore, should be given a higher weight by combining as the root of powers.

The particular methods for evaluating overall separability as provided herein are exemplary and are not to be considered as limiting in scope. Other methods for determining overall separability should be considered within the scope of the present invention; such that the present invention is directed to not only in the method of determining overall separability but also in the much broader concept of using a measure of overall separability of document content in the evaluation of a document's ease of use and a document's quality.

Separability may vary with level in the content tree hierarchy in which an object exists. An algorithm for computing separability by recursively traversing the content tree is provided herein which calculates a weighted average using weights $w_L$ which vary with content's tree level L. The following pseudocode is provided by way of example.

```
Separability(G)
{
    if G is a leaf node
        then return TotalSep(G)
    otherwise
        for each child C of G
            call Separability(C) and find the average of these values A
        return w_L * TotalSep(G) + (1 − w_L) * A
}
```

The above Separability( ) routine should start at the root node of the content tree.

The particular methods for evaluating a document's overall degree of separability are exemplary and are not to be considered as limiting in scope. Other methods for determining separability should be considered within the scope of the present invention, for example, a function of measured human responses to differing separation techniques; such that the present invention is directed to the much broader concept of determining separability for a document based on a combination of individual content separability measured in the context of evaluating document ease of use and document quality.

As illustrated in FIGS. 43 to 46, another parameter or factor used in determining ease of use is the measurement and quantization of the document's distinguishability.

In a preferred embodiment of the present invention, given two identical paragraphs, located at the top of two separate pages of a multi-page document, and that these paragraphs are the only content on their respective pages, the degree of separability of these object paragraphs can be based on a determination as to where one object ends and another object begins. In this instance, the separability value would be high since these objects have no neighboring objects on the same page. In other words, the closer objects are to one another, the easier it is to note their differences.

On the other hand, a measure of distinguishability of these two would be low because absent neighboring objects, providing a frame of reference, few clues are provided as to which of the two paragraphs are actually being looked at.

Figure 44:
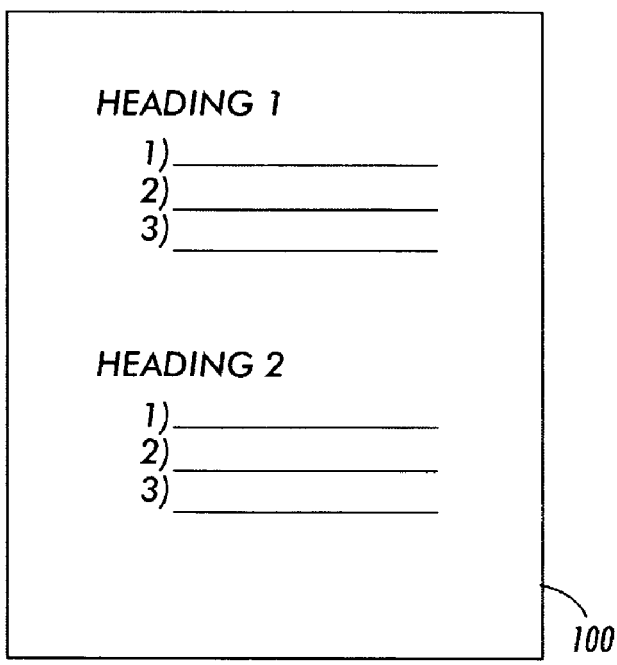
FIGS. 44 to 46 illustrate examples of distinguishability according to the concepts of the present invention.

A heading can distinguish the content that follows, as illustrated in FIG. 44. The heading can be a separate paragraph at the start of a group of content objects (usually with a different style to distinguish it as a heading). Numbering of list elements and, to a lesser degree, bullet elements also help distinguish content. There can be a hierarchy of headings, e.g., chapter, section, list element, etc. Each heading contributes to making an underlying object distinguishable from neighboring objects.

In general, the lower the heading is in the content tree, the smaller the set of content it applies to. Thus, the more specific the identification is. The lower level headings in the content tree, and physically closer headings, count more than higher level ones.

The following recursive algorithm determines heading contribution to distinguishability of object G. It assumes that heading content objects have already been identified. A heading's contribution is weighed according to its distance up the tree from the original object.

```
HeadingDistinguish(G)
{
    if G is the root
        then return 0
    P = parent(G)
    if P is a list
        then if P numbers the list elements
            then R = ListNumberWeight
            otherwise if P is a bulleted list
                then R = ListBulletWeight
                otherwise R = 0
    if a child of P is a heading
        then R = minimum (R + HeadingWeight, 1)
    return w * R + (1 - w) * HeadingDistinguish(P)
}
```

The expressions: ListNumberWeight, ListBulletWeight and HeadingWeight are constant contributions to the heading result. These have values between 0 and 1. The ListNumberWeight should have the largest value since list numbers are distinct and near to their corresponding list element content objects. Whereas, HeadingWeight and ListBulletWeight have lesser values, since the heading applies to all list elements. Bulleted elements have identical values for all elements in the list. The ListBulletWeight may be larger than the HeadingWeight since there will be a bullet close to the object. The weight w specifies the relative importance of the heading at the current tree level to headings at higher levels. For example, if w=0.5, then a heading at the current level would be considered as important as headings at all higher levels combined.

Figure 45:
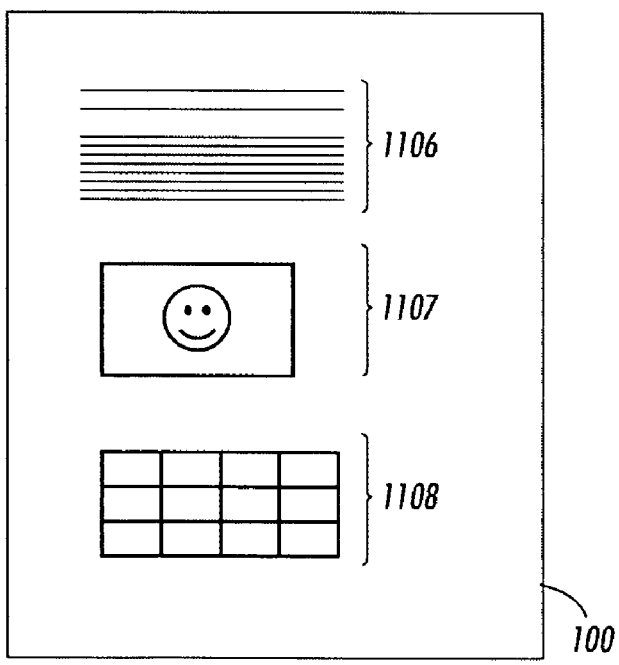

Object G and neighbor N should be distinguishable based on content type and value, as illustrated in FIG. 45. For different types of content (1106, 1107, and 1108), their value differences can be retrieved from a two-dimensional table indexed by content type. The table preferably contains values that express just how different those content types are. If type(G) does not match type(N), ContentDistinguish=TypeDistinguishTable[type(G)][type(N)].

If the types do match, content properties can be compared. For groups, lists and tables, the total number of words or characters for all of their contained elements can be compared.

For example, for paragraphs, the number of words or characters thereof can be counted. For lists, the number of list elements can be compared. For tables, the number of rows and columns can be compared. For graphic objects, size and shape can be compared. Since some object types may have several properties by which differences are measured, an overall difference is preferably calculated as a weighted sum of the various content differences for an object type. For example, ContentDistinguish=$\Sigma w_i \, cd_i(G,N)$, where the sum is over available style parameters 1, $w_i$ is the weight for the $i^{th}$ content difference measure, and $cd_i$ is the actual $i^{th}$ difference measure.

Figure 46:
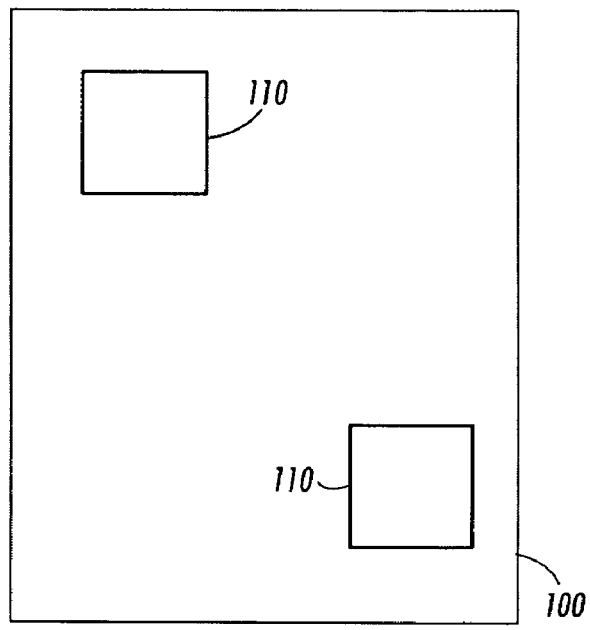

Furthermore, objects can be distinguished by their position on their respective pages, as illustrated in FIG. 46. Given object G and neighbor N, the center position for these objects 110 on page 100 $(x_G, y_G)$ and $(x_N, y_N)$, the distance between them can be calculated preferably normalized by the dimensions of the page $W_p$ by $H_p$.

For example: PositionDistinguish=$(((x_G-x_N)^2+(y_Y-y_N)^2)/(W_p^2+H_p^2))^{1/2}$. This can be further limited by only considering nearby neighbors on the same page. The same list of neighbors generated for separability can then be utilized. The cost in limiting comparisons to objects on a page, however, is the failure to recognize cases where objects on different pages are indistinguishable.

If any of AlignmentSep, StyleSep, BackgroundSep and ContentDistinguish measures, (described above), provides a strong difference, then the overall effective distinguishability should be high. The closer the neighbor is to the object, the easier it should be to observe their differences. The end result should receive a boost from the SpatialSep. The value of PositionDistinguish can be a further differentiator. If boost b is defined by: b=d/(d+SpatialSep); where the d parameter controls the strength of the boost effect of spatial nearness, then: EffectiveDistinguish=$c-[w_a^*(c-b^*AlignmentSep)^{-p}+w_s^*(c-b^*StyleSep)^{-p}+w_b^*(c-b^*BackgroundSep)^{-p}+w_c^*(c-b^*ContentDistinguish)^{-p}+w_p^*(c-PositionDistinguish)^{-p}]^{-1/p}$); where $w_a$, $w_s$, $w_b$, $w_c$ and $w_p$ are weighting values that give the relative importance of the alignment, style, background, content and position differences respectively and should sum to 1. The constant c is slightly larger than 1 to prevent division by zero. Note that this is the effective distingishability between an object and one of its neighbors.

To quantify the total distinguishability of a content object, it must be distinguished from all neighbors. In addition, any inherent features such as headers must also be considered. Total distinguishability can be determined by taking the minimum of all EffectiveDistinguish values for all neighbors.

Alternatively, one can raise each term to a power and then apply the inverse power to the sum. TotalDistinguish=$w_h^*HeadingDistinguish+(1-w_h)^*([(1/n)^*\Sigma(c+EffectiveDistinguish^{-p}]^{-1/p}-c)$; where $w_h$ is the weight of the HeadingDistinguish property relative to the neighbor differencing properties, n is the number of neighbors, constant c is a small constant to guard against division by zero, and power p determines how strongly close similarities dominate.

Figure 43:
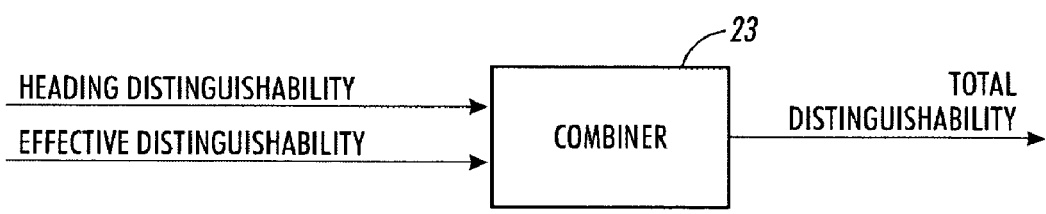
FIG. 43 illustrates a conceptual circuit for quantifiably measuring total distinguishability according to the concepts of the present invention.

A combination of distinguishability measures, as illustrated in FIG. 43, is useful in evaluating the document's total distinguishability.

More specifically, the total distinguishability, as illustrated in FIG. 43, is considered a combination of the effective distinguishability and the heading distinguishability. In FIG. 43, the quantized distinguishability value is derived by a combining of the effective distinguishability and the heading distinguishability using a total distinguishability quantizer or combiner circuit 23.

It is noted that the illustration shows a circuit for the total distinguishability quantization process, this process may also be performed in software by the microprocessor and/or firmware. The quantization is not limited to specific circuits, but any combination of software and/or hardware that is able to carry out the below described methodologies.

A document's overall distinguishability can be defined as the combining of all total distinguishability for all content objects and groups. These values can be combined using a straight average. Alternatives, however, are possible.

If any neighbors are present, from which it is difficult to distinguish the object, then the overall distinguishability for the document should be low. One might argue that any object or group with a low distinguishability value adversely impacts the entire document and therefore should be given higher weight by combining as the root of the sum of powers.

Another issue is whether or not the importance of distinguishability varies with the level in content hierarchy. For example, should being able to distinguish chapters be more or less important than being able to distinguish paragraphs. An algorithm for computing document distinguishability by recursively traversing the content tree was previously discussed which calculates a weighted average. Again, weights $w_L$ can vary with tree level L.

To determine the distinguishability of a document using its content tree can be effectuated by the following pseudocode called on the root node of the content tree.

```
Distinguishability (G)
{
    if G is a leaf node
        then return TotalDistinguish(G)
        otherwise
            for each child C of G
                call Distinguishability (C) and find
                the average A of values
    return w_L * TotalDistinguish (G) + (1 - w_L) * A
}
```

The particular methods for evaluating a document's overall degree of distinguishability are exemplary and are not to be considered as limiting in scope. Other methods for determining distinguishability should be considered within the scope of the present invention, for example, a function of measured human responses to differing distinguishing devices; such that the present invention is directed to the much broader concept of determining distinguishability for a document based on a combination of individual content distinguishability measured in the context of evaluating document ease of use and document quality.

As illustrated in FIGS. 47 to 51, another parameter or factor used in determining ease of use is the measurement and quantization of the document's locatability.

In a preferred embodiment of the present invention, the term locatability is used to mean the ability to find or locate a particular content item from among all the other content items. A measure of locatability is constructed by examination of the document factors that aid or inhibit the locating of content objects.

Figures 49, 50:
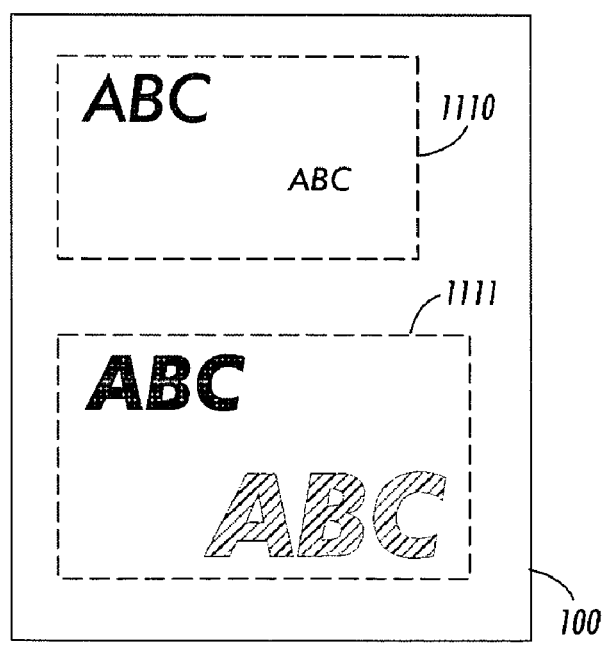
FIGS. 49 and 50 illustrate examples of locatability according to the concepts of the present invention.

As illustrated in FIG. 50, another parameter or factor used in determining ease of use is the measurement and quantization of the document's visibility.

In a preferred embodiment of the present invention, one factor in determining an object's locatability is to determine the visibility of the object, i.e., how well it can be seen against its background. As used herein, visibility means how easy it is to see the object, or how difficult it is to overlook it. Herein two characteristics are used in measuring the value of the object's visibility. One is the size of the object 1110 (the larger the object the easier it should be to detect and identify it) and the other 1111 is its difference from the background.

As a measure of the difference from the background (1111), the luminance contrast is used, although other and more complex measures are envisioned. If the background is textured, the luminance contrast and color difference may not be well defined. Texture may also act to hide an object.

If colors are specified in red, green and blue (R,G,B) coordinates normalized to range between 0 and 1 then luminance can be given by: Y=yr R+yg G+yb B; where yr, yg and yb are the luminance values for the red, green and blue primary colors respectively. The yr, yg and yb values depend upon the details of the color space actually used but typical values are 0.25, 0.68 and 0.07 respectively.

Contrast is calculated from the luminance of the foreground $Y_f$ and that of the background $Y_b$ such that: Contrast=$2|Y_b-Y_f|/(Y_b+Y_f)$. It should be pointed out that since both contrast and size affect visibility, these values are combined by multiplying them together. While contrast ranges between 0 and 1, size can be unbounded. For a size to be bounded by 0 and 1, the object size is normalized by dividing it by the maximum size it can be. For example: visibility=contrast*(object area)/(maximum area). In general, this is the area of the document. But, if objects are restricted to a page, the page size can be used.

The particular methods for evaluating an object's degree of visibility are exemplary and are not to be considered as limiting in scope. Other methods for determining visibility should be considered within the scope of the present invention, for example, a function of measured human responses to object characteristics with respect to its visibility.

As illustrated in FIG. 49, another parameter or factor used in determining ease of use is the measurement and quantization of the document's structural locatability.

In a preferred embodiment of the present invention, another factor in the ease of locating a document element is the presence of structural aids (such as headings and bullets within the document). This measure is termed the structural locatability and can be implemented by a tree or table look-up where the result is a predefined value, which depends on the type and style of the structure that contains the element. For example, a decision tree that set a structural location term StructLocate for element E might look as follows:

```
G = parent(E)
    if G is a table
        then if G has row headings
            then if G has column headings
                then StructLocate = Vtrc
                otherwise StructLocate = Vtr
```

```
            otherwise if G has column headings
                then StructLocate = Vtc
                    otherwise StructLocate = Vt
        otherwise if G is a list
            then if G has bullets
                then StructLocate = Vlb
                    otherwise if G has numbers
                        then StructLocate = Vln
                            otherwise StructLocate = Vl
            otherwise StructLocate = Vg
``` where Vtrc, Vtr, Vtc, Vt, Vlb, Vln, Vl and Vg are the predetermined locatability contributions for structural cases.

The particular methods for evaluating a document's structural locatability are exemplary and are not to be considered as limiting in scope. Other methods for determining structural locatability should be considered within the scope of the present invention, for example, a function of measured human responses to structural aids to locating objects; such that the present invention is directed to the much broader concept of determining structural locatability for a document based on a combination of individual content structure measured in the context of evaluating document ease of use and document quality.

In addition to structural contributions, a member of a group may be identified by its effective distinguishability from other group members. For example, one might locate the long paragraph in a group and ignore the short ones, or locate the middle paragraph of a list. The methods of measuring effective distinguishability can also be used for locatability. However, instead of comparing the object to its neighbors, the object is compared to its sibling members in the group.

Having calculated the EffectiveDistinguish value for the group element under consideration, with each of the other sibling members, the results can be combined as follows: DistinguishLocate=$[(1/n)\Sigma(c+\text{EffectiveDistinguish})^{-P}]^{-1/P}$−c; where the sum is overall n sibling group members. The constants c and P have the same effect as for the TotalDistinguish calculation and may be the same values.

The ease of locating a member item within a group depends upon the number of items the group contains. If there are only one or two items in the group then it will be easy to locate an item. But if there are a thousand items, the task of locating one in particular will be more difficult. This depends upon the presentation method. For instance, finding an item presented in a table of 100 elements is not as difficult as finding the item in a list of 100 elements. A factor for the effects of the size of the group containing element E is calculated as:

```
        G = parent(E)
            if G is a table
                then Group SizeFactor =
                    (1−A+A/rows(G))*(1−A+ A/columns(G))
                        otherwise GroupSizeFactor =
                            (1 − A + A/elements(G));
``` where rows(G) and columns(G) are the number of rows and columns in the table G and elements(G) is the number of elements in the group G and A is a parameter controlling the strength of the factor with group size.

The structural contribution to locating a group member is combined with the distinguishability contribution. A weighted sum of the two contributions is used where the weights determine the relative importance of the two factors. However, it can be argued that if either contribution allows one to locate the element, then the overall result should be high, regardless of the other contribution.

The combined result should reduce according to the size of the group. This can be achieved by: MemberLocate=$(c-[w_m*(c-\text{StructLocate})^{-P}+(1-w_m)*(c-\text{DistinguishLocate})^{-P}]^{-1/P})*\text{GroupSizeFactor}$; where $w_m$ is the weight of the structural contribution relative to the distinguishability contribution, c is a constant slightly larger than 1 and P is a number greater than 1.

Figure 48:
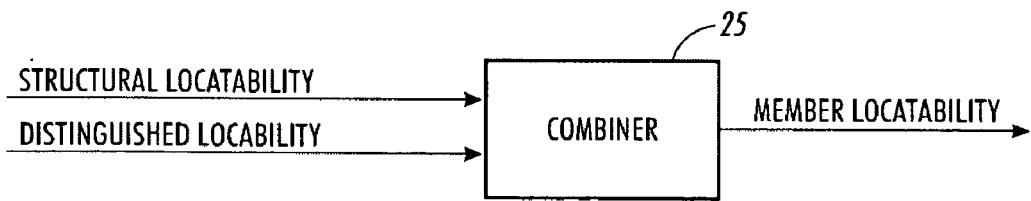
FIG. 48 illustrates a conceptual circuit for quantifiably measuring member locatability according to the concepts of the present invention.

A combination of locatability measures, as illustrated in FIG. 48, is useful in evaluating the document's member locatability.

More specifically, the member locatability, as illustrated in FIG. 48, is considered a combination of the structural locatability, as described above, and/or the distinguished locatability, as described above. In FIG. 48, the quantized member locatability value is derived by a combining of the the structural locatability and the distinguished locatability using a member locatability quantizer or combiner circuit 25.

It is noted that the illustration shows a circuit for the member locatability quantization process, this process may also be performed in software by the microprocessor and/or firmware. The quantization is not limited to specific circuits, but any combination of software and/or hardware that is able to carry out the below described methodologies.

Figure 47:
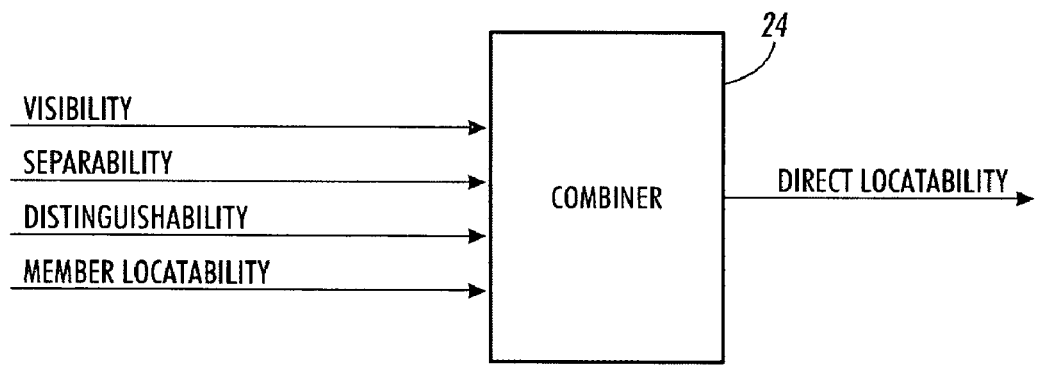
FIG. 47 illustrates a conceptual circuit for quantifiably measuring direct locatability according to the concepts of the present invention.

A further combination of locatability measures, as illustrated in FIG. 47, is useful in evaluating the document's direct locatability.

More specifically, the direct locatability, as illustrated in FIG. 47, is considered a combination of the member locatability, distinguishability, separability, and/or visibility. In FIG. 47, the quantized direct locatability value is derived by a combining of the member locatability, distinguishability, separability, and/or visibility using a direct locatability quantizer or combiner circuit 24.

It is noted that the illustration shows a circuit for the direct locatability quantization process, this process may also be performed in software by the microprocessor and/or firmware. The quantization is not limited to specific circuits, but any combination of software and/or hardware that is able to carry out the below described methodologies.

In a preferred embodiment of the present invention, another mechanism to aid in locating an element is a reference or link to that element, such as a page number in a table of contents, or as a hyperlink in an electronic document. For example, a paragraph might be found through the table of contents or by looking in the index for the location of a particular word. The ease of location may not vary linearly with the number of references. If the number of references to the element under consideration is Nr, then a function that increases non-linearly from 0 to 1 with increasing Nr can be written as: ReferenceLocate=$1-(Nr+1)^{-1/P}$; where P determines how strongly additional references contribute.

The particular methods for evaluating a contribution of references to the ability to locate objects are exemplary and are not to be considered as limiting in scope. Other methods for determining the contribution from references should be considered within the scope of the present invention, for example, a function of measured human responses to differing degrees of referencing; such that the present invention is directed to the much broader concept of determining the effect of referencing on the measures of locatability in the context of evaluating document ease of use and document quality.

Figure 51:
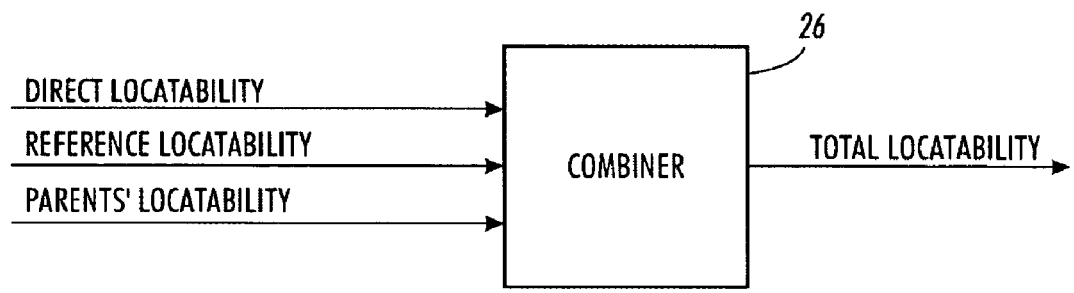
FIG. 51 illustrates a conceptual circuit for quantifiably measuring total locatability according to the concepts of the present invention.

As illustrated in FIG. 51, another parameter or factor used in determining ease of use is the measurement and quantization of the document's total locatability.

In a preferred embodiment of the present invention, the above individual locatability contributions can be combined into a total locatability measure. First, note that if any of the first four contributing measures are low for an item, then that particular item is likely to be hard to locate as it will either be hard to see or will be confused with its neighbors, or siblings. These four contributions can be combined as follows: DirectLocate=$([w_v*(c+\text{Visibility})^{-P}+w_s*(c+\text{TotalSep})^{-P}+w_d*(c+\text{TotalDistinguish})^{-P}+w_{dl}*(c+\text{DistinguishLocate})^{-P}]^{-1/P}-c)$; where $w_v$, $w_s$, $w_d$ and $w_{dl}$ are the weights describing the relative importance of the contributions and sum to 1; c is a small number used to prevent division by zero and P determines how strongly one bad contribution to locatability spoils the overall result.

Next, the measures for locating the item directly, locating it through references, and locating it through its parent, can all be combined. Thus: TotalLocate=$c-[w_n*(c-\text{DirectLocate})^{-P}+w_r*(c-\text{ReferenceLocate})^{-P}+w_p*(c-\text{TotalLocate}(\text{parent}))^{-P}]^{-1/P}$; where the weights $w_n$, $w_r$ and $w_p$ sum to 1, c is a number slightly larger than 1 and P is a number greater than or equal to 1.

An overall locatability for a document is determined by combining the total locatability for all document content objects and groups. The simplest way to combine these values is a straight average. Just as for separability and distinguishability, one might argue that any object or group with a low locatability value strongly impacts the entire document and should be given higher weight such as by combining the root of powers.

The documents overall locatability gives an overall feel for how easy it is to locate items in a document by calculating and combining measures of how easy it is to locate each and every document component. An algorithm for computing document locatability is provided herein which recursively traverses the content tree to calculate a weighted average; although the weights $w_L$ can vary with tree level L. To find the overall Locatability of a document, the following routine is executed on the root node of the content tree.

```
            Locatability (G)
            {
                if G is a leaf node
                    then return TotalLocate(G)
                otherwise
                    for each child C of G
                        call Locatability (C) and find
                        the average of these values
        A
                    return w_L * TotalLocate (G) + (1 - w_L) * A
            }
```

The particular methods for evaluating a document's overall degree of locatability are exemplary and are not to be considered as limiting in scope. Other methods for determining locatability should be considered within the scope of the present invention, for example, a function of measured human responses to differing techniques for locating content objects; such that the present invention is directed to the much broader concept of determining separability for a document based on a combination of individual content separability measured in the context of evaluating document ease of use and document quality.

A combination of locatability measures, as illustrated in FIG. 51, is useful in evaluating the document's total locatability.

More specifically, the total locatability, as illustrated in FIG. 51, is considered a combination of the direct locatability, reference locatability, and/or parents' locatability. In FIG. 51, the quantized total locatability value is derived by a combining of the direct locatability, reference locatability, and/or parents' locatability using a total locatability quantizer or combiner circuit 26.

It is noted that the illustration shows a circuit for the total locatability quantization process, this process may also be performed in software by the microprocessor and/or firmware. The quantization is not limited to specific circuits, but any combination of software and/or hardware that is able to carry out the below described methodologies.

In a preferred embodiment of the present invention, a document's degree of searchability can be determined by first determining a value for strength of searchability of the document, and then determining the document's search density relative to the strength of searchability. The search density is mapped to a value that ranges between 0 and 1 and in one embodiment consists of evaluating the relationship given by: 1−c/(c+Search Density); where c is a constant which is the size of the typical search density and P determines how quickly searchability approaches 1 with increasing search density.

The strength of searchability is determined by features of the document intended to aid in searching. Features include at least one of the number of table elements, the number of list elements, the number of list bullets, and the number of list element numbers or the number of other reference terminals, a reference terminal being a position indicator that can be used by a reference; such as a label, a chapter number for a textual reference, or an anchor for a hyperlink.

One method for collecting such features is to traverse the content tree looking for the features and incrementing counters when they are discovered.

An exemplary recursive algorithm to collect these features is as follows:

```
CollectSearchFeatures(G)
{
    if G is a table
        then Ft = Ft + number of elements is G
            for each element E of G
                CollectSearchFeatures(E)
    otherwise
    if G is a list
        then Fl = Fl + number of elements in G
            if G is bulleted
                then Fb = Fb +
                number of bullets in the list G
            if G is numbered
                then Fn = Fn +
                number of numbered elements in G
            for each element E of G
                CollectSearchFeatures(E)
    otherwise
    if G is a group
        then for each element E of G
            CollectSearchFeatures(E)
    otherwise
    if G acts as a reference label
        then Fr = Fr + 1
    if G is an anchor
        then Fa = Fa + 1
}
```

An overall strength of searchability can be formed as the weighted sum of the various feature contributors. For example: SearchStrength=$w_t$*Ft+$w_l$*Fl+$w_b$*Fb+$w_n$*Fn+$w_r$*Fr+$w_a$*Fa; where $w_t$, $w_l$, $w_b$, $w_n$, $w_r$ and $w_a$ are the weights and sum to 1.

The size of the document may also influence searchability. Having n features in a small document should count more than n features in a large one. Thus, document size can be defined as the amount of information it contains. Document information can be approximated by the number of characters in the document description. For example: SearchDensity=SearchStrength/NumberOfCharacters.

This provides a measure of the document's search enabling characteristics, but it is potentially unbounded. It can be converted to a measure that varies between 0 and 1. For example: Searchability=1−c/(c+SearchDensity)$^P$; where c and P determine how quickly the Searchability approaches 1 with increasing SearchDensity.

The particular methods for evaluating a document's overall degree of searchability are exemplary and are not to be considered as limiting in scope. Other methods for determining searchability should be considered within the scope of the present invention, for example, a function of measured human responses to differing search affecting features; such that the present invention is directed to the much broader concept of determining searchability for a document based on a combination of individual content search supporting features in the context of evaluating document ease of use and document quality.

As illustrated in FIGS. 52 to 57, another parameter or factor used in determining ease of use is the measurement and quantization of the document's group identity.

In a preferred embodiment of the present invention, group identity is the ability to see the members of a group as a group. One indicator of group identity is referred to herein as Spatial Coherence meaning that members of a group are all located close together on the page. Other indicators include the presence of a common background or surrounding border, a uniform style among the elements, alignment of the elements, organization of the elements into a list or a table, and the presence of a heading for the group. How to measure and combine these indicators is now discussed.

Figure 53:
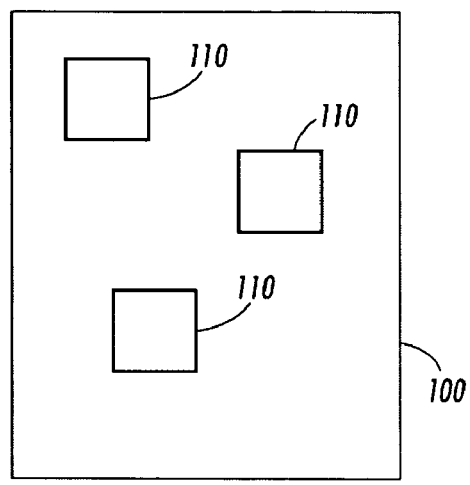
FIGS. 53 and 54 illustrate examples of coherence according to the concepts of the present invention.
Figure 54:
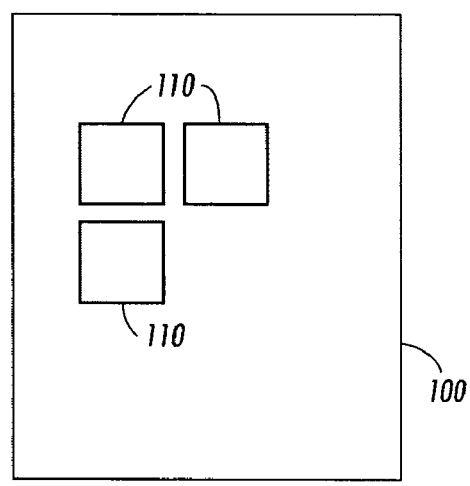

As illustrated in FIGS. 53 and 54, another parameter or factor used in determining ease of use is the measurement and quantization of the document's spatial coherence.

Figure 55:
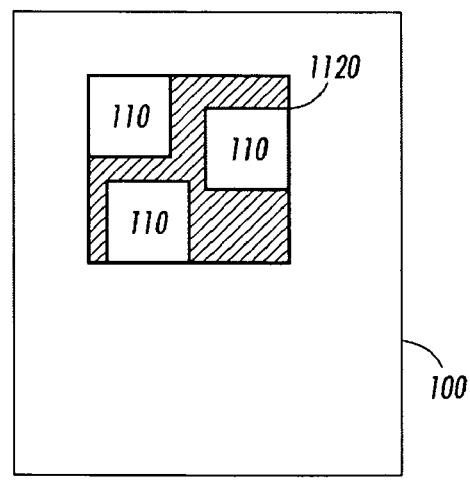
FIG. 55 illustrates examples of group boundary area according to the concepts of the present invention.

In a preferred embodiment of the present invention, spatial coherence is calculated when all the group elements (110 of FIG. 55) lie on the same page (100 of FIG. 55). Here, it is assumed that the bounding box (1120 of FIG. 55) for a group or a group element can be found. The bounding box 1120 gives the width and height of a minimal vertically aligned rectangle that encloses the item. For this determination, area is the width times the height: A(E)=W(E)*H(E). Spatial coherence of group G then becomes: SpatialCoherence=(ΣA($E_i$))/A(G); where the sum is over the $E_i$ elements of group G.

Alternatively one might, for example, take the square root of the above expression making it more like a comparison of perimeters than areas. Or one could actually compute the perimeter of the convex hull of the group objects and divide it into the circumference of a circle with area matching the total area of the elements.

When group elements are spread over two or more pages, one can determine the spatial coherence for each page and then combine the results. A weighted average can be used where the weight for a page is proportional to the number of elements on that page. One should also include a penalty for separating the group over pages. For example, one could divide by the number of pages involved.

FIG. 53 is an example of low spatial coherence. FIG. 54 is an example of high spatial coherence.

The particular methods for evaluating spatial coherence provided herein are exemplary and are not to be considered as limiting in scope. Other methods for determining spatial coherence should be considered within the scope of the present invention, for example, a function of measured human responses to differing spatial placements of content objects; such that the present invention is directed to not only in the particular method of determining spatial coherence but also in the much broader concept of using a measure of spatial coherence of content objects in a determination of content group identity in the context of determining document ease of use and document quality.

Figure 56:
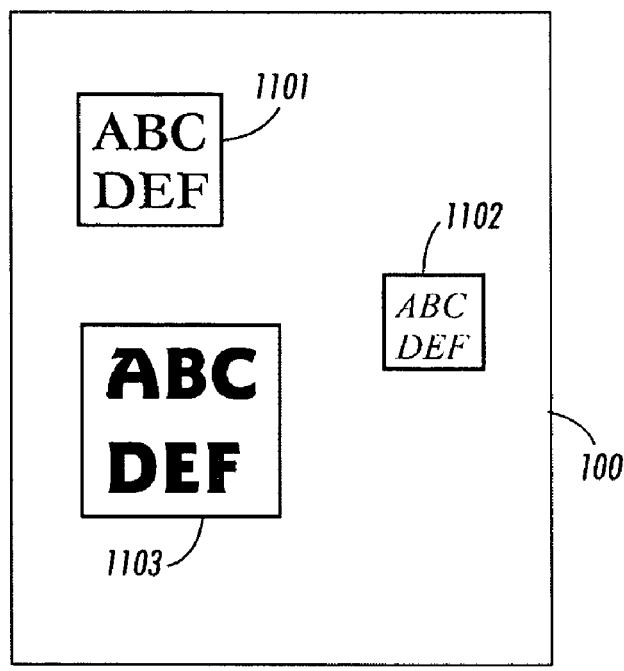
FIGS. 56 and 57 illustrate examples of style according to the concepts of the present invention.
Figure 57:
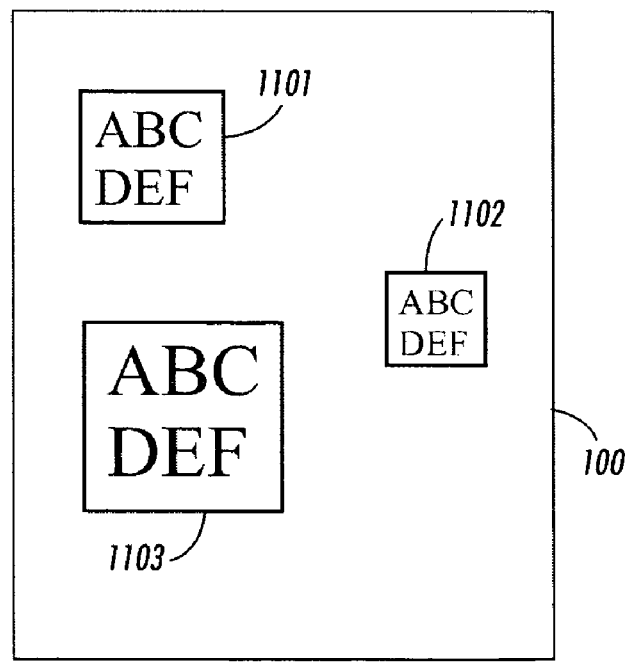

As illustrated in FIGS. 56 and 57, another parameter or factor used in determining ease of use is the measurement and quantization of the document's consistency of style.

In a preferred embodiment of the present invention, another indicator that elements belong to a group is that they all have the same style. One measure of consistency of style for a group would be to define the sameness of style as: 1−StyleSep; where StyleSep measures the difference in style, and then to pair-wise compare all of the group elements and combine their sameness values. Combining can be done by averaging.

The particular methods for evaluating sameness of style provided herein are exemplary and are not to be considered as limiting in scope. Other methods for determining sameness of style should be considered within the scope of the present invention; such that the present invention is directed to not only in the particular method of determining sameness of style but also in the much broader concept of using sameness of style in a determination of content group identity in the context of determining document ease of use and document quality.

One method that looks deeper than just the first level of the group, and compares styles, is to recursively move down the content tree and compare the leaves for consistency of style. The style of the leaves discovered can be compared to the style of the first leaf in the tree. Since one is looking for style features that tie all members of the group together, a simple check is to compare style properties to the first leaf. If any leaf has a different property value, then that property cannot be used as an indicator of group membership.

The number of style properties that are consistent across all members are counted and that value becomes a measure of style consistency. A procedure to get the first leaf looks as follows:

```
GetFirstLeaf(G)
{
    if G is a leaf
        then return G
        otherwise return GetFirstLeaf(FirstElement(G))
}
```

An exemplary procedure to traverse the tree and compare style properties and return the overall consistency would be as follows:

```
LeafConsistency(G, StyleProperties, CurrentConsistency)
{
if G is a leaf then
    CurrentConsistency = CheckConsistency(G, StyleProperties,
CurrentConsistency)
        otherwise
            for each element E of G
                CurrentConsistency = LeafConsistency(E,
StyleProperties,    CurrentConsistency)
return CurrentConsistency
}
``` where StyleProperties is an array containing the style property values for the first leaf and CurrentConsistency is an array indicating for each style property whether all leaves checked thus far have a uniform value.

The actual checking of style properties against those of the first leaf might be done as

```
CheckConsistency(G, StyleProperties, CurrentConsistency)
{
for each style property i
    if StyleValue(G, i) does not match StyleProperties[i]
        then CurrentConsistency[i] = 0
return CurrentConsistency
}
```

The procedure for checking consistency of style would look as follows:

```
StyleConsistency(G)
{
E = GetFirstLeaf(G)
for each style property i
    {
        StyleProperties[i] = StyleValue(E, i)
        CurrentConsistency[i] = 1
    }
LeafConsistency(G, StyleProperties, CurrentConsistency)
return the sum of the CurrentConsistency array value divided by the
array size.
}
```

Even more sophisticated calculations can be done. FIG. 56 is an example of poor consistency of style. FIG. 57 is an example of good consistency of style.

The particular methods for evaluating consistency provided herein are exemplary and are not to be considered as limiting in scope. Other methods for determining consistency should be considered within the scope of the present invention, for example, a function of measured human responses to the consistency of styles for content objects; such that the present invention is directed to not only in the particular method of determining consistency but also in the much broader concept of using a measure of consistency in a determination of content group identity in the context of determining document ease of use and document quality.

It can be argued that the further down the tree one must search for a leaf node, the less that node reflects the properties of the actual group being analyzed. One might, therefore, wish only to search the tree to a fixed depth for leaf nodes. Non-leaf nodes can also be compared to one another for consistency of their properties. Further, for the non-leaf nodes, one might just compare tables to tables, lists to lists and so on. But this raises the question of just what is the proper depth to use in the search. One way is to calculate consistency for all depths and combine the results, weighing the shallow depths higher than the large ones.

In a preferred embodiment of the present invention, measures for the contributions to group identity from structure, headings, borders and backgrounds can also be calculated. Assume a means of determining whether a group object has a background (or border); whether it has a heading element; and whether it is a list or table, a heading indicator can be created based on whether the group contains a heading. The following pseudocode illustrates this:
    if first element of the group is a heading
        then HasHeading=1
        otherwise HasHeading=0

Similarly, explicit background elements and/or borders can be examined, as in the following pseudocode:
    if the group has its own background
        then HasBackground=1
        otherwise HasBackground=0
    if the group has a border
        then HasBorder=1
        otherwise HasBorder=0

A table lookup can be used to obtain a structural contribution based on the type of group. Lists and tables should be more easily recognized as coherent objects than unstructured groups as given by: StructuralIdentity=StructIdentTable[type(G)].

These indicators of group identity can be combined into an overall identity measure given by a weighted average, but a preferred embodiment is to do the root of a weighted average of powers as in:

$$GroupIdentity = c - [w_{sp}*(c-SpatialCoherence)^{-P} + w_{st}* (c-StyleConsistency)^{-P} + w_{ah}*(c-alignH)^{-P} + w_{av}* (c-alignV)^{-P} + w_h*(c-HasHeading)^{-P} + w_{bk}*(c-HasBackground)^{-P} + w_{bd}*(c-HasBorder)^{-P} + w_{si}* (c-StructuralIdentity)^{-P}]^{-1/P};$$

where $w_{sp}$, $w_{st}$, $w_{ah}$, $w_{av}$, $w_h$, $w_{bk}$, $w_{bd}$ and $w_{si}$ are the weights and sum to 1. The parameter c and P control the degree to which a single good value dominates. Constant c is slightly larger than 1 and the power P is typically 1 or larger. Indicators can be combined using a power function that favors high values.

Just as for separability and distinguishability, any object or group with a low group identity value may strongly impact the entire document and preferably given a higher weight such as, for instance, by combining as the root of powers. A pseudocode algorithm for computing document group identity by recursively traversing the content tree is provided. This calculates a simple weighted average. Weights $w_L$ can vary with tree level L. To find the DocumentGroupIdentity call this routine on the root node of the content tree.

```
DocumentGroupIdentity (G)
{
    if G is a leaf node
        then return 1
    otherwise
        for each child C of G call
            DocumentGroupIdentity (C) and find
    the average of these values A
        return wg * GroupIdentity (G) + (1 - wg) * A
}
```

The particular methods for evaluating group identity provided herein are exemplary and are not to be considered as limiting in scope. Other methods for determining group identity should be considered within the scope of the present invention, for example, a function of measured human responses to differing document characteristics with respect to group identity; such that the present invention is directed to not only in the particular method of determining group identity but also in the much broader concept of using a measure of individual group identity in a determination of document's overall group identity.

Figure 52:
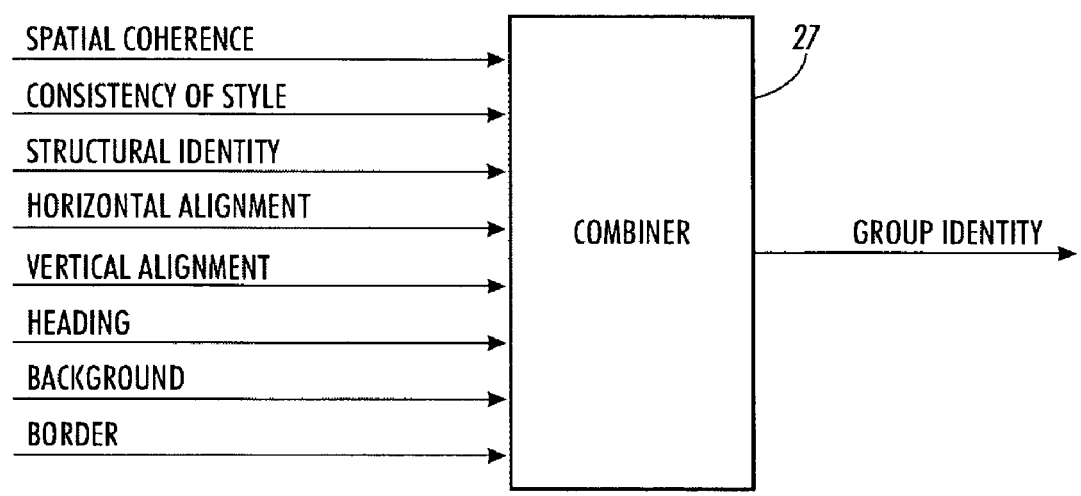
FIG. 52 illustrates a conceptual circuit for quantifiably measuring group identity according to the concepts of the present invention.

A combination of measures, as illustrated in FIG. 52, is useful in evaluating the document's group identity.

More specifically, the group identity, as illustrated in FIG. 52, is considered a combination of the spatial coherence, consistency of style, structural identity, horizontal alignment, vertical alignment, heading, background, and/or border. In FIG. 52, the quantized group identity value is derived by a combining of the spatial coherence, consistency of style, structural identity, horizontal alignment, vertical alignment, heading, background, and/or border using a group identity quantizer or combiner circuit 27.

It is noted that the illustration shows a circuit for the group identity quantization process, this process may also be performed in software by the microprocessor and/or firmware. The quantization is not limited to specific circuits, but any combination of software and/or hardware that is able to carry out the below described methodologies.

As discussed above, the content group ease-of-use is calculated as a combination of the measures of contributing factors. The factors can include separability, distinguishability, locatability, searchability, and/or group identity. These factors can be calculated using relations of the group elements with one another and with relations of group elements with non-group neighbors.

These relations can include, for example, spatial coherence, spatial separation, alignment separation, heading separation, background separation, and/or style separation. If each factor is defined to produce a value ranging between 0 and 1, such that 0 means low or bad ease-of-use contribution to a quality value, and 1 meaning high or good ease-of-use contribution to a quality value, these (and possibly other such rules) can be calculated and combined to form a measure for the overall contribution to ease-of-use from the treatment for content groups. If $V_i$ is the value calculated for the $i^{th}$ rule, then the group ease-of-use measure $V_{EU}$ is formed as a function E of these contributions: $V_{EU}=E(V_1, V_2, \ldots V_N)$ The combining function E can be as simple as a weighted average of the contributions, but because any bad contributor can ruin the ease of use no matter how good the others are, a linear combination is not preferred. An alternative is to use: $V_{EU}=(\Sigma w_i(d+V_i)^{-p})^{-1/p}-d$ The $w_i$ factors are the weights that specify the relative importance of each rule; they should sum to 1. The exponent p introduces the nonlinearity that can make one bad value overwhelm many good ones. The larger p is, the greater this effect.

Other combining functions are possible, for example, one could take the product of the contributions. If weighting of the contribution is desired, this can be done by exponentiation. $V_{EU}=\Pi V_i^{wi'}$ The particular methods for evaluating content group ease-of-use provided herein are exemplary and are not to be considered as limiting in scope. Other methods for determining group ease-of-use should be considered within the scope of the present invention, for example, a function of measured human responses to differing document characteristics with respect to group ease-of-use; such that the present invention is directed to not only in the particular method of determining ease-of-use but also in the much broader concept of using a combination of individual group property measures in the context of evaluating document ease of use and document quality.

A combination of ease of use measures, as illustrated in FIG. 35, is useful in evaluating the document's ease of use.

More specifically, the group ease of use, as illustrated in FIG. 35, is considered a combination of separability, distinguishability, locatability, searchability, and/or group identity. In FIG. 35, the quantized group ease of use value is derived by a combining of the separability, distinguishability, locatability, searchability, and/or group identity using an ease of use quantizer or combiner circuit 20.

It is noted that the illustration shows a circuit for the ease of use quantization process, this process may also be performed in software by the microprocessor and/or firmware. The quantization is not limited to specific circuits, but any combination of software and/or hardware that is able to carry out the below described methodologies.

Eye-catching Ability

For some documents, such as advertisements and warning labels, it is important that the documents catch the viewer's eye and attention. An important property contributing to the quality of these documents is therefore the eye-catching ability of a given layout. The present invention provides a method of calculating such an eye-catching measure.

Eye-catching ability is calculated as a combination of simpler properties. If any of the simpler eye-catching properties is strongly present, then the overall effect is an eye-catching document. Contributing factors can include colorfulness, color dissonance, font size, information lightness, picture fraction, and/or novelty. Each factor is defined Such as to produce a value ranging between 0 and 1 such that 0 means low or bad eye-catching value and 1 means high or good eye-catching value. These (and possibly other such rules), can be calculated and combined to form an overall eye-catching measure. If $V_i$ is the value calculated for the $i^{th}$ rule, then the eye-catching measure $V_{EC}$ is formed as a function E of these contributions:

$$V_{EC}=E(V_c, V_d, V_f, V_{il}, V_p \ldots V_n)$$

The combining function E can be as simple as a weighted average of the contributions, but because any good contributor can lead to an eye-catching document, no matter how bad the others are, a linear combination is not preferred. An alternative is to use: $V_{EC}=d-[\Sigma w_i(d-V_i)^{-p}]^{-1/p}$ Here d is a number slightly larger than 1. The closer the value of d to 1, the more strongly a good value will compensate for all other values. The $w_i$ factors are the weights that specify the relative importance of each rule; they should sum to 1. The exponent p introduces the nonlinearity that can also increase the strength by which one good value can overwhelm many bad ones. The larger p is the greater this effect. Note that this formula for combining the contributing factors differs from the preferred method for combining aesthetics factors or ease-of-use factors. In the cases of aesthetics and/or ease-of-use, any bad factor would spoil the quality. Thus, when combining, any low contribution will lead to a low result. For eye-catching however, any good factor will rescue the others, and when combining, any high contribution will lead to a high result.

Other combining functions are possible; for example, one could take the inverse of the product of the inverse contributions. If weighting of the contribution is desired, this can be done by exponentiation. $V_{EC}=1-\Pi(1-i)^{wi'}$ The particular methods for evaluating ability of the document to catch the eye provided herein are exemplary and are not to be considered as limiting in scope. Other methods for determining eye-catching ability should be considered within the scope of the present invention, for example, a function of measured human responses to differing document characteristics with respect to the ability to catch the eye; such that the present invention is directed to not only in the particular method of determining eye-catching ability, but also in the much broader concept of using a combination of individual measures in the context of evaluating document eye-catching ability and document quality.

Figure 58:
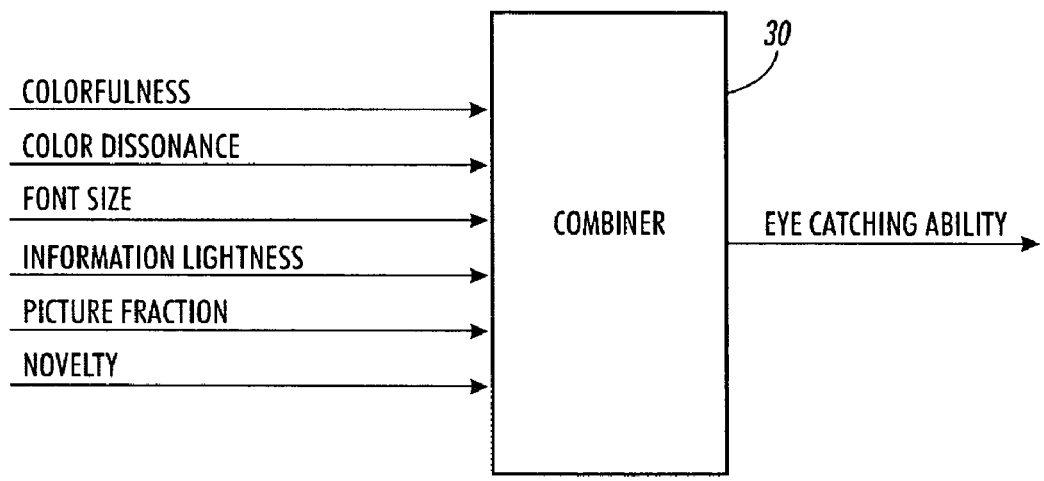
FIG. 58 illustrates a conceptual circuit for quantifiably measuring eye catching ability according to the concepts of the present invention.

A combination of measures, as illustrated in FIG. 58, is useful in evaluating the document's eye-catching ability.

More specifically, the eye-catching ability, as illustrated in FIG. 58, is considered a combination of colorfulness, color dissonance, font size, information lightness, picture fraction, and/or novelty. In FIG. 58, the quantized eye-catching ability value is derived by a combining of the colorfulness, color dissonance, font size, information lightness, picture fraction, and/or novelty using an eye-catching ability quantizer or combiner circuit 30.

It is noted that the illustration shows a circuit for the eye-catching ability quantization process, this process may also be performed in software by the microprocessor and/or firmware. The quantization is not limited to specific circuits, but any combination of software and/or hardware that is able to carry out the below described methodologies.

Figure 59:
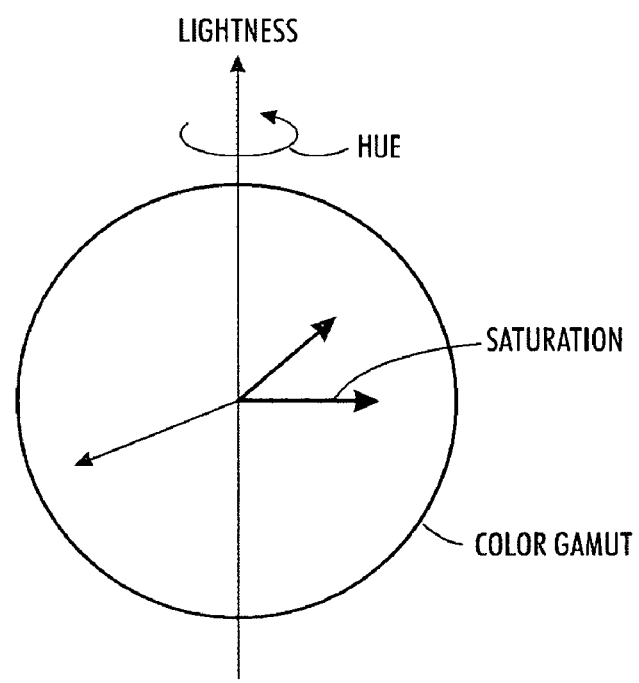
FIG. 59 illustrates an example of a color gamut according to the concepts of the present invention.

In a preferred embodiment of the present invention, color is eye-catching and a bright orange page can capture attention better than a gray one. The primary property of color of interest here is saturation (or chrominance). There are several possible ways to calculate an approximate saturation value that can be used in determining the overall colorfulness of a document or a page. Perhaps the simplest calculation for colors expressed in an RGB color space is: $c=\max(R, G, B)-\min(R, G, B)$ where c is the saturation, as illustrated by FIG. 59 (or chrominance) and max and min are the maximum and minimum functions respectively.

An alternative calculation is: $c=[E^2+S^2]^{1/2}$ where $E=R-G$ and $S=(R+G)/2-B$ When colors are expressed in the L*a*b* color space, the chrominance can be calculated as: $c=[(a^*)^2+(b^*)^2]^{1/2}$ The color saturation values are weighted by the area of the colored objects. This is then divided by the total document area to yield a colorfulness measure: $V_{cl}=\Sigma c_i A_i/Ad$ where $V_{cl}$ is the colorfulness measure, $c_i$ is the saturation value for the $i^{th}$ object and $A_i$ is that object's area. Ad is the area of the entire document. The sum is over all objects visible in the document.

The particular methods for evaluating content colorfulness provided herein are exemplary and are not to be considered as limiting in scope. Other methods for determining colorfulness should be considered within the scope of the present invention, for example, a function of measured human responses to differing amounts and types of color; such that the present invention is directed to not only in the particular method of determining colorfulness but also in the concept of using colorfulness measures in the context of evaluating document eye-catching ability and document quality.

In a preferred embodiment of the present invention, when multiple colors are present on a page, it is not only the amount of color saturation present that is important, but also how harmonious those colors are. For example, pink and green go together much more harmoniously than pink and orange. Colors that clash will catch the eye. A contributor to the eye-catching property is therefore the color dissonance.

In the following discussion, the calculation of color dissonance is described for the objects that can be seen together (i.e. the objects on a page). If the document has multiple pages, then an average color dissonance value for all pages can be determined.

The color dissonance (or harmony) between two colors is largely determined by their hue difference (although the colors should have sufficient saturation and area to be noteworthy).

There are several methods known in the art for calculating an approximate hue value as an angle for the chrominance components. For example, using the E and S values described above one can define the hue as: $h=\arctan(S/E)$ As is well known in the art, special handling of the case $E=0$ is needed and checking signs to determine the quadrant should be done in order to avoid the confusion between E/S and $(-E)/(-S)$. The result can also be divided by $2\pi$ to yield a value between 0 and 1.

In the L*a*b* color space a similar calculation can be performed giving $h=\arctan((b^*)/(a^*))$ Another method described by A. R. Smith for calculating an approximate hue value is expressed as the following pseudocode:

```
v=max(R, G, B)
w min(R, G, B)
c=v-w
r1=(v-R)/c
g1=(v-G)/c
b1=(v-B)/c
if (R==v)
   if(G==w)
      h=5+b1
   else
      h=1-g1
else if (G==v)
   if (B==w)
      h=1+r1
   else
      h=3-b1
else
   if (R==w)
      h=3+g1
   else
      h=5-r1
h=h/6
```

In order to calculate the color dissonance one must first determine which hues, as illustrated in FIG. 60, are present with sufficient strength to matter. For each object on the page, calculate its color saturation and area as described above. Lightly saturated objects should not contribute strongly. One way to carry this out is to compare the saturation to a threshold and ignore objects with insufficient saturation (i.e. c; must be greater than Tc where Tc is the threshold).

Another approach is to weight the object area by saturation as in $A_i'=A_i*c_i$. Other variations such as raising the saturation to a power before using it to weight the area are possible.

The identified colored areas can be summed across all the objects in order to determine how much area in each hue can be seen on the page. The areas can be collected in a table H of n possible hue buckets by means of a pseudocode expression such as: $H[n*h_i]=H[n*h_i]+A_i'$ where $h_i$ is the hue of the $i^{th}$ object and $A_i'$ is its weighted area.

To determine the color dissonance, compare every color hue found with every other color hue found. That is, compare all of the colors represented by the H table to one another. The H table tells the amount of area seen in each color hue and can be used to ignore cases where the total area of a color is too small to worry about. An alternative to collecting the colors for the objects on a page is to compare the color of each object with the color of its neighbors. Regardless of which method is used, the results from all comparisons must somehow be combined. A simple way of doing this is to just keep the maximum dissonance value encountered. A pseudocode example is as follows:

```
Vd = 0
for i from 1 to n
    { for j from i to n
        { dissonance = calculateDissonance(i, j, H[i], H[j])
            if dissonance > Vd
                Vd = dissonance
        }
    }
```

The calculateDissonance function might look as follows:

```
calculateDissonance(i, j, ai, aj)
{
    if ai > bigEnough and aj > bigEnough
        return dissonanceTable[j – i]
    otherwise
        return 0
}
``` where bigEnough is a threshold value used to ignore small areas of color and dissonance table is a table of color dissonance values.

Figure 96:
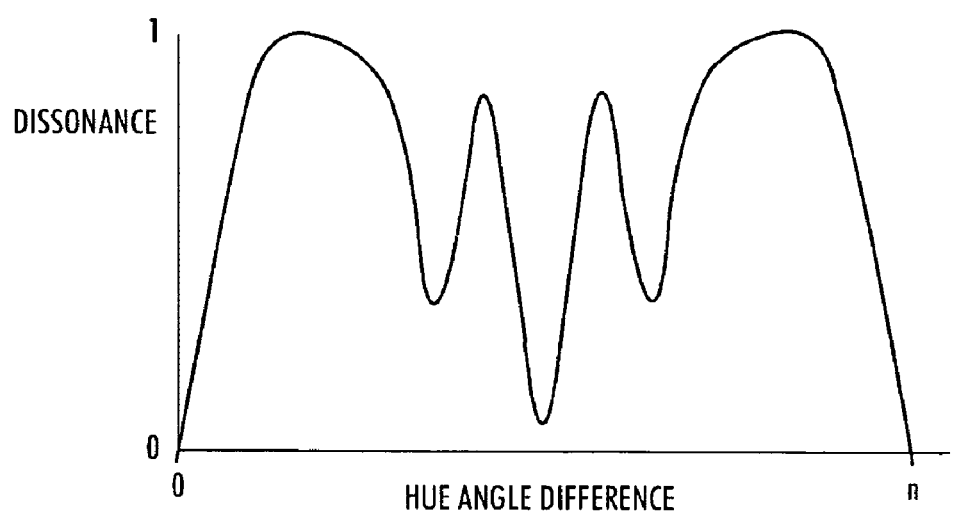
FIG. 96 illustrates color dissonance as a function of hue difference.

Using a table allows any desired function shape to be used; however direct calculation of the dissonance value is also possible. The dissonance table captures the model of color harmony and dissonance. A simple model is that the harmony of colors only depends on their hue difference and not the absolute hues themselves. Using this model, the dissonance table need only be indexed with the hue difference. An example of such a model is colors with hue angles that are similar (near 0 degrees apart) or opposite (180 degrees apart) or a third of the way round the hue circle (120 degrees apart) are considered harmonious while other hue angle differences are dissonant. The values stored in the dissonance table would look similar to those depicted graphically in FIG. 96.

Alternative calculations are possible. For example, one might weight each dissonance look-up by the product of the areas of the two color hues being considered and sum this weighted dissonance result over all comparisons. This sum should be normalized by dividing by the sum of all area products (without the dissonance result factored in). This calculation gives more of and overall average dissonance measure instead of a maximum dissonance. The particular methods for evaluating content color dissonance provided herein are exemplary and are not to be considered as limiting in scope. Other methods for determining color dissonance should be considered within the scope of the present invention, for example, a function of measured human responses to differing amounts and types of color; such that the present invention is directed to not only in the particular method of determining color dissonance but also in the concept of using a color dissonance measure in the context of evaluating document eye-catching ability and document quality.

In a preferred embodiment of the present invention, another mechanism for catching the eye is to use large fonts. This makes the text readable from a distance and gives it a feeling of importance. This mechanism can be used when the document is presented in black and white. It is the maximum font size that is important here (not the average). It can be found by stepping through all the fonts used (or stepping through all the text and finding the fonts) and keeping track of the largest. The maximum font size found should be converted to a number between 0 and 1 for combination with the other measures.

A way to do this is as follows: $V_f=f/(fn+f)$ where f is the maximum font size found and fn is close to the typical font size found in documents (e.g. 8 or 10 point).

One can also consider weighting the largest font by a function the number of characters. However, while increasing the number of characters may make the document more eye-catching when only a few characters are present, the effect may diminish for large numbers of characters.

The impact of font size can be calculated by considering all of the fonts within a document simultaneously, however, an alternative would be to determine the impact of each page separately and then to combine the results of the pages. Combining page results could be done by a simple average, and this may be appropriate for documents such as presentations. However, for many documents it is sufficient for only one page to be eye-catching (e.g. the cover page) and it may be better to employ a non-linear combining method that gives a high score if any of the individual page contributions are high. Or alternatively, one might use a weighted average where the first page is weighted higher than the other.

The particular methods for evaluating font size impact provided herein are exemplary and are not to be considered as limiting in scope. Other methods for determining font size should be considered within the scope of the present invention, for example, a function of measured human responses to differing sizes and types of fonts; such that the present invention is directed to not only in the particular method of determining a font size measure but also in the concept of using font and font size measures in the context of evaluating document eye-catching ability and document quality.

In a preferred embodiment of the present invention, page that is densely packed with information will typically require that information to be small and uniform and unlikely to catch the eye. This is not as hard-and-fast an indicator as color or font size because the information might, for example, be presented as a mixture of easy to ignore small black text and eye-catching large colored text. Never the less, one can use the information lightness (the inverse of information density) as another clue as to the documents eye-catching behavior.

For text, a rough measure of the information present is just the number of characters Nc used to encode the information. One might also consider alternative measures such as a count of the number of words.

For graphic figures, one can count the number of primitive graphical constructs (lines, rectangles, circles, arcs, strokes, triangles, polygons, etc.) used to build the figures. The count of graphic constructs Ng may be multiplied by a scaling value to normalize it with respect to the text measure.

Estimating the information content of pictorial images Np is more problematical. One simple approach is to just include a constant information estimation value for each image.

An alternative approach is to sum the variance of the pixel values from their neighborhood values and divide by the image area. Other schemes can also be used to estimate the information found in pictures. This estimate may also require a scaling factor to match its measure to that for text. The total information would then be: Nt=Nc+sg Ng+sp Np The information density is the total information divided by the area of the document: Id=Nt/Ad To convert this to a number ranging between 0 and 1 one can again employ the following method: $V_{id}$=Id/(a+Id) where a is a constant on the order of the typical information density value.

One can define the information lightness as the inverse of the information density as calculated by: $V_{il}$=1−$V_{id}$ The particular methods for evaluating information density and lightness provided herein are exemplary and are not to be considered as limiting in scope. Other methods for determining information lightness should be considered within the scope of the present invention, for example, a function of measured human responses to differing amounts and areas of information; such that the present invention is directed to not only in the particular method of determining information density or lightness, but also in the concept of using information lightness measures in the context of evaluating document eye-catching ability and document quality.

In a preferred embodiment of the present invention, pictures are more eye-catching than pure text. That is why there are pictures on paperback-book covers that are intended to attract viewers to purchase them, but only simple text inside to convey the story. Of course, not all pictures are equally interesting, and for a true measure of a picture eye-catching ability, some analysis of the picture content would be necessary. Still, the mere presence of any pictures in a document is generally an indicator of greater eye-catching ability. A simple measure of this is the fraction of the document area devoted to pictorial images Ap. A normalized measure is: Vp=Ap/Ad The particular method for evaluating picture fraction provided herein is exemplary and is not to be considered as limiting in scope. Other methods for determining picture fraction should be considered within the scope of the present invention, for example, a function of measured human responses to differing amounts of pictorial information; such that the present invention is directed to not only in the particular method of determining picture fraction but also in the concept of using a picture fraction measure in the context of evaluating document eye-catching ability and document quality.

In a preferred embodiment of the present invention, another indicator of how eye-catching a document is its novelty, that is, the presence of the unexpected or unconventional. Of course, to tell if something is unexpected or unconventional, one must first have some model of what is expected or conventional. Such models can be quite sophisticated and can include such factors as the type of document and its anticipated use. However, the use of novelty is illustrated with a simple model. That model is a single typical value expected for each style parameter.

Style parameters are the available choices that govern the appearance and presentation of the document. They can include the presence of backgrounds and borders, the thickness of borders and rules, paragraph indentation and separation, list indentation, list bulleting, font style, font weight and so on. Style parameters also include font size and color selections, which were considered separately above.

It is believed that it is proper to include color and font size in the estimation of novelty for completeness, but that they should also be singled out in the calculation of eye-catching ability since their contribution in this respect is much greater than would be explained by unconventionality alone.

In the simple model each style parameter $P_i$ has an anticipated value $P0_i$. For any style parameter, but particularly for parameters with binary (or enumerated) choices, one can simply add in a constant novelty contribution $n_i$ if the actual style $P_i$ does not match the expected value $P0_i$. More sophisticated calculations are possible; for example, when the style parameter can vary continuously from the expected value (as perhaps in the case of rule width or font size). A function of the style difference can be calculated as the novelty contribution: $n_i$=F($P_i$−$P0_i$)

For enumerated style values one can employ a table look-up to yield more flexibility and control over the novelty contribution. $n_i$=T[$P_i$]

The overall document novelty can be found by taking the average of the novel contributions for all style settings. Thus if the document had m style choices, the average novelty would be: Vn=Σ$n_i$/m The expected values P0$i$ can be set a priori, or preferably can be found by examining the style settings of typical documents. If they are determined by analyzing documents, the analysis can be conducted on an on-going basis and they can be allowed to adapt to the current typical document style.

In more sophisticated models, the expected style value may depend upon the location of the content item within the document's logical structure. Thus, the expected font style for a heading might be weighted differently from the expected setting for the body text. But however it is calculated, novelty can provide a clue as to the documents ability to catch the eye.

The particular methods for evaluating novelty provided herein are exemplary and are not to be considered as limiting in scope. Other methods for determining novelty should be considered within the scope of the present invention, for example, a function of measured human responses to differing styles. The present invention lies not only in the particular method of determining picture fraction but also in the concept of using a novelty measure in the context of evaluating document eye-catching ability and document quality.

Interest

A property of a document contributing to its quality that is similar to its eye-catching ability is the ability of the document to hold attention and interest. While a major contributor to the interest of a document is its subject matter, the presentation of that subject matter (the style and format) can affect the interest level as well. This invention provides a method of calculating an interest measure for the style and format decisions, calculated as a combination of simpler factors that contribute to interest. If any of the simpler interest factors is strongly present, then the overall effect is an interesting document.

Factors can include variety, change rate, emphasis, graphic fraction colorfulness, color dissonance, picture fraction, and/or novelty. Calculation methods are defined for each of these factors and each are designed to produce a value ranging between 0 and 1, such that 0 means low or bad interest value, and 1 means high or good interest value. These (and possibly other such factors) can be calculated and combined to form an overall interest measure Vi. The separate factors can be combined by a method similar to that described above for the eye-catching ability property.

The particular methods for evaluating ability of the document to maintain interest provided herein are exemplary and are not to be considered as limiting in scope. Other methods for determining how well the document maintains interest should be considered within the scope of the present invention, for example, a function of measured human responses to differing document characteristics with respect to the ability to maintain interest; such that the present invention is directed to not only in the particular method of determining the ability to maintain interest, but also in the much broader concept of using a combination of individual measures in the context of evaluating document interest and document quality.

Figure 62:
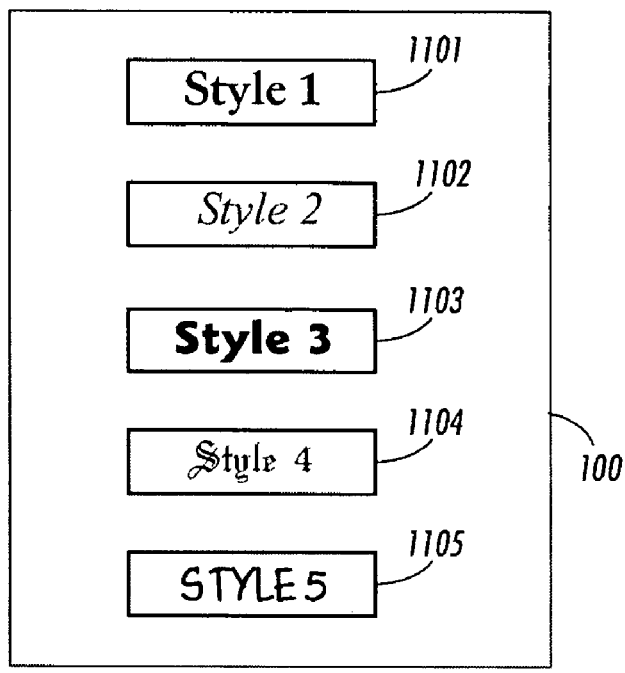
FIG. 62 illustrates an example of variety according to the concepts of the present invention.

As illustrated in FIG. 62, another parameter or factor used in determining interest is the measurement and quantization of the document's variety.

In a preferred embodiment of the present invention, one way to make a document interesting to look at is to include a variety of styles in its presentation. Style parameters are the available choices that govern the appearance and presentation of the document. They can include the presence of backgrounds and borders, the thickness of borders and rules, paragraph indentation and separation, list indentation, list bulleting, font style, font weight, font size, color selections and so on.

Style parameters can be grouped and associated with the logical structure of the content. For example, style parameters associated with a text string include the font family, font size, font style, font weight, and color.

Style parameters associated with a paragraph include the indentation, line length, line spacing, before and after spacing and quadding.

Style parameters associated with lists include left and right list indentation, bullet or numbering style, and bullet positioning.

In determining variety of style one is counting the number of styles present in the document, but this raises the question of just what constitutes a different style. Should style parameters be considered individually or as a group?

For example, if a document contains a 12-point bold weight font and a 10-point normal weight font, is that four styles (two sizes plus two weights) or just two styles (two fonts)? The answer for the preferred embodiment is two and the styles should be considered in combination.

But this still leaves the question of what combinations should be considered. If the 12-point bold is used in a list without bullets, and the 10-point normal is used in a list with bullets, is this still only two styles, or should the list styles and font styles be considered independently? This answer is less clear.

But, if one considers the correct grouping to be the entire set of style parameters so that whenever any style parameter changes a new overall style is generated, there is the potential of a combinational explosion of style instances. While this approach is not ruled out, the preferred method is to group the style parameters according to their associated content type (i.e. text styles, paragraph styles, graphic styles, list styles, table styles, content element background styles etc.).

Thus, in the above example, one would have two text styles and two list styles for four style choices in the document. This approach also avoids the problems arising from the growth of style parameters from the hierarchical structure of a document. If the document contains lists of lists of lists, the preferred approach gives three instances of the simple list style group instead of some new large group containing all the style choices of the structure.

To estimate the style variety, first decide what style parameters and parameter groups to include in the analysis. For example, one might decide to consider just the text, paragraph, and graphic styles. For text, consider font family, size, weight, style and color. For graphics, consider fill color, edge color and edge thickness. For paragraphs, consider line length, line spacing, quadding, and first-line indentation.

Three lists are constructed, one for each type of style group. The list elements contain the values of the style parameters for that group. One then steps through the document's logical structure, examining each logical element being analyzed for the style setting (in this example each text segment, graphic element and paragraph.) One considers the style parameter settings of each logical content element and checks the corresponding list to see if an entry has been made with a matching set of values.

If a matching list entry is found, nothing more need be done for this content element. If, however, the list does not contain a match, a new list element containing the new set of style values should be constructed and added to the list.

At the end of the document analysis, the lists should contain all of the style parameter combinations that were discovered. One can then simply count the number of list elements to determine the number of styles used. The sizes of all the lists should be combined into an overall style count. One can weight the list sizes when adding them together if one wishes to make the variety of one form of content count more than that of another (for example, one might make variety in paragraph style count more than variety in graphics). The result would be an overall weighted count of style changes s: $s=\Sigma w_x s_n$ where $s_x$ is the size of the $x^{th}$ style list and $w_x$ is the weight.

In order to combine the style variety measure with the other contributions to interest, this weighted count should be converted to a number ranging between 0 and 1. This can be done as follows: $V_v=s/(a_s+s)$ where $V_v$ is the variety measure and $a_s$ is a constant value about the size of the expected number of styles in a typical document. FIG. 62 is an example of high variety.

The particular methods for evaluating the variety of the document content and style provided herein are exemplary and are not to be considered as limiting in scope. Other methods for determining variety should be considered within the scope of the present invention, for example, a function of measured human responses to differing document characteristics with respect to variety; such that the present invention is directed to not only in the particular method of determining variety, but also in the much broader concept of using variety measures in the context of evaluating document interest and document quality.

Figure 63:
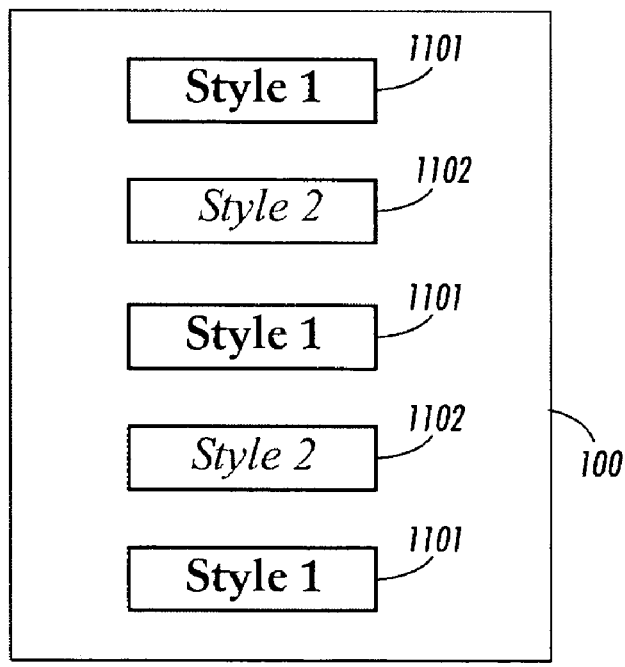
FIG. 63 illustrates an example of change rate according to the concepts of the present invention.

As illustrated in FIG. 63, another parameter or factor used in determining interest is the measurement and quantization of the document's change rate.

In a preferred embodiment of the present invention, it is not only the variety of styles in a document that holds interest, but also the rate at which the style changes. There may only be two style combinations represented, but if the document is frequently switching back and forth between them, it is more interesting than if it changes only once.

Calculating the style change rate is similar to calculating the style variety as described above, and uses the same style parameters and groupings. However, one need only to maintain for a single description of the most recently encountered style parameter set for each group (instead of a list of all previously encountered sets). For example, there would be a single set of most recently encountered text style parameters, a single set of the graphic style parameters and a set of the most recently encountered paragraph parameters. Step through the document's logical description and examine the style settings. Whenever a content element has style parameters that differ from those seen most recently, a count of the changes for that style group is incremented, and the new set of style values for use with the next content element is remembered. In a manner similar to the variety calculation, the change counts can be weighted and combined to form a total weighted change count c. $c=\Sigma w_x c_x$ where $c_x$ is the size of the $x^{th}$ style group change count and $w_x$ is the weight.

In order to combine the style change rate measure with the other contributions to interest, this weighted count should be converted to a number ranging between 0 and 1. This can be done as follows: $V_{ch}=c/(a_{ch}+c)$ where $V_{ch}$ is the variety measure and $a_{ch}$ is a constant value about the size of the expected number of style changes in a typical document. FIG. 63 is an example of high change rate.

The particular methods for evaluating the change rate of the document style provided herein are exemplary and are not to be considered as limiting in scope. Other methods for determining change rate should be considered within the scope of the present invention, for example, a function of measured human responses to differing document style characteristics with respect to perceived change rate; such that the present invention is directed to not only in the particular method of determining change rate, but also in the much broader concept of using change rate measures in the context of evaluating document interest and document quality.

In a preferred embodiment of the present invention, some font styles are chosen to emphasize the text. Large text, bold text, and underscored text all have an implied importance over the normal text presentation. This implied importance tells the reader to wakeup and pay attention. As such, it has a special contribution to the maintenance of viewer interest. One can calculate an average emphasis measure for the text in a document by summing an emphasis value for each character and then dividing by the total number of characters. $V_e=\Sigma e(t)/nc$ where $V_e$ is the emphasis measure, e is the emphasis function for character t, the sum is over all characters and nc is the total number of characters.

The function e(t) should include factors for the size of the text, its weight, its variant and its contrast (other factors such as font style might also be included). The larger the font size, the greater the emphasis, but one would like to have a factor that ranges between 0 and 1. An expression such as size(t)/($a_{fs}$+size(t)), where af, is a constant about the size of a typical font, will do this. The font weight (e.g. light, normal, bold, heavy) is typically an enumerated value and a table of suitable emphasis factors for each weight ew[weight(t)] can be used in the emphasis function. Similarly, the font variant (e.g. normal, underlined, strikethrough, outlined) can be handled as a table look-up such as ev[variant(t)].

Contrast also plays a role in the strength of text emphasis. Text with low contrast to the background will not have the same degree of impact as high contrast text. The luminance contrast can be calculated as described above as 2|Yb−Yf|/(Yb+Yf) where Yb is the luminance of the background and Yf=Lum(t) is the luminance of the text. An example of an emphasis function is then:

$$e(t)=(size(t)/(a_{fs}+size(t)))\ ew[weight(t)]ev[variant(t)] (2|Yb-Lum(t)|/(Yb+Lum(t)))$$

Note that one might also include other characteristics such as the font style (e.g. italic). The particular methods for evaluating emphasis provided herein are exemplary and are not to be considered as limiting in scope. Other methods for determining emphasis should be considered within the scope of the present invention, for example, a function of measured human responses to differing document style characteristics with respect to emphasis; such that the present invention is directed to not only in the particular method of determining emphasis, but also in the much broader concept of using emphasis measures in the context of evaluating document interest and document quality.

Figure 64:
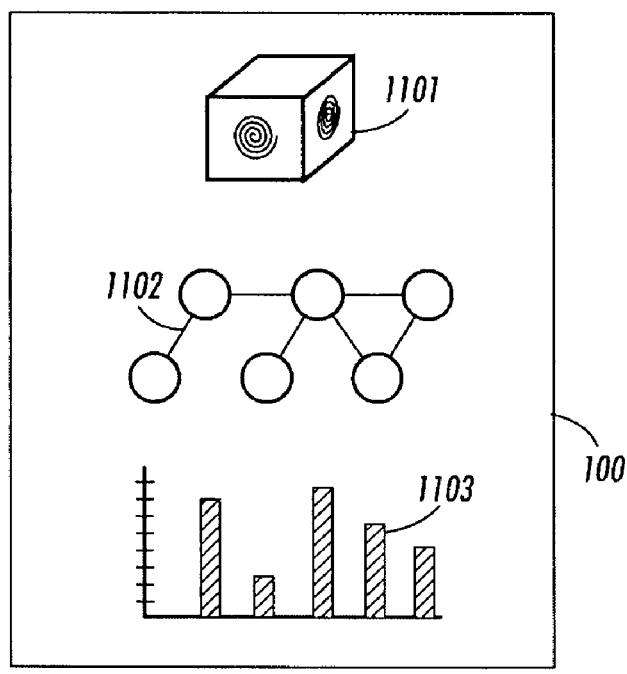
FIG. 64 illustrates an example of graphic fraction according to the concepts of the present invention.

As illustrated in FIG. 64, another parameter or factor used in determining interest is the measurement and quantization of the document's graphical fraction.

In a preferred embodiment of the present invention, graphical constructs are often used to explain or illustrate concepts and ideas. They also add variety to the content. As such, graphics can make a document more interesting, and so, a measure of the graphical content should contribute to the estimation of how interesting the document is.

One simple measure of the graphical contribution is just a count of the graphical content objects encountered in the document.

An alternative approach is to sum the areas of the bounding boxes that enclose each of the graphical content objects encountered. This sum can then be divided by the total area of the document to yield a number ranging between 0 and 1.

A third approach is to examine the graphical content objects in greater detail and to count the primitive drawing objects such as lines, curves, rectangles, polygons and ellipses from which they are constructed. This approach gives a better measure of the complexity of the graphic and possibly a better measure of how interesting that graphic is. The counts for the various drawing primitives can be weighted to indicate how interesting that drawing primitive is (for example, an ellipse might be considered more interesting than a rectangle) and summed to give an overall weighted graphic count: $g=\Sigma w_x g_x$ where $g_x$ is the count of the $x^{th}$ type of graphic construct and $w_x$ is the weight.

In order to combine the graphic fraction measure with the other contributions to interest, this weighted count should be converted to a number ranging between 0 and 1. This can be done as follows: $V_g=g/(a_g+g)$ where $V_g$ is the variety measure and $a_g$ is a constant value about the size of the expected number of graphic drawing primitives in a typical document.

An alternative is to divide the count of graphic drawing primitives, by a count of the total drawing primitives $N_{dp}$ in the document (including characters and images). This approach removes the dependence on the document size. $V_g=g/N_{dp}$. FIG. 64 illustrates an example of a high graphical fraction.

The particular methods for evaluating graphic fraction provided herein are exemplary and are not to be considered as limiting in scope. Other methods for determining graphic fraction should be considered within the scope of the present invention, for example, a function of measured human responses to differing document style characteristics with respect to emphasis; such that the present invention is directed to not only in the particular method of determining graphic fraction, but also in the much broader concept of using graphic fraction measures in the context of evaluating document interest and document quality.

Several of the factors that attract attention and catch the viewer's eye, will also serve to hold the attention and interest. One can list the properties of colorfulness, color dissonance, picture fraction, and novelty as examples of this joint use. The difference in behavior between attention and interest is one of relative importance or weight. Colorfulness, for example, can be very important in catching the eye, but less important in maintaining interest. Novelty, on the other hand, can be more important to maintaining interest than it is to capturing attention. Methods for estimating the strength of these four measures were described above.

The particular methods for evaluating colorfulness, color dissonance, picture fraction, and novelty provided herein are exemplary and are not to be considered as limiting in scope. Other methods for determining these measures should be considered within the scope of the present invention, for example, a function of measured human responses to differing document color, picture and style characteristics with respect to the measures; such that the present invention is directed to not only in the particular method of determining the measures, but also in the much broader concept of using colorfulness, color dissonance, picture fraction, or novelty measures in the context of evaluating document interest and document quality.

A combination of measures, as illustrated in FIG. 61, is useful in evaluating the document's interest.

More specifically, the interest, as illustrated in FIG. 61, is considered a combination of variety, change rate, emphasis, graphic fraction, colorfulness, color dissonance, picture fraction, and/or novelty. In FIG. 61, the quantized interest value is derived by a combining of the variety, change rate, emphasis, graphic fraction, colorfulness, color dissonance, picture fraction, and/or novelty using an interest quantizer or combiner circuit 40.

It is noted that the illustration shows a circuit for the eye-catching ability quantization process, this process may also be performed in software by the microprocessor and/or firmware. The quantization is not limited to specific circuits, but any combination of software and/or hardware that is able to carry out the below described methodologies.

Communicability

Another factor contributing to the quality of a document design is how well that design aids in communicating the information contained within the document to the user. The present invention provides a method of calculating such a communicability measure.

As with aesthetics and ease-of-use, the approach to quantifying communicability is to evaluate factors identified as contributing to the effectiveness of the communication. These factors are then combined to form a composite measure. The factors contribute to the quality of the document design. If any of the simpler communicability factors is absent, then the overall ability of the document to communicate is reduced.

Component factors can include legibility, information lightness, technical level, text and image balance, red-green friendliness, ease of progression, and/or ease of navigation. Each factor can be defined such as to produce a value ranging between 0 and 1, where 0 means low or bad communicability value and 1 means high or good communicability value. These, (and possibly other such factors), can be calculated and combined to form an overall communicability measure in a manner similar to that described above for aesthetics. If $V_i$ is the value calculated for the $i^{th}$ rule, then the communicability measure $V_{CM}$ is formed as a function E of these contributions: $V_{CM}=E(V_L, V_{il}, V_{tl}, V_{tib}, V_{rg}, V_{ep} \ldots V_{en})$ The combining function E can be as simple as a weighted average of the contributions, but because any bad contributor can lead to a poor communicating document, no matter how good the others are, a linear combination is not preferred. An alternative is to use: $V_{CM}=(\Sigma w_i(d+V_i)^{-p})^{-1/p}-d$ Here d is a number slightly larger than 0. The closer the value of d to 0, the more strongly a bad value will cancel all other values. The $w_i$ factors are the weights that specify the relative importance of each rule; they should sum to 1. The exponent p introduces a nonlinearity that can also increase the strength by which one bad value can overwhelm many good ones. The larger p is, the greater this effect.

Other combining functions are possible as mentioned above. The particular methods for evaluating ability of the document to communicate provided herein are exemplary and are not to be considered as limiting in scope. Other methods for determining how well the document communicates should be considered within the scope of the present invention, for example, a function of measured human responses to differing document characteristics with respect to the ability to communicate; such that the present invention is directed to not only in the particular method of determining the ability to communicate, but also in the much broader concept of using a combination of individual measures in the context of evaluating document communicability and document quality.

Figure 65:
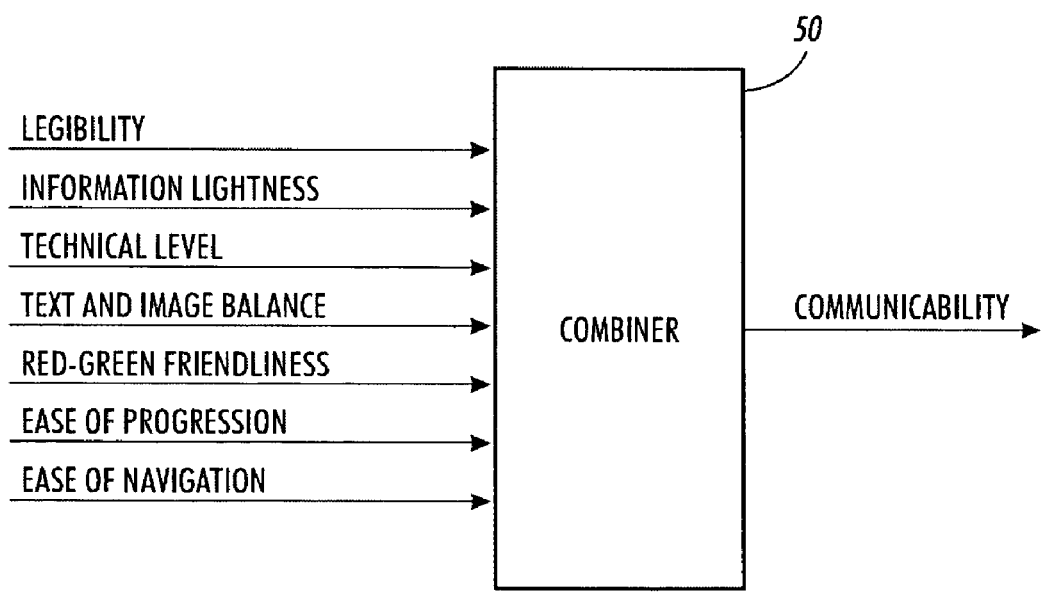
FIG. 65 illustrates a conceptual circuit for quantifiably measuring communicability according to the concepts of the present invention.

A combination of measures, as illustrated in FIG. 65, is useful in evaluating the document's communicability.

More specifically, the communicability, as illustrated in FIG. 65, is considered a combination of legibility, information lightness, technical level, text and image balance, red-green friendliness, ease of progression, and/or ease of navigation. In FIG. 65, the quantized communicability value is derived by a combining of the legibility, information lightness, technical level, text and image balance, red-green friendliness, ease of progression, and/or ease of navigation using a communicability quantizer or combiner circuit 50.

It is noted that the illustration shows a circuit for the communicability quantization process, this process may also be performed in software by the microprocessor and/or firmware. The quantization is not limited to specific circuits, but any combination of software and/or hardware that is able to carry out the below described methodologies.

Figure 66:
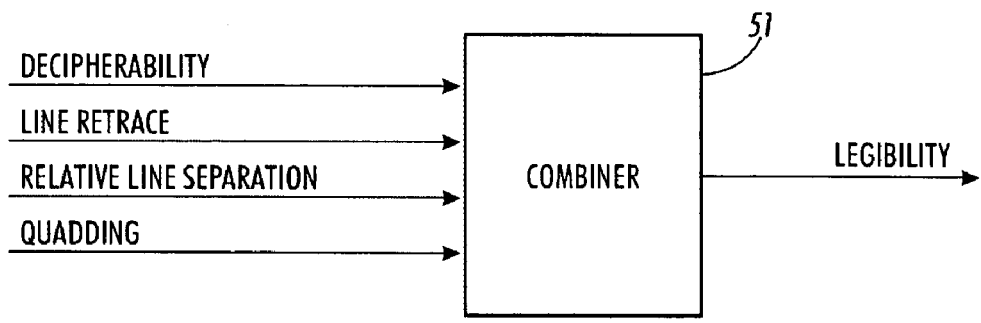
FIG. 66 illustrates a conceptual circuit for quantifiably measuring legibility according to the concepts of the present invention.

It is further noted that a combination of measures, as illustrated in FIG. 66, is useful in evaluating the document's legibility.

More specifically, the legibility, as illustrated in FIG. 66, is considered a combination of decipherability, line retrace, relative line separation, and/or quadding. In FIG. 66, the quantized legibility value is derived by a combining of the decipherability, line retrace, relative line separation, and/or quadding using a legibility quantizer or combiner circuit 51.

It is noted that the illustration shows a circuit for the legibility quantization process, this process may also be performed in software by the microprocessor and/or firmware. The quantization is not limited to specific circuits, but any combination of software and/or hardware that is able to carry out the below described methodologies.

In a preferred embodiment of the present invention, one of the first and foremost factors in estimating a document's communication effectiveness is the legibility of its text. Legibility measures the ease of following and recognizing the words of the document when reading. Legibility is itself a property that can be broken down into contributing components. As noted above, chief among these components is decipherability, line retrace, relative line separation, and/or quadding. Other factors that might also be considered include the word and character spacing and the use of hyphenation.

Figure 67:
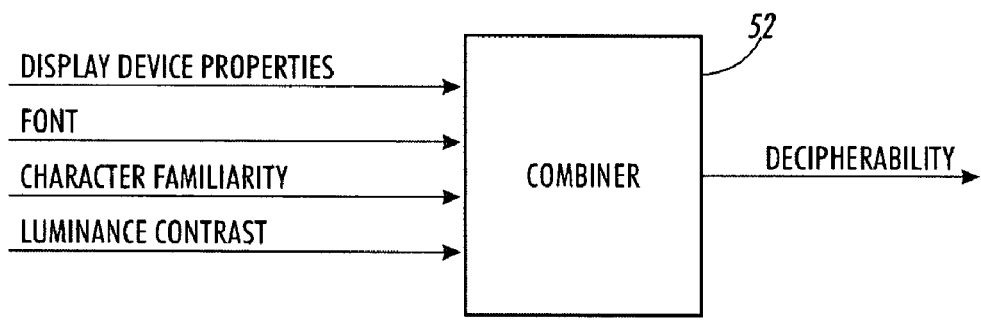
FIG. 67 illustrates a conceptual circuit for quantifiably measuring decipherability according to the concepts of the present invention.

A combination of measures, as illustrated in FIG. 67, is useful in evaluating the document's decipherability.

More specifically, the decipherability, as illustrated in FIG. 67, is considered a combination of display device properties, font, character familiarity, and/or luminance contrast. In FIG. 67, the quantized legibility value is derived by a combining of the display device properties, font, character familiarity, and/or luminance contrast using a decipherability quantizer or combiner circuit 52.

It is noted that the illustration shows a circuit for the decipherability quantization process, this process may also be performed in software by the microprocessor and/or firmware. The quantization is not limited to specific circuits, but any combination of software and/or hardware that is able to carry out the below described methodologies.

In a preferred embodiment of the present invention, decipherability, the most complex of the legibility factors, measures the ability to recognize the letter shapes. It can itself be further broken down into simpler pieces. As noted above, factors that contribute to the decipherability include the display device, the font, the character familiarity, and/or the luminance contrast.

The properties of the display device and the font may often be considered together; that is, one determines how decipherable a particular font is on a particular device. For example, fonts with serifs are, as a rule, easier to decipher than san serif fonts; but on a device that cannot effectively produce serifs, this may not be true. The font family, font size, font weight, font style, and font variant all can contribute to the decipherability.

An approach to dealing with the effect of font specification and device choice is to measure by experiment the decipherability (the ability to correctly determine the character presented) for a fully specified font on a particular device. This measurement can then be handled as a font property. Given the font specification one can then look tip the font's decipherability contribution in a font table (df=DF [font specification]).

If the font is to be displayed on the same type of device as was used for the measurement, the font contribution will not require further adjustment for the device. However, if a different display device type is used, then some sort of adjustment is needed. For example, fonts are, in general, much more decipherable when printed on paper than when presented on a CRT display. An example of an adjustment to the font decipherability is to multiply it by an adjustment factor ad for the display device.

One way to determine the adjustment factor is as a function of the smallest font size that the device is capable of effectively presenting. The function could, for example, be the ratio of the smallest effective text size for the device used in measuring the font decipherability to the smallest effective text size for the display to actually be used. For example, if the font properties were measured on a CRT that could effectively display only 8-point or larger fonts, but was to be printed on paper that could support 4-point fonts or larger, then the device adjustment factor should be 2. One may wish to adjust this factor according to the font size actually used because the effect of the display may be less important for large text.

The ease in correctly deciphering a character depends upon the familiarity with it. Reading all caps is harder than reading normal text. Numbers and punctuation characters each have their own degree of difficulty. Thus, another adjustment factor ac for the familiarity of a character should be multiplied in. This adjustment factor can be found from a table indexed by the character code.

The contrast of the character with the background also contributes to the decipherability. It is harder to decipher light yellow characters on a white background than to decipher black ones. A third adjustment factor is the luminance contrast that can be calculated as was described above for locatability: $al=2|Yb-Yt|/(Yb+Yt)$ where Yb is the luminance of the background and Yt is the luminance of the text.

The overall decipherability for a character is therefore given by: $dc=df\ ad\ ac\ al$ An average overall decipherability d, for a string of text, can be found by finding the sum of the decipherability measures for each character in the string and then dividing by the total count of characters in the string.

The particular methods for evaluating decipherability provided herein are exemplary and are not to be considered as limiting in scope. Other methods for determining decipherability should be considered within the scope of the present invention, for example, a function of measured human responses to differing document text characteristics with respect to decipherability; such that the present invention is directed to not only in the particular method of determining decipherability, but also in the much broader concept of using decipherability measures in the context of evaluating document legibility, communicability and document quality.

Figure 68:
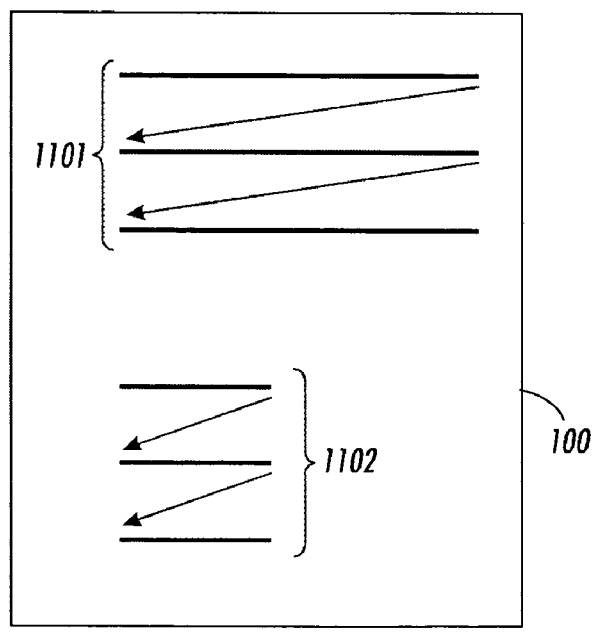
FIG. 68 illustrates an example of line retrace according to the concepts of the present invention.

As illustrated in FIG. 68, another parameter or factor used in determining legibility is the measurement and quantization of the document's line retrace.

In a preferred embodiment of the present invention, the second factor contributing to text legibility is the length of the text lines. There is some cost in moving the eye from the end of one line to the start of the next, but the cost increases with the length of the line. This cost is included by multiplying the decipherability by a line retrace factor r. An example of a function that can be used for this factor is: $r=B/(n^2+B)$ where B is a constant (with value on the order of 3600) and n is the average number of characters per line.

In FIG. 68, the retracing of the group of lines 1101 makes it more difficult for the reader to find the next line due to the long length of the text line. On the other hand, in FIG. 68, the retracing of the group of lines 1102 makes it easier for the reader to find the next line due to the short length of the text line.

The particular methods for evaluating line retrace characteristics with respect to legibility provided herein are exemplary and are not to be considered as limiting in scope. Other methods for determining line retrace effects on legibility should be considered within the scope of the present invention, for example, a function of measured human responses to differing document text line characteristics with respect to line retrace and legibility; such that the present invention is directed to not only in the particular method of determining line retrace characteristics, but also in the much broader concept of using line retrace measures in the context of evaluating document legibility, communicability and document quality.

Figure 69:
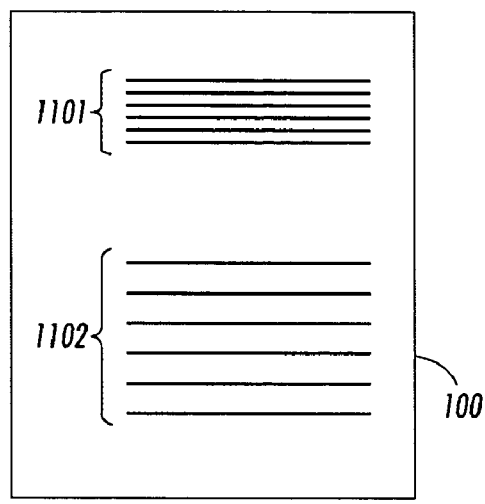
FIG. 69 illustrates an example of line separation according to the concepts of the present invention.

As illustrated in FIG. 69, another parameter or factor used in determining legibility is the measurement and quantization of the document's relative line separation.

In a preferred embodiment of the present invention, the third contribution to legibility is the relative line separation. Increasing the separation between line acts to improve legibility. It makes it easier for the eye to track correctly from the end of a line to the start of the next line. The effect of lines separation is included by means of a line separation factor s. An example of a function that can be used is as follows: $s=y/(y+g)$ where g is a constant (e.g. 0.1) that controls how legibility improves with line separation, and y is a biased relative separation defined by: $y=(hL-hf)/hf+bs$ where hL is the height of the line (baseline to baseline) hf is the height of the font and bs is a small biasing term (e.g. 0.1) to indicate just how far lines must overlap before they become unreadable.

In FIG. 69, the relative line separation of the group of lines 1101 makes it more difficult for the reader to find the next line due to the closely packed text lines. On the other hand, in FIG. 69, the relative line separation of the group of lines 1102 makes it easier for the reader to find the next line due to the widely spaced text lines.

The particular methods for evaluating relative line separation effect on legibility provided herein are exemplary and are not to be considered as limiting in scope. Other methods for determining line separation effects should be considered within the scope of the present invention, for example, a function of measured human responses to differing document text line spacing characteristics with respect to relative line spacing and legibility; such that the present invention is directed to not only in the particular method of determining line spacing, but also in the much broader concept of using line spacing measures in the context of evaluating document legibility, communicability and document quality.

As illustrated in FIGS. 70 to 73, another parameter or factor used in determining legibility is the measurement and quantization of the document's quadding.

In a preferred embodiment of the present invention, legibility is also affected by the quadding (i.e. the alignment and justification of the text). Left-aligned unjustified text is easiest to read, and justified text is almost as easy. Center-aligned text is more difficult and right aligned is the hardest of all. A factor for the effect of the quadding can be stored in the table and looked up for the legibility calculation of text t. $q=Q[quadding(t)]$ The particular methods for evaluating contribution from quadding to legibility provided herein are exemplary and are not to be considered as limiting in scope. Other methods for determining the quadding contribution should be considered within the scope of the present invention, for example, a function of measured human responses to differing document text quadding choices with respect to legibility; such that the present invention is directed to not only in the particular method of determining the quadding contribution, but also in the much broader concept of using quadding measurements in the context of evaluating document legibility, communicability and document quality.

The complete legibility calculation is then given by: $V_L = d\ r\ s\ q$

This gives the legibility for a particular text element such as a paragraph.

To arrive at a legibility measurement for an entire document, one must measure the legibility of each paragraph and then combine them. Combining can be done by a simple average, but it may be preferred to use a non-linear method such that a low legibility score on any paragraph can result in a lower overall score that would be obtained by a simple average. Methods such as the root of the average of powers that have been described can be used to achieve this effect.

Figure 70:
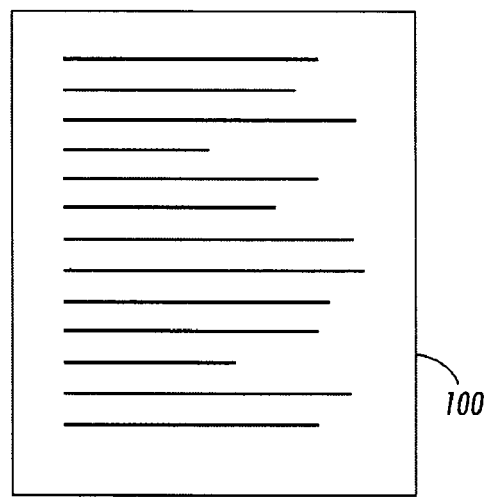
FIGS. 70 to 73 illustrate examples of quadding according to the concepts of the present invention.
Figure 71:
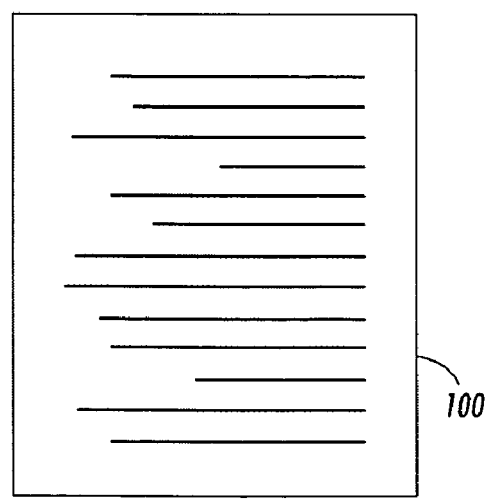
Figure 72:
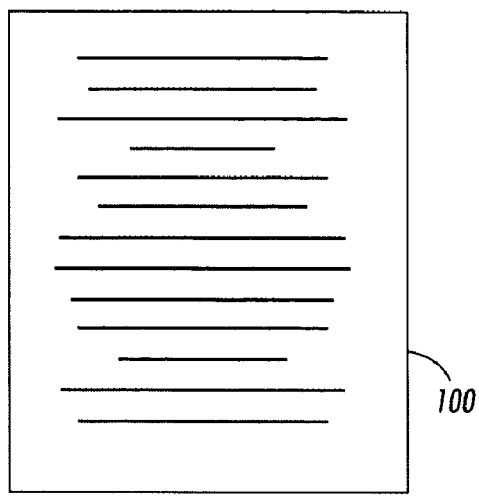
Figure 73:
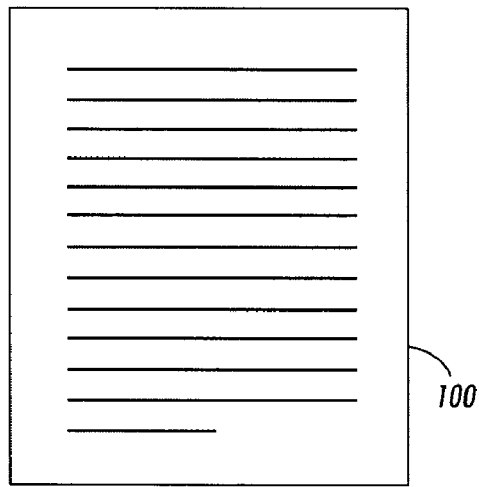

FIG. 70 illustrates an example of a left aligned document.
FIG. 71 illustrates an example of a right aligned document.
FIG. 72 illustrates an example of a center aligned document.
FIG. 73 illustrates an example of a justified document.

The particular methods for evaluating document legibility provided herein are exemplary and are not to be considered as limiting in scope. Other methods for determining the document legibility should be considered within the scope of the present invention, for example, a function of measured human responses to differing text characteristics with respect to legibility; such that the present invention is directed to not only in the particular method of determining the legibility, but also in the much broader concept of using a combination of individual measures in the context of evaluating document legibility, communicability and document quality.

In a preferred embodiment of the present invention, it takes time to decipher text and to understand the concepts. In general, a short road sign communicates more effectively than a long one. The information lightness, (the inverse of information density), of a document is included as another factor in how well it communicates. This factor is not nearly as important as legibility and is weighted accordingly.

A method for calculating information lightness was described in the discussion of eye-catching ability.

The particular methods for evaluating information density and lightness provided herein are exemplary and are not to be considered as limiting in scope. Other methods for determining information lightness should be considered within the scope of the present invention, for example, a function of measured human responses to differing amounts and areas of information; such that the present invention is directed to not only in the particular method of determining information density or lightness, but also in the concept of using information lightness measures in the context of evaluating document communicability and document quality.

In a preferred embodiment of the present invention, the ease with which a document communicates also depends upon the audience for which it was designed. A child's book will probably be easier to follow than a technical manual. The technical level is a measure that estimates this intended degree of sophistication. It can be composed from simple measures that can include reading ease, number fraction, and/or picture fraction. The presence of graphic constructs may also have an effect on the technical level, but it is unclear at this time whether the effect is to increase or decrease it. It has therefore not been included in this example measure.

Figure 74:
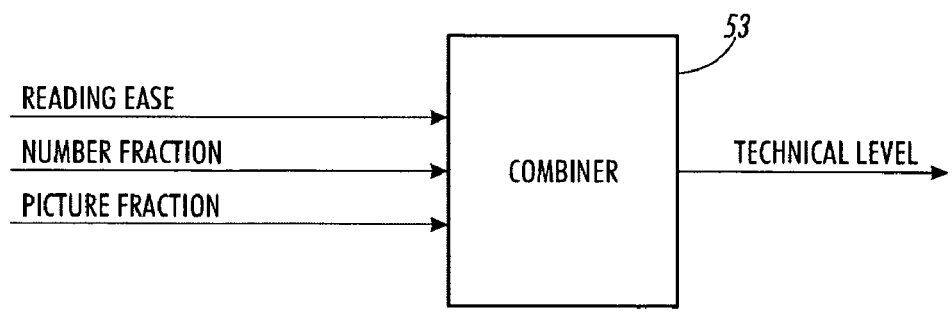
FIG. 74 illustrates a conceptual circuit for quantifiably measuring technical level according to the concepts of the present invention.

A combination of measures, as illustrated in FIG. 74, is useful in evaluating the document's technical level.

More specifically, the technical level, as illustrated in FIG. 74, is considered a combination of reading ease, number fraction, and/or picture fraction. In FIG. 74, the quantized technical level value is derived by a combining of the reading ease, number fraction, and/or picture fraction using a technical level quantizer or combiner circuit 53.

It is noted that the illustration shows a circuit for the technical level quantization process, this process may also be performed in software by the microprocessor and/or firmware. The quantization is not limited to specific circuits, but any combination of software and/or hardware that is able to carry out the below described methodologies.

In a preferred embodiment of the present invention, reading ease is a well-known measure of a document's text. An example of a reading ease algorithm is: RE=206.835–

0.846 Sy−1.015 W where Sy is the average number of syllables per 100 words and W is the average number of words per sentence.

For the calculation of technical level one wants a reading difficulty measure, which can be roughly calculated as: Rd=0.85 Sy+W The particular methods for evaluating contribution from reading ease to technical level provided herein are exemplary and are not to be considered as limiting in scope. Other methods for determining the reading ease contribution should be considered within the scope of the present invention, for example, a function of measured human responses to differing document text elements with respect to reading ease; such that the present invention is directed to not only in the particular method of determining the reading ease contribution, but also in the much broader concept of using reading ease measures in the context of evaluating document technical level, communicability and document quality.

In a preferred embodiment of the present invention, words are easier to comprehend than numbers; a large table of numbers is typically much more difficult to grasp than an equal quantity of words. To capture this, calculate the number fraction Fn, measure the ratio of numbers to the total of numbers and words.

The particular methods for evaluating contribution from number fraction to technical level provided herein are exemplary and are not to be considered as limiting in scope. Other methods for determining the number fraction contribution should be considered within the scope of the present invention, for example, a function of measured human responses to differing amounts of numbers with respect to technical level; such that the present invention is directed to not only in the particular method of determining the number fraction contribution, but also in the much broader concept of using number fraction measures in the context of evaluating document technical level, communicability and document quality.

In a preferred embodiment of the present invention, pictures are used to aid understanding. The use of pictures reduces the technical level measure. Picture fraction was defined above as: Fp=Ap/Ad where Ap is the area of the pictures and Ad is the total area of the document.

One actually needs the inverse behavior of the picture fraction, so that as Fp increases, the technical level decreases. Using Fnp=1−Fp is possible, but a few images can make a big difference in the technical level, while as more images are added, the benefits may fall off. Thus a better choice is a nonlinear function such as: Fnp=1/(ap+Fp) where ap is a constant near 1.

The particular methods for evaluating contribution from picture fraction to technical level provided herein are exemplary and are not to be considered as limiting in scope. Other methods for determining the picture fraction contribution should be considered within the scope of the present invention, for example, a function of measured human responses to differing amounts of pictorial elements in a document with respect to technical level; such that the present invention is directed to not only in the particular method of determining the picture fraction contribution, but also in the much broader concept of using picture fraction measures in the context of evaluating document technical level, communicability and document quality.

The technical level measure can then be computed as: Tl=Rd Fn Fnp

However, Rd (and therefore Tl) is not limited to range only between 0 and 1. This can be remedied by the function: $V_{tl}$=Tl/(atl+Tl) where atl is a positive constant.

The particular methods for evaluating document technical level provided herein are exemplary and are not to be considered as limiting in scope. Other methods for determining the document technical level should be considered within the scope of the present invention, for example, a function of measured human responses to differing document characteristics with respect to technical level; such that the present invention is directed to not only in the particular method of determining the technical level, but also in the much broader concept of using a combination of individual measures in the context of evaluating document technical level, communicability and document quality.

Figure 75:
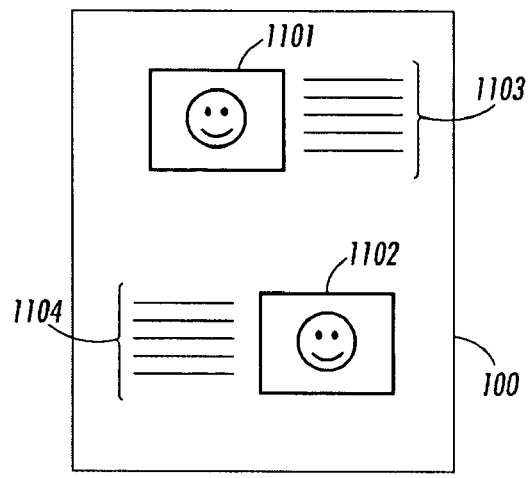
FIGS. 75 to 77 illustrate examples of image balance according to the concepts of the present invention.
Figure 76:
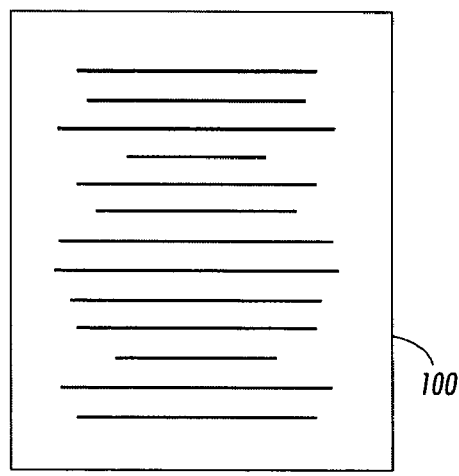
Figure 77:
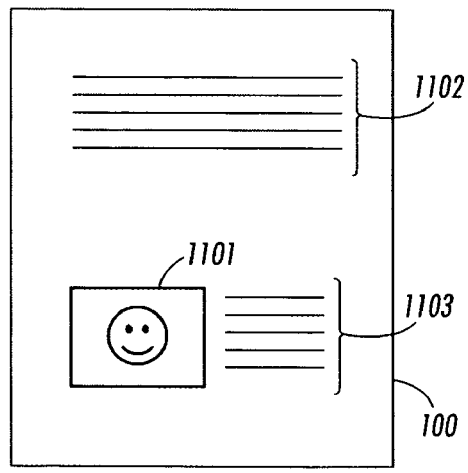

As illustrated in FIGS. 75 to 77, another parameter or factor used in determining communicability is the measurement and quantization of the document's text and image balance.

In a preferred embodiment of the present invention, when considering technical level, it was assumed that the more images, the lower the level (although with diminishing returns). But for communicability, this rule may not apply in general. If a document is solely composed of images without any textual explanation it may be difficult to be sure of the author's message. A rule of design is that ideally about equal amounts of document area should be devoted to text and to illustration. The difference between the areas is a measure of the unbalance, and an inverse can be applied to give a balance measure. For example, if the total area devoted to text is At and the total area devoted to pictures is Ap then a measure of the text and image balance is given by: Vtib=1−|At−Ap|/(At+Ap)

FIG. 75 illustrates an example of poor text and image balance. FIG. 76 illustrates an example of poor text and image balance. FIG. 77 illustrates an example of good text and image balance.

The particular methods for evaluating contribution from text and image balance to communicability provided herein are exemplary and are not to be considered as limiting in scope. Other methods for determining the text and image balance contribution should be considered within the scope of the present invention, for example, a function of measured human responses to differing ratios of document text and image elements with respect to communicability; such that the present invention is directed to not only in the particular method of determining the text and image balance contribution, but also in the much broader concept of using text and image balance measures in the context of evaluating document communicability and document quality.

In a preferred embodiment of the present invention, another aspect of how well a document communicates is its ability to serve viewers with handicaps or impairments. An example of this is whether the document can be used by the fraction of men who are red-green colorblind. One element of red-green friendliness is checking that an object's color and its background color differ by more than just a red-green contrast. Luminance contrast and blue-yellow contrast are the mechanisms by which the colorblind can distinguish the foreground objects from background. Step through the document examining the foreground and background colors for each object. If a color is specified by its red, green and blue components (R, G, B), then the luminance and luminance contrast CY can be calculated as described above.

The blue-yellow contrast can be calculated from the S chrominance component, defined as: S=(R+G)/2−B The blue-yellow contrast is calculated similarly to the luminance case as: Cby=2|Sf−Sb|/(2+Sf+Sb) where Sf and Sb are the foreground and background S chrominance components respectively.

The red-green friendliness of an object can be estimated by combining the luminance and blue-yellow chrominance contrast components: $Frg=(CY+Cby)/2$ A weighted average can also be used to combine the contrast components.

For the entire document some mechanism is needed for combining the red-green friendliness values for all document objects. One way to do this is to average the values weighted by the corresponding object areas. If $Frg_i$ is the red-green friendliness of the $i^{th}$ object and $A_i$ is its area, then the average would be given by: $V_{rg}=(\Sigma Frg_i A_i)/\Sigma A_i$ where the sums are over all objects.

However, a single small object or set of objects that are difficult to decipher can have a large impact on the overall understanding of the document. Thus, some method other that weighting by area may be preferred for combining friendliness values. An alternative is to look for the minimum value as in: $V_{rg}=MIN(Frg_i)$ A third approach combines features of the above two methods. The values are weighted by area, but values are raised to a power in a way that emphasizes low values. $V_{rg}((\Sigma(drg+Frg_i)^{-P}A_i)/\Sigma A_i)^{-1/P}-drg$ where drg is a positive constant near zero and p is a positive power 1 or greater.

Other methods of combining the friendliness values are also possible. The particular methods for evaluating contribution from red-green friendliness to communicability provided herein are exemplary and are not to be considered as limiting in scope. Other methods for determining the red-green friendliness or other document characteristics that support users with handicaps should be considered within the scope of the present invention, for example, a function of measured color-blind human responses to differing color with respect to communicability; such that the present invention is directed to not only in the particular method of determining the red-green friendliness contribution, or other handicap compensation characteristic, but also in the much broader concept of using handicap compensation measures in the context of evaluating document communicability and document quality.

Figure 78:
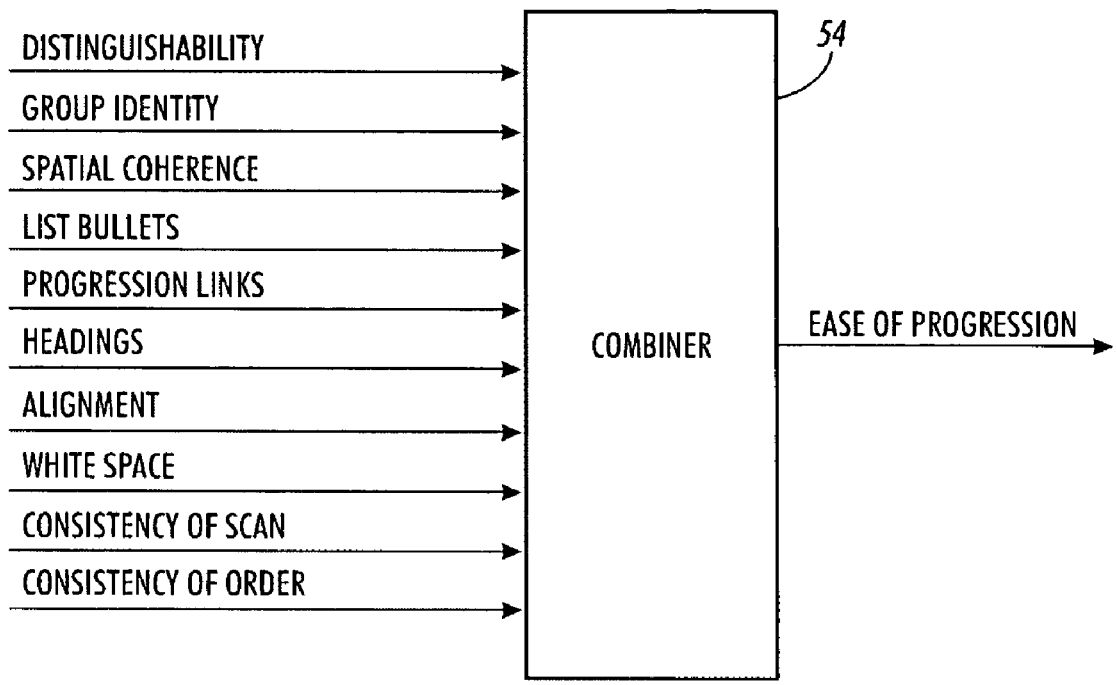
FIG. 78 illustrates a conceptual circuit for quantifiably measuring ease of progression according to the concepts of the present invention.

In a preferred embodiment of the present invention, one more property that has a bearing on the communicability of a document is the ease of progression, as illustrated in FIG. 78. Ease of progression measures the difficulty in progressing from one document component to the next component in logical order; for example, in moving from the bottom of one column to the top of the next. An estimation of the ease of progression is calculated as a composite of several properties, each of which aids in the progression process. These properties include distinguishability, group identity, spatial coherence, list bullets, progression links, headings, alignment, white space, consistency of scan, and/or consistency of order.

These contributing factors are combined using a weighted average since they are not all equally important. $V_{ep}=w_{ds} V_{ds}+w_{gi} V_{gi}+w_{sc} V_{sc}+w_{lb} V_{lb}+w_{plk} V_{plk}+w_{hd} V_{hd}+w_{al} V_{al}+ w_{ws} V_{ws}+w_{cs} V_{cs}+w_{co} V_{co}$ where the w's are the weights and the V's are the contributing factors.

Note that alternative methods of combination are possible. The particular methods for evaluating document ease of progression provided herein are exemplary and are not to be considered as limiting in scope. Other methods for determining the document ease of progression should be considered within the scope of the present invention, for example, a function of measured human responses to differing document characteristics with respect to ease of progression; such that the present invention is directed to not only in the particular method of determining the ease of progression, but also in the much broader concept of using a combination of individual measures in the context of evaluating document ease of progression, communicability and document quality.

A combination of measures, as illustrated in FIG. 78, is useful in evaluating the document's ease of progression.

More specifically, the ease of progression, as illustrated in FIG. 78, is considered a combination of distinguishability, group identity, spatial coherence, list bullets, progression links, headings, alignment, white space, consistency of scan, and/or consistency of order. In FIG. 78, the quantized ease of progression value is derived by a combining of the distinguishability, group identity, spatial coherence, list bullets, progression links, headings, alignment, white space, consistency of scan, and/or consistency of order using an ease of progression quantizer or combiner circuit 54.

It is noted that the illustration shows a circuit for the ease of progression quantization process, this process may also be performed in software by the microprocessor and/or firmware. The quantization is not limited to specific circuits, but any combination of software and/or hardware that is able to carry out the below described methodologies.

In a preferred embodiment of the present invention, the distinguishability indicating how well one can distinguish an element from its neighbors, the group identity property indicating how easy it is to tell which objects belong as part of a logical group and which do not, the spatial coherence property that measures how closely packed together the members of a group are, and headings that describe the logical structure, were defined above in the discussion of the group contribution to ease of use. These factors also contribute to how well the document communicates, but with weights to reflect different relative importance. Spatial Coherence is singled out here because it has particular relevance to ease of progression and one may wish to give its contribution a different weight form that entering via group identity.

The discussion of headings measured above combined headings, list bullets and list numbers all as one measure, but one can leave out the checks for list bullets and numbers and adapt the method to look at headings alone. This could allow headings and list bullets to be calculated separately and weighted independently.

The particular methods for evaluating contribution from distinguishability, group identity, and headings to ease of progression provided herein are exemplary and are not to be considered as limiting in scope. Other methods for determining the these contributions should be considered within the scope of the present invention, for example, a function of measured human responses to differing document characteristics with respect to distinguishability, group identity, or headings; such that the present invention is directed to not only in the particular method of determining these contributions, but also in the much broader concept of using distinguishability, group identity and/or heading measures in the context of evaluating document ease of progression, communicability, and document quality.

In a preferred embodiment of the present invention, bullets and numbers in lists help to identify the list elements and to progress through them. Documents that use bulleted and/or numbered lists should be easier to progress through that those that do not. A method to calculate a measure for this property is to count the total number of list bullets Nlb or numbers Nln and divide by the total number of list elements Nle. $V_{lb}=(Nlb+Nln)/Nle$ Since there is less chance of confusing two list numbers than confusing two list bullets, one may wish to weight the benefits of list numbers higher than bullets. Weighting the counts of bullets and numbers differently when they are combined into the numerator of the ratio to total list elements can easily do this. $V_{lb}=(alb\ Nlb+aln\ Nln)/Nle$ where alb and aln are the constant weights applied to the count of bullets and count of list numbers.

Alternatively, one may wish to calculate separate and independent measures for the fraction of bulleted elements and the fraction of numbered elements.

The particular methods for evaluating contribution from list bullets and numbers to ease of progression and communicability provided herein are exemplary and are not to be considered as limiting in scope. Other methods for determining the text and image balance contribution should be considered within the scope of the present invention, for example, a function of measured human responses to differing list bullet and number specifications with respect to ease of progression and communicability; such that the present invention is directed to not only in the particular method of determining the text and image balance contribution, but also in the much broader concept of using list bullet and number measures in the context of evaluating document ease of progression, communicability and document quality.

In a preferred embodiment of the present invention, internal references (such as "continued on page 7") serve to guide the reader when the intended progression differs from basic convention. Electronic documents can include hyperlink forms that conduct the same function of guiding the reader. A simple measure of how helpful the document is in guiding the reader is just a count of such hyperlinks and/or references NL. This count should be divided by some measure of the size of the document (such as the number of content objects NO) in order to get a link density. $V_{plk}=NL/NO$ A better measure may be obtained by dividing the count of the references by a count of all the points at which the progression does not follow the typical scan order NSO. The conventional western scan order is that the next logical content element should be aligned with and to the right or below the current object. One can examine the positions of the content elements in their logical order and count the instances when this rule is not followed. These are the cases where a reference to redirect the reader would be most helpful and one can calculate the ratio of references to breaks in scan order. This will typically be a number between 0 and 1, but is not guaranteed to be confined to values 1 or less. To restrict the range, function such as those used above for confining the range can be used, but in this case a simple clamping the value to 1 should be sufficient. $V_{plk}=MINIMUM(1 NL/NSO)$ The particular methods for evaluating contribution from progression links to ease of progression and communicability provided herein are exemplary and are not to be considered as limiting in scope. Other methods for determining the progression link contribution should be considered within the scope of the present invention, for example, a function of measured human responses to the presence of progression link specifications with respect to ease of progression and communicability; such that the present invention is directed to not only in the particular method of determining the progression link contribution, but also in the much broader concept of using progression link measures in the context of evaluating document ease of progression, communicability and document quality.

In a preferred embodiment of the present invention, it is easier to follow the conventional rules of progression (e.g. the next logical element is located directly below the current element) if the elements are aligned. This makes it clear just which element is below and which is to the right of the current element. A measure of the document alignment $V_{al}$ was described above in the discussion of document aesthetics.

The particular methods for evaluating contribution from alignment to ease of progression and communicability provided herein are exemplary and are not to be considered as limiting in scope. Other methods for determining the alignment contribution should be considered within the scope of the present invention, for example, a function of measured human responses to differing alignment specifications with respect to ease of progression and communicability; such that the present invention is directed to not only in the particular method of determining the alignment contribution, but also in the much broader concept of using alignment measures in the context of evaluating document ease of progression, communicability and document quality.

In a preferred embodiment of the present invention, documents with lots of white space typically are less crowded. It is easier to distinguish and follow the elements. Thus, a high white space amount can provide a small contribution to the overall ease of progression. The non-white space area can be estimated by totaling the areas of the content objects ($A_i$ for content object i). The total object area can be scaled by the total document area Ad. $V_{ws}=(Ad-\Sigma A_i)/Ad$ The particular methods for evaluating contribution from white space to ease of progression and communicability provided herein are exemplary and are not to be considered as limiting in scope. Other methods for determining the white space contribution should be considered within the scope of the present invention, for example, a function of measured human responses to differing white space specifications with respect to ease of progression and communicability; such that the present invention is directed to not only in the particular method of determining the white space contribution, but also in the much broader concept of using white space measures in the context of evaluating document ease of progression, communicability and document quality.

In a preferred embodiment of the present invention, one of the conventions for progression through western documents is the scan positioning of left to right, top to bottom. This is the convention followed by text, but it can also be applied to other objects (such as the panes in a comic book). For this convention, one expects the items to have about the same height and to be aligned in rows. The left edge of the rows should be vertically aligned. One can construct a measure that indicates the deviation from this rule. The inverse of this deviation measure then gives the adherence to the rule.

Step through the document elements in their logical order. For each element find a bounding box that contains the object and indicates the position of its top yt, bottom yb, left side xl and right side xr. As one steps through the objects, the vertical position of the new object (ytn, ybn) is compared with that of the old object (yto, ybo). Objects should be placed to the right and below, but not above, so a deviation amount should be added to a deviation accumulation dcs for the degree to which the new object is above the old. The following expression does this (assuming the y coordinates increase as one moves down the page):

if ytn<yto and ybn<ybo then $dcs=dcs+(yto-ytn)*(ybo-ybn)/(ybo-ytn)^2$

If the new object is vertically in the same row as the old object, then one expects it to be located to the right of the old object. The degree to which it is left of the old object is the amount by which it deviates from the scan order model. One can calculate this deviation with the following expression:

if ytn<=ybo and xln<xlo and xrn<xro then $dcs=dcs+(xlo-xln)*(xro-xrn)/(xro-xln)^2$ These calculations are carried out for each consecutive pair of content elements as one steps through the document in logical order. The result is then normalized by dividing by the number of pair comparisons (the number of elements minus 1) and clamped to 1. The inverse is then returned.

$Vcs=1-\text{MINIMUM}(1, dcs/(NO-1))$

Figure 79:
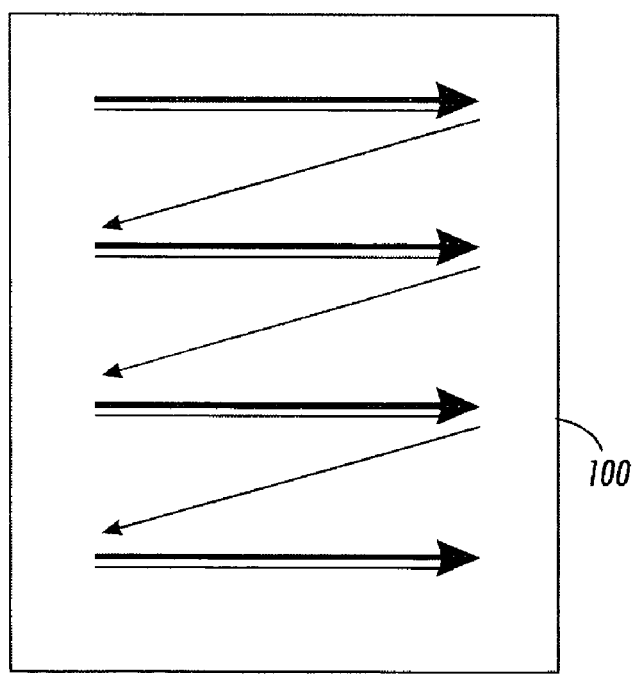
FIG. 79 illustrates an example of consistency of scan according to the concepts of the present invention.

FIG. 79 illustrates an example of the placement for consistency of scan.

The particular methods for evaluating contribution from the consistency of scan to ease of progression and communicability provided herein are exemplary and are not to be considered as limiting in scope. Other methods for determining the consistency of scan contribution should be considered within the scope of the present invention, for example, a function of measured human responses to differing layouts of ordered content with respect to ease of progression and communicability; such that the present invention is directed to not only in the particular method of determining the consistency of scan contribution, but also in the much broader concept of using consistency of scan measures in the context of evaluating document ease of progression, communicability and document quality.

In a preferred embodiment of the present invention, an alternative model for progression order is top to bottom, left to right. This is, for example, the order typically used for layout of a story in a newspaper or magazine. One moves down a column to the bottom, and then shifts to the top of the next column to the right. One can calculate deviation from this ordering in a manner similar from the scan ordering calculation above. In this case, however, one never wants to place an object to the left of a previous object, and objects in the same column should not be placed above previous items. The corresponding tests are as follows:

if xln<xlo and xrn<xro then $dco=dco+(xlo-xln)*(xro-xrn)/(xro-xln)^2$ and if xln<=xro and ytn<yto and ybn<ybo then $dco=dco+(yto-ytn)*(ybo-ybn)/(ybo-ytn)^2$ and $Vco=1-\text{MINIMUM}(1, dco/(NO-1))$ Note that an alternative to adding the consistency of scan and consistency of order terms independently to the ease of progression expression as shown above is to first combine the two measures and then use the result in the ease of progression. The reason for doing this is that the two measures could be combined in such a way, that if either of them had a high value, then the combined value would be high. In other words, the document would need to follow either one or the other of the layout models, but not necessarily both.

Figure 80:
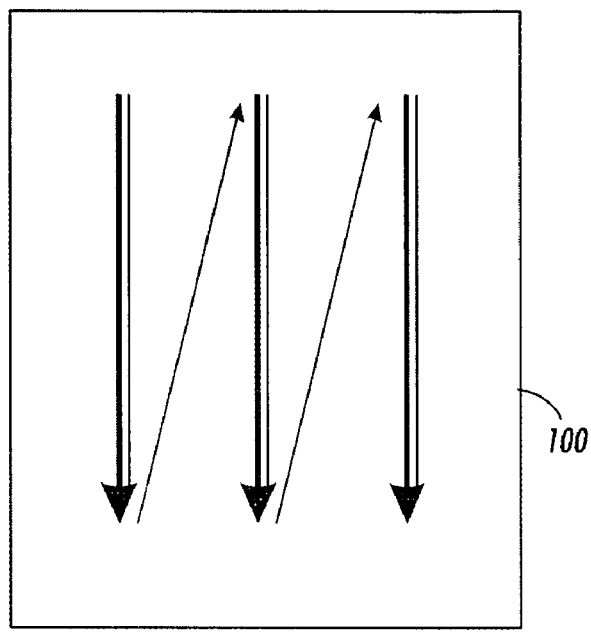
FIG. 80 illustrates an example of consistency of order according to the concepts of the present invention.

FIG. 80 illustrates an example of the placement for consistency of order.

The particular methods for evaluating contribution from the consistency of order to ease of progression and communicability provided herein are exemplary and are not to be considered as limiting in scope. Other methods for determining the consistency of order contribution should be considered within the scope of the present invention, for example, a function of measured human responses to differing layouts of ordered content with respect to ease of progression and communicability; such that the present invention is directed to not only in the particular method of determining the consistency of order contribution, but also in the much broader concept of using consistency of order measures in the context of evaluating document ease of progression, communicability and document quality.

In a preferred embodiment of the present invention, a property similar to ease of progression is ease of navigation. While progression measures the ease or difficulty of moving through the document in the order intended by the creator, ease of navigation measures the ability to locate an arbitrary element of the document. In estimating the ease of navigation one looks mainly for those features that can aid in finding an element or section. In the example method provided here includes headings, list bullets and numbers, running heads and page numbers, internal links, and/or group identity. These properties each contribute to the ease of navigation and an overall measure can be created from a weighted average. $V_{en}=w_{hd} V_{hd}+w_{lb} V_{lb}+w_{rh} V_{rh}+w_{ink} V_{ink}+w_{gi} V_{gi}$ where the w's are the weights and the V's are the value properties. Note that alternative methods of combination, as well as additional contributing factors, are possible. Many of the properties were also used for ease of progression, but the weights used in calculating the ease of navigation may be different.

Figure 81:
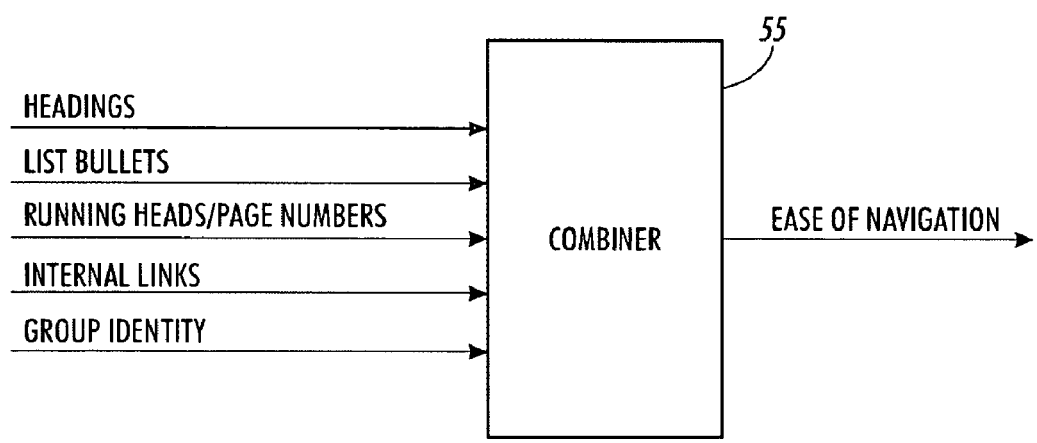
FIG. 81 illustrates a conceptual circuit for quantifiably measuring ease of navigation according to the concepts of the present invention.

A combination of measures, as illustrated in FIG. 81, is useful in evaluating the document's ease of navigation.

More specifically, the ease of navigation, as illustrated in FIG. 81, is considered a combination of headings, list bullets and numbers, running heads and page numbers, internal links, and/or group identity. In FIG. 81, the quantized ease of navigation value is derived by a combining of the headings, list bullets and numbers, running heads and page numbers, internal links, and/or group identity using an ease of navigation quantizer or combiner circuit 55.

It is noted that the illustration shows a circuit for the ease of navigation quantization process, this process may also be performed in software by the microprocessor and/or firmware. The quantization is not limited to specific circuits, but any combination of software and/or hardware that is able to carry out the below described methodologies.

The particular methods for evaluating document ease of navigation provided herein are exemplary and are not to be considered as limiting in scope. Other methods for determining the document ease of navigation should be considered within the scope of the present invention, for example, a function of measured human responses to differing document characteristics with respect to ease of navigation; such that the present invention is directed to not only in the particular method of determining the ease of navigation, but also in the much broader concept of using a combination of individual measures in the context of evaluating document ease of navigation, communicability and document quality.

In a preferred embodiment of the present invention, page numbers can help greatly in navigating a document. For running heads, a measure of their value is the number of different heads divided by the number of pages. One can find this by examining the document for the heads and making a list of the distinct ones. Then one can count the number of heads in the list. For page numbers, one just asks whether or not they are present and if they are, one can add a contribution to the measure. $V_{rh}$=wh Nh/Np+(1−wh) Bpn where wh is the weight given to running heads, Nl is the number of distinct heads, Np is the number of pages in the document, and Bpn is 1 if there are page numbers and 0 otherwise.

The particular methods for evaluating contribution from the page numbers to ease of navigation and communicability provided herein are exemplary and are not to be considered as limiting in scope. Other methods for determining the contribution from page numbers should be considered within the scope of the present invention, for example, a function of measured human responses to the presence or absence of page numbers with respect to ease of navigation and communicability; such that the present invention is directed to not only in the particular method of determining the page number contribution, but also in the much broader concept of using page number measures in the context of evaluating document ease of navigation, communicability and document quality.

In a preferred embodiment of the present invention, ease of navigation is strongly related to the locatability property for group elements that was described above in the discussion on the ease of use of groups. The measures of headings, list bullets and numbers and internal links can be captured as described.

In the discussion on ease of progression one measured the fraction of progressive links. For ease of navigation one wants to count the total number of internal links or references (not just the progressive ones). This will include the entries in a table of contents and in an index as well as references or links within the main body of the document. As suggested above, one can normalize the count by dividing by the number of content objects: $V_{lnk}$=MINIMUM(1, NLT/NO) where NLT is the total number of internal links and NO is the number of content objects.

In trying to find one's way around in a document it is helpful to know when one group of content ends and another begins. Thus, there should be a contribution to the ease of navigation from the group identity measure. This is another measure that is also used in the ease of progression estimation. A measure of group identity was described in the above discussion of ease of use of groups. Group identity is calculated from other measures such as spatial coherence, the presence of borders or backgrounds, style uniformity, and alignment of elements.

The particular methods for evaluating contribution from headings bullets internal links and group identity to ease of navigation and communicability provided herein are exemplary and are not to be considered as limiting in scope. Other methods for determining the contribution from these properties should be considered within the scope of the present invention, for example, a function of measured human responses to different document characteristics with respect to these properties, ease of navigation and communicability; such that the present invention is directed to not only in the particular method of determining the contributions, but also in the much broader concept of using heading, bullet, internal link and group identity measures in the context of evaluating document ease of navigation, communicability and document quality.

Comfort

In a preferred embodiment of the present invention, another property that contributes to the quality of a document is the comfort level at which the document is perceived. A method for quantifying the document comfort level will be described next.

Comfort is calculated as a combination of simpler properties or rules. Violating any of the component rules can result in discomfort and ruin the overall comfort of the document layout. Component rules can include limitation of font forms, limitation of colors, grouping number, neatness, decipherability, non-intimidating, conventionality, color harmony, color appropriateness, consistency of luminance, and/or consistency of size. Each rule is defined to produce a value ranging between 0 and 1 such that 0 means low or bad comfort value and 1 means high or good comfort value. These (and possibly other such rules) can be calculated and combined to form an overall comfort measure. If Vi is the value calculated for the $i^{th}$ rule, then the comfort measure $V_c$ is formed as a function E of these contributions: $V_c$=E($V_{lf}$, $V_{lc}$, $V_{gn}$, $V_{nt}$, $V_{dc}$, $V_{ni}$, $V_{cv}$, $V_{ch}$, $V_{ca}$, $V_{cl}$, . . . $V_{csz}$)

The combining function E can be as simple as a weighted average of the contributions, but because any bad contributor can ruin the comfort no matter how good the others are, a linear combination is not preferred. An alternative is to use: $V_c$=[Σ$w_i$(d+$V_i$)$^{-p}$]$^{-1/p}$−d. The $w_i$ factors are the weights that specify the relative importance of each rule; they should sum to 1. The exponent p introduces the nonlinearity that can make one bad value overwhelm many good ones. The larger p is, the greater this effect. The constant d is a positive number near 0 and guards against division by 0.

Other combining functions are possible; for example, one could take the product of the contributions. If weighting of the contribution is desired, this can be done by exponentiation (using a different set of weight values). $V_c$=Π$V_i^{wi'}$ Note that the set of rules chosen is illustrative of how a comfort measure can be constructed. Other factors contributing to comfort exist and could certainly be included in a more sophisticated quantification of comfort. The particular methods for evaluating document comfort provided herein are exemplary and are not to be considered as limiting in scope. Other methods for determining the document comfort should be considered within the scope of the present invention, for example, a function of measured human responses to differing document characteristics with respect to the feeling of comfort; such that the present invention is directed to not only in the particular method of determining the comfort level, but also in the much broader concept of using a combination of individual measures in the context of evaluating document comfort level and document quality.

Figure 82:
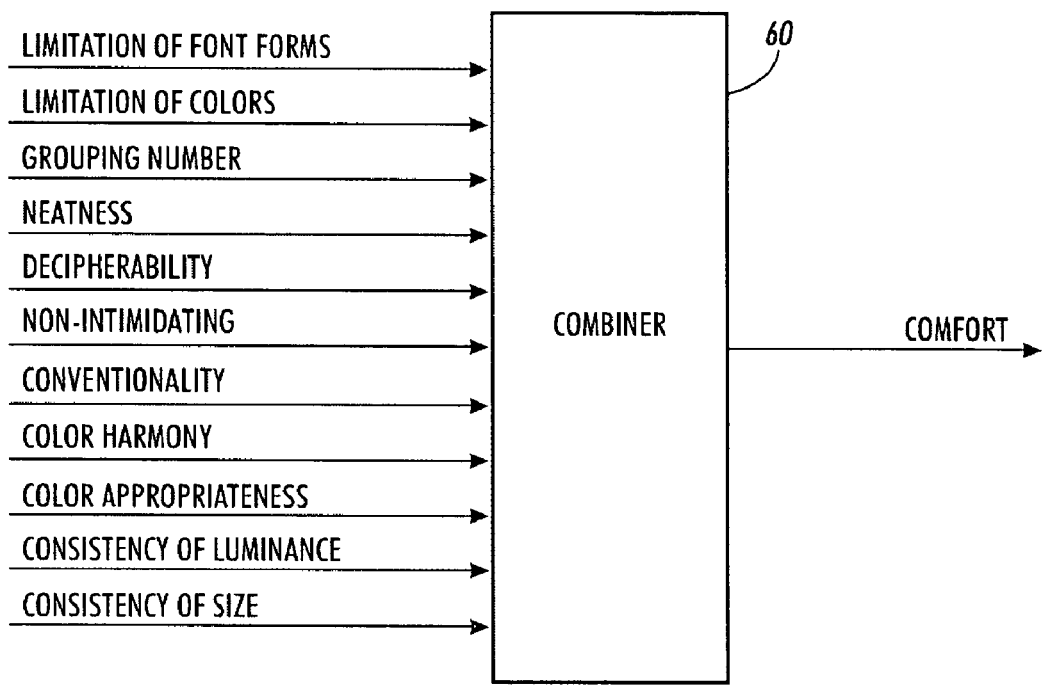
FIG. 82 illustrates a conceptual circuit for quantifiably measuring comfort according to the concepts of the present invention.

A combination of measures, as illustrated in FIG. 82, is useful in evaluating the document's comfort.

More specifically, the comfort, as illustrated in FIG. 82, is considered a combination of limitation of font forms, limitation of colors, grouping number, neatness, decipherability, non-intimidating, conventionality, color harmony, color appropriateness, consistency of luminance, and/or consistency of size. In FIG. 82, the quantized comfort value is derived by a combining of the limitation of font forms, limitation of colors, grouping number, neatness, decipherability, non-intimidating, conventionality, color harmony, color appropriateness, consistency of luminance, and/or consistency of size using a comfort quantizer or combiner circuit 60.

It is noted that the illustration shows a circuit for the comfort quantization process, this process may also be performed in software by the microprocessor and/or firmware. The quantization is not limited to specific circuits, but any combination of software and/or hardware that is able to carry out the below described methodologies.

In a preferred embodiment of the present invention, fonts have many properties that can be selected to achieve different effects. Font families can be chosen to give the document different feelings, from formal to playful, light to serious, modern to classical. Font size can affect the cost and legibility. Font weights such as bold, can convey importance; font styles, such as italic, can indicate that it is special. Font variants such as strikethrough or outlined can add further meaning.

If, however, a single document contains too many different font forms, the result is disquieting. Such "ransom note" documents are considered bad style because they lead to discomfort in the reader. The first factor that shall be considered as contributing to viewer comfort is the limitation of the number of font forms. Any change in the font specification (family, size, weight, style or variant) yields a new form. The document can be examined, and the number of distinct font forms Nf can be counted. This can be converted to a number ranging from near 0 (for the case of many font forms) to 1 (for when there is no more than a single font form) by the expression: $V_{lf}=1/\text{MAXIMUM}(1, Nf)$ However, more sophisticated measures are possible. One can, for example, include as part of the measure just how different the fonts are from one another. This can be done by first constructing a list, F, of all the font forms that appear in the document. One can then compare every font form in the list to every other font form and accumulate a measure of their differences. For fonts of different sizes, one can make the measure a function of the size difference (such as its absolute value). For font weights, one can add to the measure a function of the weight difference. Since weights are usually limited to a small set of choices, tables FW[weight(f1), weight(f2)] can be used to describe the weight difference function. Contributions due to differences in family style and variant can also be captured in tables, or a single constant amount af can be added whenever any difference in any of these properties occurs. Comparing every font form to every other font form results in differences accumulating on the order of the square of the number of fonts. To be more in line with the first simpler measure, one can divide by the number of fonts. The pseudocode to calculate this alternate measure would then look as follows:

```
fd = 1
    for f1 from 1 to Nf
        for f2 from f1 to Nf
            fd = fd + | size(f1) – size(f2) | +
            Fw[weight(f1), weight(f2)]
            if family(f1) differs from family(f2)
                or style(f1) differs from style(f2)
                or variant(f1) differs from variant(f2)
                then fd = fd + af
        end of f2 loop
    end of f1 loop
fd = fd / Nf
V_lt = 1 / (bf + fd)
```

In the last line of the above code, bf is a small positive number that controls how quickly the measure falls off with increasing font differences.

One further possible extension of the measure may be considered. Since the font differences will have a greater impact if the separate font forms are mixed together in the same paragraph than if they are spread over different paragraphs, one can count the number of font forms per paragraph and average this over the paragraphs of the document. The final accumulated difference measure fd can then be scaled by the average fonts-per-paragraph before the inversion to form $V_{lt}$.

The particular methods for evaluating contribution from the limitation of font forms to document comfort level provided herein are exemplary and are not to be considered as limiting in scope. Other methods for determining the contribution from limitation of font forms should be considered within the scope of the present invention, for example, a function of measured human responses to the number of font forms with respect to feeling on comfort; such that the present invention is directed to not only in the particular method of determining the limitation of font forms contribution, but also in the much broader concept of using limitation of font form measures in the context of evaluating document comfort level and document quality.

In a preferred embodiment of the present invention, just as too many fonts are considered to be poor style, so are too many colors. A document with lots of colors is considered garish. The viewer tries to make sense of the colors and a large number makes this a difficult and uncomfortable task. A large number of colors will tire the eye. A simple measure of the effect is just a count of the number of different colors found within the document. This can be determined by stepping through the document, identifying the colors and saving them in a list (or other data structure such as a tree or hash table). As each color is encountered it can be compared to the colors already in the list to determine whether or not it has been seen before. If it is a new color then it is added to the list. After the document has been processed, the number of entries in the list can be counted to give the total number of colors Nc. This can be converted to a number ranging from near 0 (for many colors) to 1 (for no more than a single color) by the expression: $V_{lc}=1/\text{MAXIMUM}(1, Nc)$ The above scheme works for constant, uniform colors such as typically used in graphics, but does not address how to handle color sweeps or the huge number of colors seen in pictorial images. For color sweeps one can restrict the list entry to only the first and last colors of the sweep. For pictorial images, one can ignore them altogether, or extract a few colors from the image by subsampling, or extract a few colors by a cluster analysis of the image values in color space.

The test for whether a color is already in the list does not have to be a strict match. One can compare colors by computing the distance between them in color space and comparing the distance to a threshold. If the distance is below the threshold, the colors can be considered close enough to match, and a new color list entry is not needed.

The comfort can depend on the choice of colors as well as the number of them. One might therefore compare the colors of the document pair-wise and accumulate a measure of their compatibility. A simple value to accumulate would be the distance between the colors in a color space, but a better measure of the affect on comfort would be the color dissonance of the pair. Since comparing colors pair-wise accumulates values as the square of the number of colors, one can divide the total by the number of colors in the document to get a measure that varies linearly with the number of colors.

Not every color is equally tiring on the eye and more sophisticated measures can take this into account. Strongly saturated colors have more of an effect than neutral ones.

There are several possible ways to calculate an approximate saturation value that can be used in augmenting its discomfort contribution. These were described in the above discussion on colorfulness under the eye-catching ability property.

For each color in the list, one can add a contribution to a total color discomfort measure. The contribution can be a function of the saturation. For example, for the $i^{th}$ color with saturation $c_i$, the contribution might be $ac+c_i$ where ac is a constant value representing the effect of just having another color, and $c_i$ is the additional discomfort due to that color's saturation. $dc=ac\ Nc+\Sigma c_i$ where dc is the color discomfort measure.

It is also possible to keep track of the total document area rendered in each color and include a function of both the saturation and the area in the augmentation of the discomfort calculation. The idea here is that the effect of a large colored area is stronger than the effect of a small one.

An expression such as: $V_{lc}=1/(bc+dc)$ where bc is a small positive constant, can be used to convert the discomfort measure into a limitation of color measure that varies between 0 and 1.

The particular methods for evaluating contribution from the limitation of colors to document comfort level provided herein are exemplary and are not to be considered as limiting in scope. Other methods for determining the contribution from limitation of colors should be considered within the scope of the present invention, for example, a function of measured human responses to the number of colors with respect to feeling on comfort; such that the present invention is directed to not only in the particular method of determining the limitation of colors contribution, but also in the much broader concept of using limitation of color measures in the context of evaluating document comfort level and document quality.

In a preferred embodiment of the present invention, people are more comfortable with some group sizes than others. A group should not have too many or too few elements, and odd numbers are preferred over even. The best size for a group is 3 elements. A simple expression for the comfort of a group number is: $Gc=1/(eg+ag(1-MOD2(eg)))$ where eg is the number of elements in the group, ag is a constant that gives the added discomfort of a even number of elements, and MOD2 is a function that give 0 if its argument is even and 1 if it is odd.

For an entire document, one needs some method of averaging the grouping number comfort values over all groups. For example, if there are Ng groups in the document and the comfort value of the $i^{th}$ group is $Gc_i$, then the simple average over all groups yields: $V_{gn}=\Sigma Gc_i/Ng$ More complex averaging schemes are possible. For example, one could weight the effect of the grouping number comfort differently depending on the placement of the group within the hierarchy of the document's logical structure tree.

The particular methods for evaluating contribution from the grouping number to document comfort level provided herein are exemplary and are not to be considered as limiting in scope. Other methods for determining the contribution from the grouping number should be considered within the scope of the present invention, for example, a function of measured human responses to the number group elements with respect to feeling of comfort; such that the present invention is directed to not only in the particular method of determining the grouping number contribution, but also in the much broader concept of using group size measurements in the context of evaluating document comfort level and document quality.

In a preferred embodiment of the present invention, people are generally more comfortable with a neat document than with a messy one. One can quantify neatness as a combination of contributing factors. In many cases it is easier to identify a factor that makes a document messy and uses the inverse of such factors. An example of a neatness measure is offered based on the text neatness, border and background presence, alignment, and/or regularity. Neatness estimates that employ additional factors are possible. In combining the component neatness measures, assume that any source of messiness will destroy the overall neatness (Oust as was argued for overall comfort).

A similar combining formula can be used. $V_{nt}=[\Sigma w_i(d+V_i)^{-p}]^{-1/p}-d$ only now the $V_i$ are taken from the set $V_{tn}$, $V_{bb}$, $V_{al}$ and $V_{rg}$ for the text neatness, border/background, alignment and regularity. The weights $w_i$, and parameters p and d can be different from those used in calculating comfort.

The particular methods for evaluating document neatness provided herein are exemplary and are not to be considered as limiting in scope. Other methods for determining the document neatness should be considered within the scope of the present invention, for example, a function of measured human responses to differing document characteristics with respect to the feeling of neatness; such that the present invention is directed to not only in the particular method of determining the neatness level, but also in the much broader concept of using a combination of individual measures in the context of evaluating document neatness, comfort level and document quality.

Figure 83:
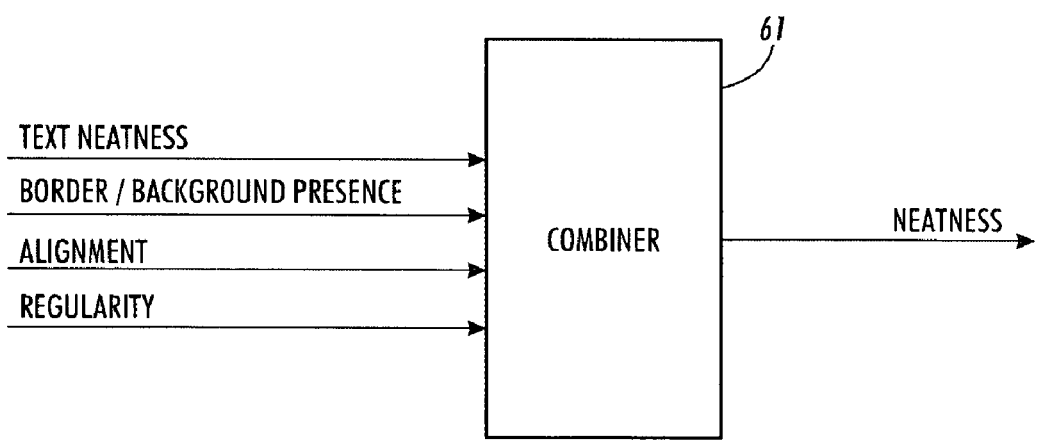
FIG. 83 illustrates a conceptual circuit for quantifiably measuring neatness according to the concepts of the present invention.

A combination of measures, as illustrated in FIG. 83, is useful in evaluating the document's neatness.

More specifically, the neatness, as illustrated in FIG. 83, is considered a combination of text neatness, border and background presence, alignment, and/or regularity. In FIG. 83, the quantized neatness value is derived by a combining of the text neatness, border and background presence, alignment, and/or regularity using a neatness quantizer or combiner circuit 60.

It is noted that the illustration shows a circuit for the neatness quantization process, this process may also be performed in software by the microprocessor and/or firmware. The quantization is not limited to specific circuits, but any combination of software and/or hardware that is able to carry out the below described methodologies.

In a preferred embodiment of the present invention, an example of how factors can contribute to neatness, consider the neatness of text. Text neatness can be harmed by the use of some font variants and styles (such as underscored text or italics). Quoted text is also considered to be less neat than unquoted text. One can step through the document examining the text, considering every word, space, and punctuation. For words (and punctuation) determine a neatness value based on the font used (f). Consider the font family, style and variant when estimating the font (un)neatness or messiness. These properties can be considered independently and look-up tables (Tf, Ts, and Tv) can be used to store the messiness effect for each. A total messiness measure can collect the effect of the font choice. mt=mt+Tf[family(f)]+Ts[style(f)]+Tv[variant(f)]

For punctuation, look for quotation marks and add an extra contribution for the quotation. In general one can add a contribution based on the character code c and a table Tc can store the contribution amounts. This can apply to spaces, letters and numbers as well as punctuation. mt=mt+Tc[c]

The contributions from font and character can be chosen such that the total messiness contribution for a character never exceeds 1.

Figure 84:
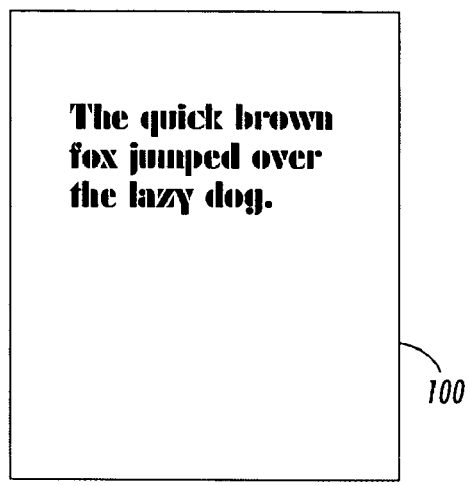
FIGS. 84 and 85 illustrate examples of neatness according to the concepts of the present invention.
Figure 85:
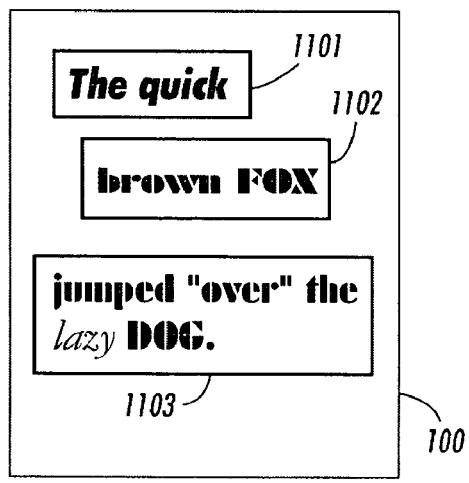

To get an average value for text messiness sum the messiness value for each character ($mt_i$ for the $i^{th}$ character) and divide by the total number of characters Nch. The text neatness is the inverse of the messiness. $V_{tn} = 1 - \Sigma mt_i/Nch$ FIG. 84 illustrates an example of a neater document. FIG. 85 illustrates an example of a less neat document.

The particular methods for evaluating contribution from the text neatness to document neatness and comfort level provided herein are exemplary and are not to be considered as limiting in scope. Other methods for determining the contribution from the text neatness should be considered within the scope of the present invention, for example, a function of measured human responses to different text styles with respect to feeling of neatness; such that the present invention is directed to not only in the particular method of determining the text neatness contribution, but also in the much broader concept of using text neatness measures in the context of evaluating document neatness level, document comfort level and document quality.

In a preferred embodiment of the present invention, the use of borders and backgrounds can aid in understanding the document's structure and can add to the document's interest, but it also results in a document that is not quite as neat as one without these additions. A document offers several opportunities for borders and/or backgrounds. They can be found on each page, or for columns, for sections, tables or figures. Step through the document considering each opportunity for a border or background. At each such opportunity check to see if a border or a background is actually present. If a border is present add the amount vbd to a messiness measure mbb. If a background is present add the amount vbk to mbb. Also count the number of opportunities encountered Nb. The neatness contribution from borders and backgrounds is the inverse of their average messiness. $V_{bb} = 1 - mbb/Nb$ The particular methods for evaluating contribution from the borders and backgrounds to document neatness and comfort level provided herein are exemplary and are not to be considered as limiting in scope. Other methods for determining the contribution from the borders and backgrounds should be considered within the scope of the present invention, for example, a function of measured human responses to different border and background styles with respect to feeling of neatness and comfort; such that the present invention is directed to not only in the particular method of determining the border and background contribution, but also in the much broader concept of using border and background measures in the context of evaluating document neatness level, document comfort level and document quality.

In a preferred embodiment of the present invention, an important contributor to neatness is the impression that the document components are aligned and regularly positioned. These factors were described above in the discussion on document aesthetics. Using the techniques described measures $V_{al}$ and $V_{rg}$ for document alignment and regularity can be calculated. Note that the weighting factors for their contribution to neatness are likely to be different from the factors used in their contribution to aesthetics.

The particular methods for evaluating contribution from the alignment and regularity to document neatness and comfort level provided herein are exemplary and are not to be considered as limiting in scope. Other methods for determining the contribution from the alignment and regularity should be considered within the scope of the present invention, for example, a function of measured human responses to different degrees of alignment and regularity with respect to feeling of neatness and comfort; such that the present invention is directed to not only in the particular method of determining the alignment and regularity contribution, but also in the much broader concept of using alignment or regularity measures in the context of evaluating document neatness level, document comfort level and document quality.

In a preferred embodiment of the present invention, some text takes more work to decipher and understand than others do. Text printed in italics or using an abnormal font variant is harder to read. Light colored text on a light background, or dark text on a dark background takes an effort to decipher. This work will tire the reader and make the document uncomfortable to use. A method for estimating the average decipherability of a document $V_{dc}$ was described above in the discussion on how well a document communicates.

The particular methods for evaluating contribution from the text decipherability to document comfort level provided herein are exemplary and are not to be considered as limiting in scope. Other methods for determining the contribution from the text decipherability should be considered within the scope of the present invention, for example, a function of measured human responses to different text style with respect to decipherability and the feeling comfort; such that the present invention is directed to not only in the particular method of determining the text decipherability contribution, but also in the much broader concept of using text decipherability measures in the context of evaluating document comfort level and document quality.

In a preferred embodiment of the present invention, some document constructs can act to intimidate the reader. By noting the degree to which these factors are present, one can form an intimidation measure. Intimidation acts against comfort, so the inverse of the intimidation factor should contribute to the comfort estimation. Factors that intimidate include a low amount of white space, high information density, low legibility, bold text, a low picture fraction, line use, and/or a high technical level. Many of the factors are familiar from IRS forms.

A non-intimidation measure is actually calculated by combining the inverses of the factors that intimidate. To combine the various contributions to the document's non-intimidation factor, a simple weighted average is used, although more complex combination schemes are possible. $V_{in} = \Sigma w_i V_i$ where $w_i$ are the weights and the $V_i$ are the non-intimidation component values $V_{ws}$, $V_{il}$, $V_{lg}$, $V_{dc}$, $V_{nb}$, $V_{pf}$, $V_{nl}$, $V_{lt}$ corresponding to the above list of factors.

Figure 86:
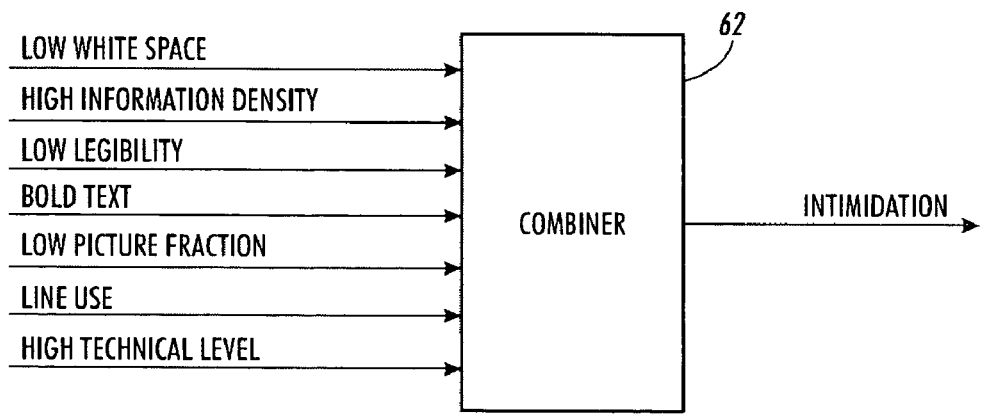
FIG. 86 illustrates a conceptual circuit for quantifiably measuring intimidation according to the concepts of the present invention.

A combination of measures, as illustrated in FIG. 86, is useful in evaluating the document's intimidation.

More specifically, the intimidation, as illustrated in FIG. 86, is considered a combination of a low amount of white space, high information density, low legibility, bold text, a low picture fraction, line use, and/or a high technical level. In FIG. 86, the quantized intimidation value is derived by a combining of the a low amount of white space, high information density, low legibility, bold text, a low picture fraction, line use, and/or a high technical level using an intimidation quantizer or combiner circuit 62.

It is noted that the illustration shows a circuit for the intimidation quantization process, this process may also be performed in software by the microprocessor and/or firmware. The quantization is not limited to specific circuits, but any combination of software and/or hardware that is able to carry out the below described methodologies.

Figure 87:
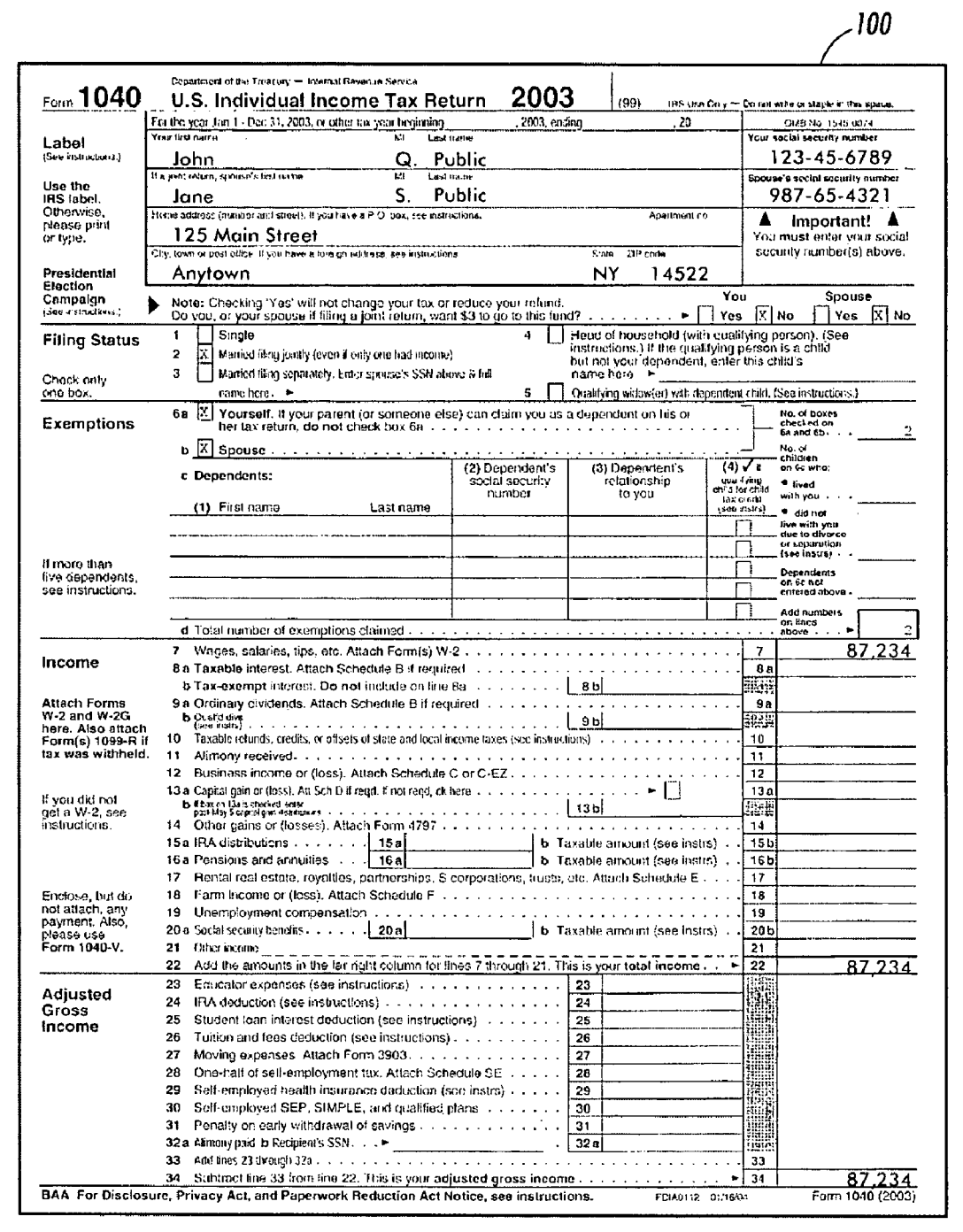

FIG. 87 is an example of an intimidating document.

The particular methods for evaluating a measure of how intimidating or non-intimidating a document is provided herein are exemplary and are not to be considered as limiting in scope. Other methods for determining the document intimidation level should be considered within the scope of the present invention, for example, a function of measured human responses to differing document characteristics with respect to the feeling of intimidation; such that the present invention is directed to not only in the particular method of determining the intimidation level, but also in the much broader concept of using a combination of individual measures in the context of evaluating document intimidation level, document comfort level and document quality.

In a preferred embodiment of the present invention, documents that are "open" with lots of white space are not as intimidating as those that are filled with content. A method for estimating the white space fraction was described above in the discussion of how well a document communicates.

The non white space area can be estimated by totaling the areas of the content objects. The total object area can be scaled by the total document area Ad. $V_{ws}=(Ad-\Sigma A_i)/Ad$ The particular methods for evaluating contribution from the white space to document intimidation level and comfort level provided herein is exemplary and is not to be considered as limiting in scope. Other methods for determining the contribution from the white space should be considered within the scope of the present invention, for example, a function of measured human responses to different white space amounts with respect to feeling of intimidation; such that the present invention is directed to not only in the particular method of determining the white-space contribution, but also in the much broader concept of using white space measures in the context of evaluating document intimidation level, document comfort level and document quality.

In a preferred embodiment of the present invention, densely packed information is intimidating and so inverse of the information density can contribute to the non-intimidation measure. Such an information lightness measure was described above in the discussion of a document's eye-catching ability.

The particular methods for evaluating contribution from the information lightness or density to document intimidation level and comfort level provided herein are exemplary and are not to be considered as limiting in scope. Other methods for determining the contribution from the information density should be considered within the scope of the present invention, for example, a function of measured human responses to different information and area amounts with respect to feeling of intimidation; such that the present invention is directed to not only in the particular method of determining the information lightness or density contribution, but also in the much broader concept of using information density measures in the context of evaluating document intimidation level, document comfort level and document quality.

In a preferred embodiment of the present invention, an illegible document is intimidating, so legibility should contribute to the non-intimidation measure. A method for estimating legibility was described in the above discussion of a document's ability to communicate.

The particular methods for evaluating contribution from the text legibility to document intimidation level and comfort level, provided herein, are exemplary and are not to be considered as limiting in scope. Other methods for determining the contribution from the legibility should be considered within the scope of the present invention, for example, a function of measured human responses to different text characteristics with respect to legibility and the feeling of intimidation; such that the present invention is directed to not only in the particular method of determining the legibility contribution, but also in the much broader concept of using legibility measures in the context of evaluating document intimidation level, document comfort level and document quality.

In a preferred embodiment of the present invention, the use of bold or heavy weight text is intimidating. Since a non-intimidation measure is desired, one would like to have a text lightness measure (high values associated with light text weights). A method for determining such a measure is straightforward. Step through the document and examine the text to see what fonts are used. One can use a table T1 to look up a lightness value t1 for the weight of the font f. $t1=T1[weight(f)]$ If $tl_i$ is the lightness value for the $i^{th}$ character, then one can find an average lightness (non-boldness) value by summing the lightness values and dividing by the total number of characters Nch. $V_{nb}=\Sigma tl_i/Nch$ An alternative approach is to collect the area of the bold or heavy text Ab, then divide by the total area of the document Ad and invert. $V_{nb}=1-Ab/Ad$ The particular methods for evaluating contribution from the bold text to document intimidation level and comfort level, provided herein, are exemplary and are not to be considered as limiting in scope. Other methods for determining the contribution from the bold text should be considered within the scope of the present invention, for example, a function of measured human responses to different bold text amounts with respect to the feeling of intimidation and document comfort level; such that the present invention is directed to not only in the particular method of determining the bold text contribution, but also in the much broader concept of using bold text measures in the context of evaluating document intimidation level, document comfort level and document quality.

In a preferred embodiment of the present invention, the presence of vertical lines can be intimidating, especially thick ones with high contrast. A method for quantifying the effect of vertical lines is to first step through the document and find them. This includes vertical lines that are part of borders and also rectangles with the ratio of width to height less than a threshold value. For each line discovered, multiply its area A1 by its luminance contrast c1.

Sum all the weighted areas and divide by the area of the document Ad to get a value between 0 and 1. Since the area devoted to vertical lines is typically small this expression understates the effect, but raising it to a fractional power can boost its strength. One then needs to invert the result to get the non-intimidation contribution. $V_{nl}=1-(\Sigma cl_i\, Al_i/Ad)^{1/p}$ The particular methods for evaluating contribution from the vertical lines to document intimidation level and comfort level, provided herein, are exemplary and are not to be considered as limiting in scope. Other methods for determining the contribution from the lines should be considered within the scope of the present invention, for example, a function of measured human responses to different line quantities and styles with respect to the feeling of intimidation and document comfort level; such that the present invention is directed to not only in the particular method of determining the vertical line contribution, but also in the much broader concept of using line measures in the context of evaluating document intimidation level, document comfort level and document quality.

In a preferred embodiment of the present invention, highly technical material is intimidating. The measure of technical level includes such things as reading ease, the presence of numbers, and the absence of pictures. A definition of an example technical level measure is given above in the discussion of how well a document communicates. The technical level $V_{tl}$ can be inverted for a measure of non-technical level that can be used in the non-intimidating calculation. $V_{nt}=1-V_{tl}$ The particular methods for evaluating contribution from the technical level to document intimidation level and comfort level, provided herein, are exemplary and are not to be considered as limiting in scope. Other methods for determining the contribution from the technical level should be considered within the scope of the present invention, for example, a function of measured human responses to different document content with respect to technical level, the feeling of intimidation and the document comfort level; such that the present invention is directed to not only in the particular method of determining the technical level contribution, but also in the much broader concept of using technical-level measures in the context of evaluating document intimidation level, document comfort level and document quality.

In a preferred embodiment of the present invention, people have certain expectations about document styles. There are conventions that they are accustomed to. Violating such customs may yield some benefits (such as attracting attention) and incur costs (such as reduced ease of use). Violating convention almost always creates a little discomfort.

Conventionality is defined as the inverse of novelty. A measure of novelty was presented above in the discussion of how well a document holds interest.

The particular methods for evaluating contribution from the document conventionality to document comfort level provided herein are exemplary and are not to be considered as limiting in scope. Other methods for determining the contribution from the conventionality should be considered within the scope of the present invention, for example, a function of measured human responses to different document styles with respect to conventionality and the feeling comfort; such that the present invention is directed to not only in the particular method of determining the conventionality contribution, but also in the much broader concept of using conventionality measure in the context of evaluating document comfort level and document quality.

In a preferred embodiment of the present invention, some combinations of colors fit harmoniously together while others clash. Clashing or dissonant colors tire the eye and cause discomfort while harmonious colors can sooth the viewer. Color harmony is defined as the inverse of color dissonance, $V_d$, which was described above in the discussion of a document's eye-catching ability. The color harmony is then: $V_{ch}=1-V_d$ The particular methods for evaluating contribution from the color harmony to document comfort level provided herein are exemplary and are not to be considered as limiting in scope. Other methods for determining the contribution from color harmony should be considered within the scope of the present invention, for example, a function of measured human responses to different document color combinations with respect to color harmony and the feeling comfort; such that the present invention is directed to not only in the particular method of determining the color harmony contribution, but also in the much broader concept of using color harmony measures in the context of evaluating document comfort level and document quality.

In a preferred embodiment of the present invention, another aspect of what is expected is the appropriateness of the color choices. The document design rule is that large background areas should use desaturated colors while small foreground objects should use saturated colors. One can form a measure of the color inappropriateness by multiplying each object's area by its saturation. Actually the area should be measured as a fraction of the total document area Ad in order to restrict the result to the range of 0 to 11. A large result comes from a large area with a high saturation (which is inappropriate). For an average value for the entire document, one must combine the values from all objects, and with a simple weighting of saturation by area it would be possible to get a measure of inappropriate color use from many small saturated foreground objects, when this may actually be appropriate. A better measure is to raise the area fraction to a power. This further reduces the influence of small objects. This leads to a color appropriated measure that looks as follows: $V_{ca}=1-\Sigma c_i(A_i/Ad)^p$ where p is a value greater than 1.

The particular methods for evaluating contribution from color appropriateness to document comfort level provided herein are exemplary and are not to be considered as limiting in scope. Other methods for determining the contribution from color appropriateness should be considered within the scope of the present invention, for example, a function of measured human responses to different object colors with respect to color appropriateness and the feeling comfort; such that the present invention is directed to not only in the particular method of determining the color appropriateness contribution, but also in the much broader concept of using color appropriateness measures in the context of evaluating document comfort level and document quality.

In a preferred embodiment of the present invention, the rule for consistency of luminance states that for a group of content elements, the dark elements should come first and the lighter elements should follow. Note, however, that the logical structure of a document is typically a tree with each branch node representing a group. Thus the members of a group are often other groups. The content elements may not be simple objects with a single color and luminance. The consistency of luminance rule can still be applied, but the luminance used should be the average luminance of the subtree group member.

To determine the average luminance of an object, get the luminance of the object Lf, the luminance of the background Lb, the area with the foreground color Af and the bounding area of the object Ao. The average luminance Lav is then: Lav=(Lf Af+Lb (Ao−Af))/Ao The average luminance for a group of objects is the sum of the average luminance values for its members weighted by their areas plus the contribution from the background. If Ag is the bounding area of the group, $Lav_i$ is the average luminance for the $i^{th}$ group member and $A_i$ is the area of that member then the average luminance for the group Lavg is: Lavg=$\Sigma Lav_i A_i$+Lb(Ag−$\Sigma A_i$))/Ag To find a measure of the consistency of luminance for a group, step through the members of the group and find the average luminance of each member. Compare that luminance to the previous member's luminance and if the new luminance is darker than the old then collect the difference. This actually gives a measure of the inconsistency and one can use a reciprocal function to convert it to a consistency value ranging between 0 and 1. The method is illustrated by the following pseudocode:

```
incon = 0
oldlum = AverageLuminance(groupMember(1))
for i = 2 to number of group members
    { newlum = AverageLuminance(groupMember(i))
        if newlum < oldlum
            then incon = incon + oldlum − newlum
        oldlum = newlum
    } end of loop
Vclg = acl / (acl + incon)
```

Here Vclg is the consistency of luminance value for the group and acl is a small positive constant value.

The above method indicates how to calculate a measure for each node in the content tree, but does not say how to obtain a collective value for the tree as a whole. One method for doing this is to form a weighted average of all the tree node values, where the weight is a function of the depth of the tree. One can also raise the values being combined to a negative power such that a bad consistency value carries the impact of many good values. This can be summarized as: $V_{cl}=((\Sigma w_i(dcl+Vcl_i)^{-p})/\Sigma w_i)^{-1/p}-dcl$ where the sums are over all group nodes in the content tree, $w_i$ is the node depth $Vcl_i$ is the consistency of luminance of the node and dcl is a small positive constant and p is a positive value such as 1.

Figure 88:
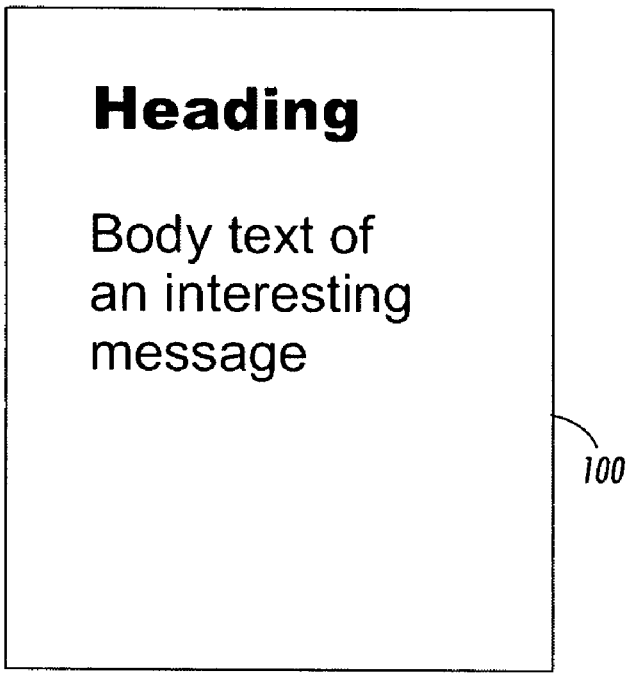
FIGS. 88 and 89 illustrate examples of luminance according to the concepts of the present invention.
Figure 89:
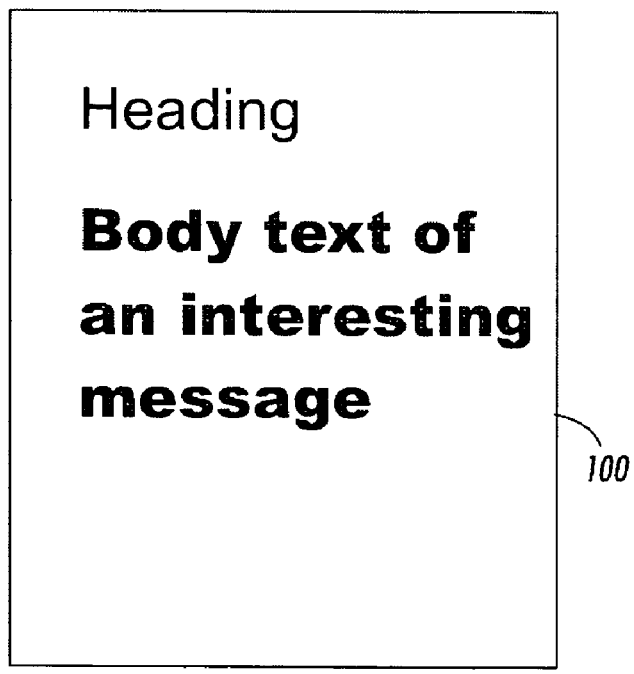

FIG. 88 is an example of consistent luminance. FIG. 89 is an example of inconsistent luminance.

The particular methods for evaluating contribution from the consistency of luminance to document comfort level provided herein are exemplary and are not to be considered as limiting in scope. Other methods for determining the contribution from the consistency of luminance should be considered within the scope of the present invention, for example, a function of measured human responses to different object luminance values and ordering with respect to consistency of luminance and the feeling comfort; such that the present invention is directed to not only in the particular method of determining the consistency of luminance contribution, but also in the much broader concept of using consistency of luminance measures in the context of evaluating document comfort level and document quality.

In a preferred embodiment of the present invention, the design rule for consistency of size is that for a group of content elements, the large elements should come first and the smaller elements should follow. To find a measure of the consistency of size for a group step through the members of the group and find the bounding size of each member. Compare that size to the previous member's size and if the new size is bigger than the old then collect the difference. This actually gives a measure of the inconsistency and one can use a reciprocal function to convert it to a consistency value ranging between 0 and 1. The method is illustrated by the following pseudocode:

```
incon = 0
oldsize = BoundingSize(groupMember(1))
for i = 2 to number of group members
    { newsize = BoundingSize (groupMember(i))
        if newsize > oldsize
            then incon = incon + newsize − oldsize
        oldsize = newsize
    } end of loop
Vcsg = acs / (acs + incon)
```

Here Vcsg is the consistency of size value for the group and acs is a small positive constant value.

In considering the members of the group, one may wish to exclude certain special members (such as headings) from the size comparisons.

The above method indicates how to calculate a measure for each node in the content tree, but does not say how to obtain a collective value for the tree as a whole; One method for doing this is to form a weighted average of all the tree node values, where the weight is a function of the depth of the tree. One can also raise the values being combined to a negative power such that a bad consistency value carries the impact of many good values. This can be summarized as: $V_{cs}=((\Sigma w_i(dcs+Vcs_i)^{-p})/\Sigma w_i)^{-1/p}-dcs$ where the sums is over all group nodes in the content tree, $w_i$ is the node depth $Vcs_i$ is the consistency of size of the node and dcs is a small positive constant and p is a positive value such as 1.

Figure 90:
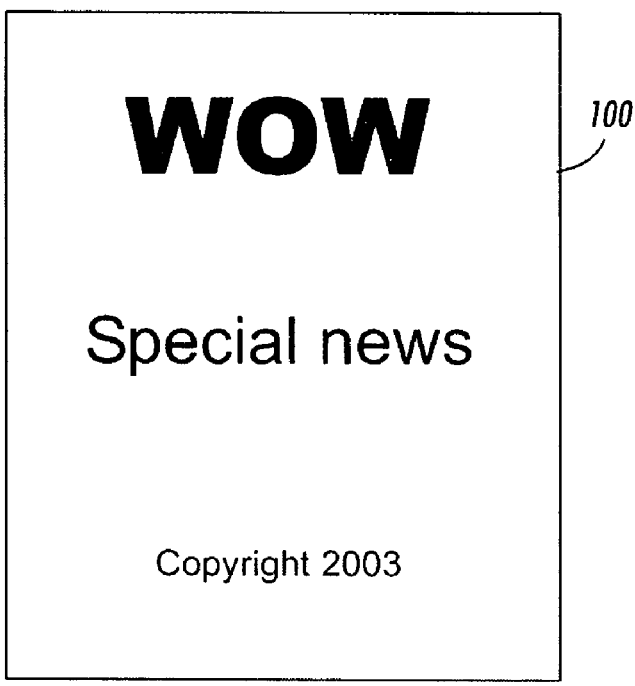
FIGS. 90 and 91 illustrate examples of size according to the concepts of the present invention.
Figure 91:
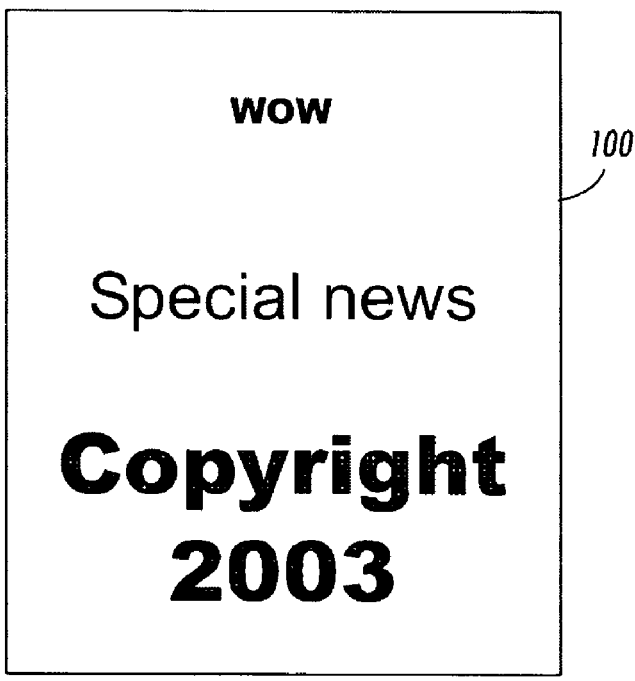

FIG. 90 is an example of consistent size. FIG. 91 is an example of inconsistent size.

The particular methods for evaluating contribution from the consistency of size to document comfort level provided herein are exemplary and are not to be considered as limiting in scope. Other methods for determining the contribution from the consistency of size should be considered within the scope of the present invention, for example, a function of measured human responses to different object sizes and orderings with respect to consistency of size and the feeling comfort; such that the present invention is directed to not only in the particular method of determining the consistency of size contribution, but also in the much broader concept of using consistency of size measures in the context of evaluating document comfort level and document quality.

Convenience

In a preferred embodiment of the present invention, another document property that contributes to its quality is the convenience level or ease of use at which the document is perceived. A method for quantifying the document convenience level will next be described. As with other properties, convenience is calculated as a combination of simpler properties or factors. Violating any of the component factors can result in inconvenience and ruin the overall convenience of the document layout. Component factors can include consistency, legibility, disability proof, ease of navigation, ease of progression, searchability, locatability, viewable fraction, single window display, and/or transmission and processing time.

Each factor is defined to produce a value ranging between 0 and 1 such that 0 means a low or bad convenience value and 1 means a high or good convenience value. These, (and possibly other such rules), can be calculated and combined to form an overall convenience measure. If $V_i$ is the value calculated for the $i^{th}$ rule, then the convenience measure $V_{cv}$ is formed as a function E of these contributions: $V_{cv}=E(V_{cns}, V_{lg}, V_{dp}, V_{en}, V_{ep}, V_{sh}, V_{lo}, V_{vf}, V_{sw}, \ldots V_{tm})$ The combining function E can be as simple as a weighted average of the contributions, but because any bad contributor can ruin the convenience no matter how good the others are, a linear combination is not preferred. An alternative is to use: $V_{cv}=[\Sigma w_i(d+Vi)^{-p}]^{-1/p}-d$. The $w_i$ factors are the weights that specify the relative importance of each rule; they should sum to 1. The exponent p introduces the nonlinearity that can make one bad value overwhelm many good ones. The larger p is the greater this effect. The constant d is a positive number near 1 and guards against division by 0.

Other combining functions are possible; for example, one could take the product of the contributions. If weighting of the contribution is desired, this can be done by exponentiation (where the weights would be different from those used above). $V_{cv} = \Pi V_i^{wi'}$ A combination of measures, as illustrated in FIG. 92, is useful in evaluating the document's convenience.

Figure 92:
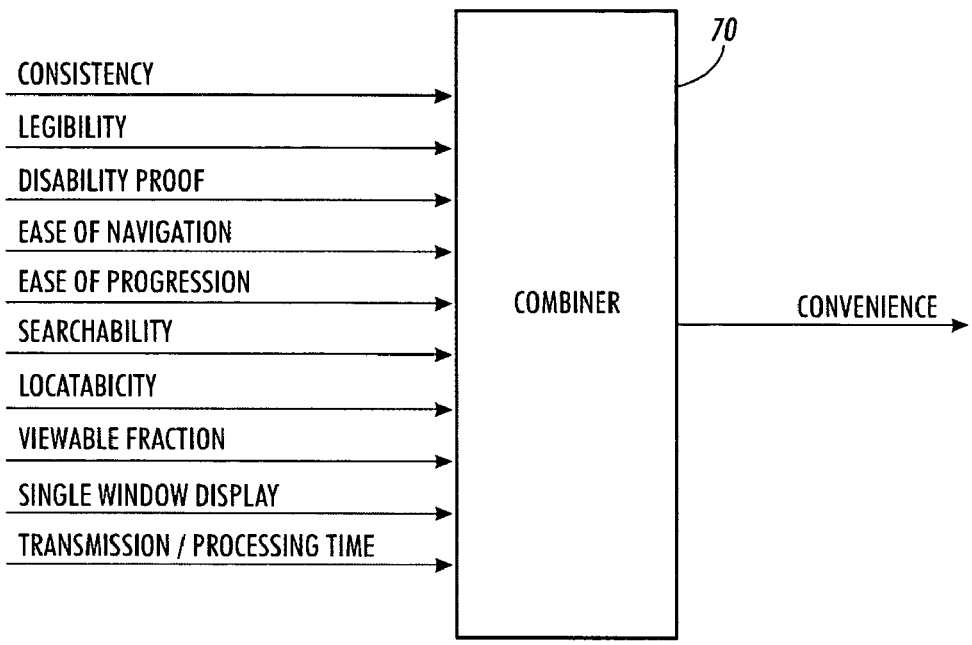
FIG. 92 illustrates a conceptual circuit for quantifiably measuring convenience according to the concepts of the present invention.

More specifically, the convenience, as illustrated in FIG. 92, is considered a combination of consistency, legibility, disability proof, ease of navigation, ease of progression, searchability, locatability, viewable fraction, single window display, and/or transmission and processing time. In FIG. 92, the quantized convenience value is derived by a combining of the consistency, legibility, disability proof, ease of navigation, ease of progression, searchability, locatability, viewable fraction, single window display, and/or transmission and processing time using a convenience quantizer or combiner circuit 70.

It is noted that the illustration shows a circuit for the convenience quantization process, this process may also be performed in software by the microprocessor and/or firmware. The quantization is not limited to specific circuits, but any combination of software and/or hardware that is able to carry out the below described methodologies.

Note that the set of rules chosen is illustrative of how a convenience measure can be constructed. Other factors contributing to ease of use exist and could certainly be included in a more sophisticated quantification of convenience. The particular methods for evaluating document convenience provided herein are exemplary and are not to be considered as limiting in scope.

Other methods for determining the document convenience should be considered within the scope of the present invention, for example, a function of measured human responses to differing document characteristics with respect to the feeling of convenience; such that the present invention is directed to not only in the particular method of determining the convenience level, but also in the much broader concept of using a combination of individual measures in the context of evaluating document convenience level and document quality.

In a preferred embodiment of the present invention, in graphic design there are many consistency rules. Consistency helps people build an internal model of the document that, in turn, makes it easier to use. Some of the contributing rules or factors to consistency and how factors can be combined into an overall consistency measure will now be described. The example consistency measure will include position order, luminance, size, and/or style. The methods for calculating measures for these factors have been described above and will not be repeated in detail here.

In combining the component consistency measures assume that any source of inconsistency will destroy the overall consistency. A combining formula that can be used is as follows. $V_{nt} = [\Sigma w_i (d+V_i)^{-p}]^{-1/p} - d$ where the $V_i$ are taken from the set $V_{cp}$, $V_{cl}$, $V_{csz}$ and $V_{cst}$. The weights $w_i$, indicate the relative importance of the different measures. The parameter p is a number 1 or larger and d is a value slightly larger than 0.

Figure 94:
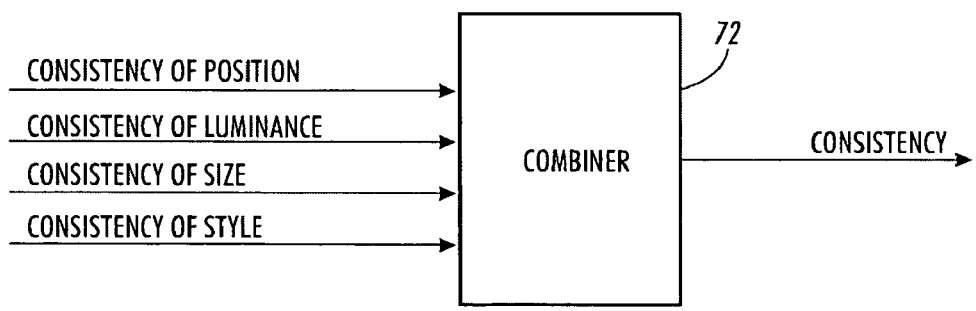
FIG. 94 illustrates a conceptual circuit for quantifiably measuring consistency according to the concepts of the present invention.

A combination of measures, as illustrated in FIG. 94, is useful in evaluating the document's consistency.

More specifically, the consistency, as illustrated in FIG. 94, is considered a combination of position order, luminance, size, and/or style. In FIG. 94, the quantized consistency value is derived by a combining of the position order, luminance, size, and/or style using a consistency quantizer or combiner circuit 72.

It is noted that the illustration shows a circuit for the consistency quantization process, this process may also be performed in software by the microprocessor and/or firmware. The quantization is not limited to specific circuits, but any combination of software and/or hardware that is able to carry out the below described methodologies.

The particular methods for evaluating a measure of the consistency of a document is provided herein are exemplary and are not to be considered as limiting in scope. Other methods for determining the document consistency level should be considered within the scope of the present invention, for example, a function of measured human responses to differing document characteristics with respect to the feeling of consistency; such that the present invention is directed to not only in the particular method of determining the consistency level, but also in the much broader concept of using a combination of individual measures in the context of evaluating document consistency level, document convenience level and document quality.

In a preferred embodiment of the present invention, for position order there are actually two measures, consistency of scan and/or consistency of order, both of which are described above in the discussion on quantifying how well a document communicates. The layout placement of content objects should follow one of these two rules to achieve a consistent model between logical order and layout position. However, the layout need not follow both models simultaneously. One should therefore combine the consistency of scan $V_{cs}$ and the consistency of order $V_{co}$ into an overall consistency of position $V_{cp}$. A simple way to do this is:
$V_{cp} = \text{MAXIMUM}(V_{cs}, V_{co})$ A more sophisticated alternative is the following: $V^{cp} = \text{dcp} - (((\text{dcp} - V_{cs})^{-p} + (\text{dcp} - V_{co})^{-p})/2)^{-1/p}$ where dcp is a constant slightly larger than 1 and p is also a number 1 or greater.

Figure 93:
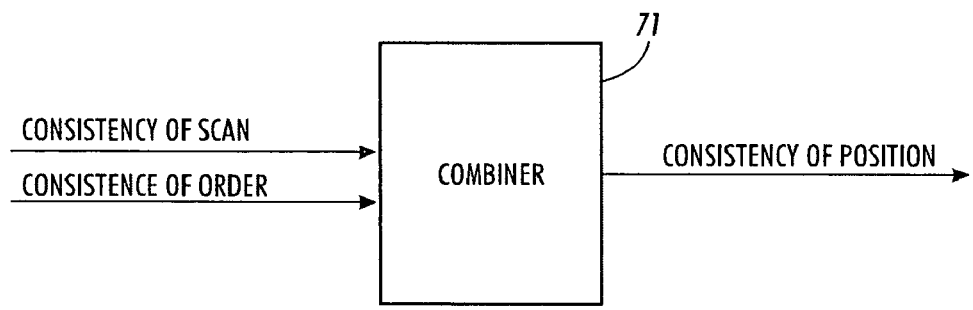
FIG. 93 illustrates a conceptual circuit for quantifiably measuring consistency of position according to the concepts of the present invention.

A combination of measures, as illustrated in FIG. 93, is useful in evaluating the document's consistency of position.

More specifically, the consistency of position, as illustrated in FIG. 93, is considered a combination of consistency of scan and/or consistency of order. In FIG. 94, the quantized consistency of position value is derived by a combining of the consistency of scan and/or consistency of order using a consistency of position quantizer or combiner circuit 71.

It is noted that the illustration shows a circuit for the consistency of position quantization process, this process may also be performed in software by the microprocessor and/or firmware. The quantization is not limited to specific circuits, but any combination of software and/or hardware that is able to carry out the below described methodologies.

The particular methods for evaluating contribution from the consistency of position to document consistency level and convenience level provided herein are exemplary and are not to be considered as limiting in scope. Other methods for determining the contribution from consistency of position should be considered within the scope of the present invention, for example, a function of measured human responses to different positioning of content objects with respect to the feeling of consistency and document convenience level; such that the present invention is directed to not only in the particular method of determining the consistency of position contribution but also in the much broader concept of using consistency of position measures in the context of evaluating document consistency level, document convenience level and document quality.

In a preferred embodiment of the present invention, a method for computing a measure of the consistency of luminance $V_{cl}$ is described in the above discussion of document comfort. The idea is that darker items should precede lighter ones in a group.

The particular methods for evaluating contribution from the consistency of luminance to document consistency level and convenience level provided herein are exemplary and are not to be considered as limiting in scope. Other methods for determining the contribution from consistency of luminance should be considered within the scope of the present invention, for example, a function of measured human responses to different luminance settings and orderings of content objects with respect to the feeling of consistency and document convenience level; such that the present invention is directed to not only in the particular method of determining the consistency of luminance contribution, but also in the much broader concept of using consistency of luminance measures in the context of evaluating document consistency level, document convenience level and document quality.

In a preferred embodiment of the present invention, a method for computing a measure of the consistency of size $V_{csz}$ is also presented in the above discussion on document comfort. The idea is that larger items should precede smaller ones in a group.

The particular methods for evaluating contribution from the consistency of size to document consistency level and convenience level provided herein are exemplary and are not to be considered as limiting in scope. Other methods for determining the contribution from consistency of size should be considered within the scope of the present invention, for example, a function of measured human responses to different sizes and orderings of content objects with respect to the feeling of consistency and document convenience level; such that the present invention is directed to not only in the particular method of determining the consistency of size contribution, but also in the much broader concept of using consistency of size measures in the context of evaluating document consistency level, document convenience level and document quality.

In a preferred embodiment of the present invention, a method for computing a measure of the consistency of style $V_{cst}$ is presented above in the discussion of ease of use of groups. The idea is that items at similar positions in the content structure should have matching styles.

The particular methods for evaluating contribution from the consistency of style to document consistency level and convenience level provided herein are exemplary and are not to be considered as limiting in scope. Other methods for determining the contribution from consistency of style should be considered within the scope of the present invention, for example, a function of measured human responses to different styles and orderings of content objects with respect to the feeling of consistency and document convenience level; such that the present invention is directed to not only in the particular method of determining the consistency of style contribution, but also in the much broader concept of using consistency of style measures in the context of evaluating document consistency level, document convenience level and document quality.

In a preferred embodiment of the present invention, a document that is difficult to read is often difficult to use. A measure of legibility $V_{lg}$ was defined above as a contributor to a document's communicability. It can contribute to convenience as well as communicability but with a different weight. In fact, one could argue that communicability, as a whole, should be used as a contributor to convenience. Mile this is not ruled out, the example here will just include a few of the components of communicability that have particular bearing on convenience. Considering them separately allows one to give them different weights when contributing to convenience than those used for the contribution to communicability.

The particular methods for evaluating contribution from legibility to document convenience level provided herein are exemplary and are not to be considered as limiting in scope. Other methods for determining the contribution from legibility should be considered within the scope of the present invention, for example, a function of measured human responses to different text characteristics with respect to legibility and the feeling convenience; such that the present invention is directed to not only in the particular method of determining the legibility contribution, but also in the much broader concept of using legibility measures in the context of evaluating document convenience level and document quality.

In a preferred embodiment of the present invention, in general, disability proof refers to how well the document can serve people with handicaps. For example, a document of only text can be read to someone who is blind, but a document with images would be much harder to convey. Another example of a contributor to a disability proof measure is the red-green friendliness property that was defined in the above discussion on how well a document communicates. The idea behind the measure is that there should be either luminance contrast or blue-yellow contrast between foreground and background colors in order to be red-green friendly. Without this contrast it would be difficult for a colorblind person to distinguish foreground object from background. This measure will be used as an example of a simple disability proof function, $V_{dp}$. Additional functions for other handicaps are certainly possible and could be combined into a more sophisticated measure.

The particular methods for evaluating contribution from disability compensation characteristics to document convenience level provided herein are exemplary and are not to be considered as limiting in scope. Other methods for determining the contribution from disability compensation should be considered within the scope of the present invention, for example, a function of measured human responses to different document characteristics with respect to disability compensation and the feeling convenience; such that the present invention is directed to not only in the particular method of determining the disability compensation contribution, but also in the much broader concept of using disability compensation measures in the context of evaluating document convenience level and document quality.

In a preferred embodiment of the present invention, methods for estimating the ease of navigation $V_{en}$ and ease of progression $V_{ep}$ were also described above in the discussion of how well a document communicates. They contribute to convenience as well as communicability, and, in fact, are more important (and have larger weights) as convenience measures than as communicability measures. The idea behind the calculation of these properties is to estimate and combine contributing features such as distinguishability, group identity, spatial coherence, list bullets, headings, internal links, alignment and others.

The particular methods for evaluating contribution from ease of navigation or ease of progression to document convenience level provided herein are exemplary and are not to be considered as limiting in scope. Other methods for determining the contribution from ease of navigation or ease of progression should be considered within the scope of the present invention, for example, a function of measured human responses to different document characteristics with respect to ease of navigation or ease of progression and the feeling convenience; such that the present invention is directed to not only in the particular method of determining the ease of navigation or ease of progression contribution, but also in the much broader concept of using ease of navigation or ease of progression measures in the context of evaluating document convenience level and document quality.

In a preferred embodiment of the present invention, two other related concepts are the searchability $V_{sh}$ and the locatability $V_{lo}$. Locatability is a measure of how easy it is to find a document object (whereas ease of navigation is how easy it is to find a document location). Searchability is a rougher measure that looks for the presence of document features that aid in locating document objects. These measures have been described above in the discussion of measures for the ease of use of content groups.

The particular methods for evaluating contribution from searchability or locatability to document convenience level provided herein are exemplary and are not to be considered as limiting in scope. Other methods for determining the contribution from searchability or locatability should be considered within the scope of the present invention, for example, a function of measured human responses to different document characteristics with respect to searchability or locatability and the feeling convenience; such that the present invention is directed to not only in the particular method of determining the searchability or locatability contribution, but also in the much broader concept of using searchability or locatability measures in the context of evaluating document convenience level and document quality.

In a preferred embodiment of the present invention, when a document is broken into pages, some content groups may get spread over two or more pages. If the document is displayed on a workstation, some entire content groups may not fit completely into the display window. This inability to view the logical group as a unit can be a hindrance and should reduce the document's convenience measure.

To estimate the viewable fraction for a group displayed on a workstation, first find the bounding size (width and height of the group (wg, hg). Next find the size of the typical display window (wp, hp). The viewable width and height is the minimum of the group and window dimensions.

wv=MINI(wg, wp)

hv=MINIMUM(hg, hp)

The measure of unity of display for the group is then given by ratio of the visible area to group area: U=(wv hv)/(wg hg)

For the case where the group has been split over pages, one can construct a measure by first finding the area of the group elements on each page (e.g. $Ag_p$ for page p). Next find the maximum area among the pieces and divide it by the total group area. U=MAXP($Ag_p$)/$\Sigma Ag_p$ While this provides a measure for any particular group within a document, one still has to somehow combine these group measures to achieve an overall measure of the document's viewable fraction. Recognize that the level of the group within the documents logical tree structure should make a difference. One would be much less likely to expect or need high-level groups to be seen as a unit than the low level groups near the bottom of the tree. First sort the groups by their tree level and find a simple average value for each level (i.e. Uav L). Then combine the average values for the levels weighted by a function of the level: $V_{vf}$=$\Sigma$w(L) Uav L/$\Sigma$w(L)

The weighting function w(L) should increase with increasing level such as w(L)=a L for a constant a.

The particular methods for evaluating contribution from viewable fraction to document convenience level provided herein are exemplary and are not to be considered as limiting in scope. Other methods for determining the contribution from viewable fraction should be considered within the scope of the present invention, for example, a function of measured human responses to different viewable amounts of the document with respect to the feeling convenience; such that the present invention is directed to not only in the particular method of determining the viewable fraction contribution, but also in the much broader concept of using viewable fraction measures in the context of evaluating document convenience level and document quality.

In a preferred embodiment of the present invention, while the viewable fraction measure gives some indication of whether document components can be seen in their entirety, there is a special advantage in being able to see the entire document in a single window or page. A simple calculation can be used to create this measure. It is the same as for viewable fraction, only it uses the area of the entire document. If the width and height of the document are wd, hd and the width and height of the display or page are wp hp, then calculate:

wv=MINIMUM(wd, wp)

bv=MININUM(hd, hp)

And set the single window display measure to: $V_{swd}$=(wv hv)/(wd hd)

Figure 95:
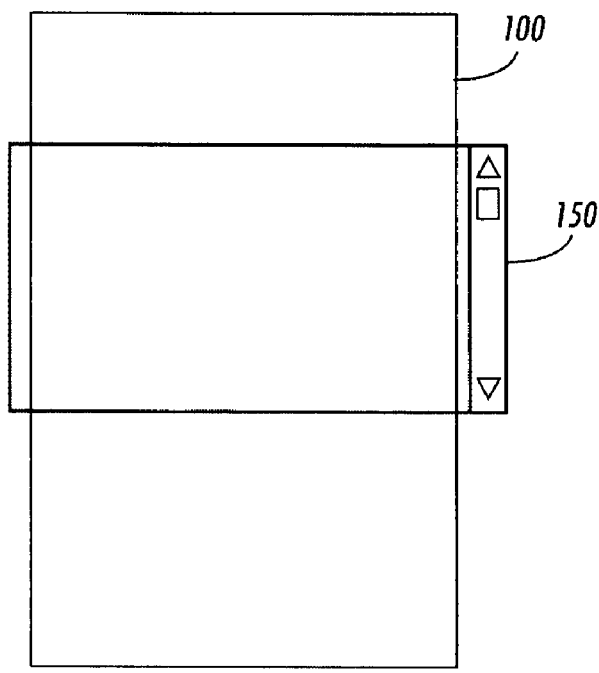
FIG. 95 illustrates a definable window for quantifiably measuring the various quality characteristics of a document according to the concepts of the present invention.

FIG. 95 illustrates the generation of an electronic window 150 associated with a page 100 of a document. The electronic window 150 includes navigation buttons to navigation over the page or through the document. This electronic window 150 can be used to define the areas of the document to be analyzed by the present invention as well as allow the user to define what classes and sub-parameters which are to be measured and quantized by the present invention.

The particular methods for evaluating contribution from single-window display of the document-to-document convenience level provided herein are exemplary and are not to be considered as limiting in scope. Other methods for determining the contribution from a single window display should be considered within the scope of the present invention, for example, a function of measured human responses to documents that can or cannot be displayed in a single window or page with respect to the feeling convenience; such that the present invention is directed to not only in the particular method of determining the single window display contribution, but also in the much broader concept of using single-window display measures in the context of evaluating document convenience level and document quality.

In a preferred embodiment of the present invention, one of the more annoying and inconvenient occurrences when obtaining or processing a document is having to wait while the machine works on downloading or displaying it. The transmission time is a product of the size of the document file and the bandwidth of the communications channel. While processing time can also depend upon the types of objects that the document contains and on the type of processing being done, a rough estimate can be formed as the product of the file size and a processing speed factor. One can therefore use the file size as a rough indicator of these time costs. To convert file size S into a value between 0 and 1 one can use the expression: $V_{tm}=at/(at+S)$ where at is a constant that is about the typical document file size.

The particular methods for evaluating contribution from transmission time or processing time to document convenience level provided herein are exemplary and are not to be considered as limiting in scope. Other methods for determining the contribution from transmission time or processing time should be considered within the scope of the present invention; such that the present invention is directed to not only in the particular method of determining the transmission time or processing time contribution, but also in the much broader concept of using time measures in the context of evaluating document convenience level and document quality.

Economy

In a preferred embodiment of the present invention, one other dimension by which the quality of a document may be judged is by the costs that it incurs. Costs arise in several ways. For printed documents, there is the cost of the materials required (the paper and the ink). There is also a cost in the effort required to print the document (labor and press time). Material cost may not apply to documents viewed on electronic displays, but there is the cost to transmit and store the document. There is also the cost in the time the viewer spends waiting while the document is transmitted, or while it is being processed for display. Many of these costs depend upon the size of the document (such as described above for transmission and processing time). However, other properties can also have an effect. For example, the size of the fonts can affect the amount of paper needed for printing, and the presence of color can affect the cost of the ink.

The above described quality quantization process can be utilized in many systems. In a preferred embodiment, a system for dynamic document layout in accordance with embodiments of the present invention, a document layout processing system and printers, although the system can comprise other numbers and types of systems, devices, and components in other configurations. The present invention provides a system and method for dynamic document layout that is able to learn new intelligent mutators during operations and is able to determine the most appropriate sequence of mutators given a document's current characteristics.

In accordance with a preferred embodiment, the document layout processing system is coupled to the printers, although the document layout processing system could be coupled to other types and numbers of devices in other configurations. A variety of communication systems and/or methods can be used to operatively couple and communicate between the document layout processing system and the printers, including a direct connection, a local area network, a wide area network, the world wide web, modems and phone lines, or wireless communication technology each having communications protocols. In these embodiments, the printers are coupled to the document layout processing system by a hard-wire connection over a local area network, although other types of connections, devices, and networks, such as a wireless communication system, could be used The document layout processing system includes a processor, a memory storage device, a user input device, a display device, and an input/output interface device which are coupled together by a bus or other link, although other types of document layout processing systems comprising other numbers and types of components in other configurations can be used. The processor executes a program of stored instructions for one or more aspects of the present invention as described herein.

The memory storage device stores the programmed instructions for one or more aspects of the present invention as described herein for execution by the processor, although some or all of the programmed instructions could be stored and/or executed elsewhere, such as in printer(s). A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, could be used for memory storage device to store the programmed instructions described herein, as well as other information.

The user input device enables an operator to generate and transmit signals or commands to the processor, such as a request to print or display a document on printer(s). A variety of different types of user input devices could be used for user input device, such as a keyboard or computer mouse. The display device displays information for the operator of the document layout processing system, such as an image of the document layout or the status of the print job at a first printer. A variety of different types of display devices could be used for display device, such as a display monitor. The input/output interface system is used to operatively couple and communicate between the document layout processing system and the printers.

The first printer is coupled to the document layout processing system, although other types of devices can be coupled to the document layout processing system. The first printer prints documents received from the document processing system. The first printer has a particular set of characteristics when printing a document which affects the resulting printed image of the document, such as margins or a particular paper size on which the document is printed. Since the components of a printer, including its connections and operation, are well known, they will not be described in detail here.

A second printer is also coupled to the document layout processing system, although other types of devices can be coupled to the document processing system. The second printer also prints documents received from the document processing system. The second printer also has a particular set of characteristics when printing a document which effect the resulting printed image of the document which are different from the characteristics of the first printer, although both printers could have the same characteristics when printing a document. Like the first printer, the components of the second printer, including their connections and operation, are well known, they will not be described in detail here.

The document processing system selects a portion of an original document, although other portions or the entire original document could be selected for determining a layout. The portion of the document selected is the portion that needs re-layout or adjustment. The original document can be obtained in a variety of different manners, such as retrieved from the web, from an e-mail attachment, from another computer system, or from a document created by the operator.

Next, the document processing system compares one or more elements of the selected portion of the original document against the same types of elements in portions of a plurality of other stored documents obtained from memory storage device, although other types of comparisons of other numbers and types of elements and other portions could be used. A variety of different types of elements could be used by the document processing system in this comparison, such as font size, font type, number of lines of text, line spacing, number of alphanumeric characters, size of an outer perimeter of the arrangement of alphanumeric characters, and number of images. The document processing system can assign a score to each comparison, such as one score for a complete match, another score for a partial match, and no score when there is no match, although other manners for assigning a score can be used.

The document processing system identifies which stored document with the portion which is closest to the portion of the original document based on the comparison of the selected elements. In these embodiments, the document processing system generates a score based on the comparison of the elements of the selected portion of the original document against the same types of elements in portions of a plurality of other stored documents. The document processing system identifies the stored document with the portion which is closest to the selected portion of the original document based on the highest generated score, although the document processing system could use other ways to identify the stored document with the closest portion.

The document processing system obtains the one or more mutators used in the identified, stored document from memory storage device for possible use in the selected portion of the original document. A variety of different types of mutators could be obtained, such as mutators for adjusting a font of type, adjusting line spacing, adjusting at least one color, adjusting a location of at least one section in the portion of the original document, increasing font size to increase legibility, and making the line lengths shorter to increase legibility, etc. It is noted that other types of mutators alone or in different combinations could be obtained and used.

The document processing system identifies the device, such as printer(s), on which the original document is to be displayed. The document processing system identifies the device based on instructions received from an operator using user input device requesting a particular device to display the original document, although other ways of identifying the display device can be used, such as a programmed selection in the memory storage device of document processing system to use a particular printer for a print job.

As part of the identification process, the document processing system obtains information from memory storage device about the characteristics of the device, although other ways of obtaining information about the characteristics of the device can be used, such as an inquiry by the document processing system to the device, such as printer, for the information.

The document processing system determines which of the one or more mutators obtained from the identified, stored document to use on the selected portion of the original document. The document processing system determines which of the mutators to use based on the characteristics of the device on which the original document is going to be displayed and based on one or more elements of the original document, although other manners for determining which of the mutators to select can be used.

For example, if the first printer selected for the printing job is a black-and-white printer, a mutator for altering color obtained from the identified, stored document is irrelevant and would not used by the document processing system.

In another example, the document processing system could have lists of mutators stored in memory which are associated with particular types of documents, such as for text documents, documents with text and images, and documents with images, and then the document processing system would determine to use the obtained mutators that were on appropriate stored list for the type of document that matches the portion of the original document or the original document.

The document processing system also determines using one or more algorithms for document layout stored in memory storage device and one or more other style sheets stored in memory storage device one or more other mutators to apply to the selected portion of the original document, although other manners for determining which, if any, other the mutators to use can be implemented.

The following is a description of a preferred embodiment of the algorithms and methods used for determining mutators and other parameters for document layout, which are stored as programmed instructions for execution by document processing system.

In determining mutators and other parameters for document layout, the document is modeled as a constraint optimization problem which combines both required constraints with non-required design constraints that act as optimization criteria. One of a set of many existing constraint optimization algorithms is then used to solve the problem, resulting in an automatically generated document that is well designed because it has optimized some specified design criteria.

In particular, a document template is represented as a constraint optimization problem, and therefore contains a set of variables, a value domain for each variable, a set of required constraints, and a set of desired constraints (i.e. optimization functions).

The areas of the document to be filled with content are modeled as problem variables, as are any parameters of the document that can be changed.

As an example, a template specifies that there are two areas that should be filled with content: areaA and areaB. The template also specifies that the positions and sizes of areaA and areaB can be changed. Thus, the problem variables for this example are: areaA, areaB, areaA-topLeftX, areaA-topLeftY, areaB-topLeftX, areaB-topLeftY, areaA-width, areaA-height, areaB-width, and areaB-height.

The constraint optimization formulation further specifies that each problem variable has a value domain consisting of the possible values to assign to that variable. For variables that are document areas to be filled with content (e.g., areaA and areaB), the value domains are the content pieces that are applicable to each area. For variables that are document parameters, the value domains are discretized ranges for those parameters, so that each potential value for the parameter appears in the value domain e.g., 1 . . . MAXINT]. For variables whose value domains are content pieces, the default domain is set up to be all possible content pieces in the associated content database, which is specified in the document template.

The required constraints specify relationships between variables and/or values that must hold in order for the resulting document to be valid. The desired constraints specify relationships between variables and/or values that we would like to satisfy, but aren't required in order for the resulting document to be valid. Constraints may be unary (apply to one value/variable), binary (apply to two values/ variables), or n-ary (apply to n values/variables), and in our invention are entered by the user as part of the document template.

An example of a required unary constraint in the document domain is: areaA must contain an image of a castle. An example of a required binary constraint is: areaA-topLeftY+ areaA-height<areaB-topLeftY. If we had another variable (areaC), an example of a required 3-ary constraint is: areaA-width+areaB-width>areaC-width. In a variable data application of this invention (one of many possible applications), the constraints would also refer to customer attributes (e.g., areaA must contain an image that is appropriate for customer1.age).

Desired constraints are represented as objective functions to maximize or minimize. For example, a desired binary constraint might be the objective function: f=areaA-width*areaA-height, to be maximized. If more than one objective function is defined for the problem, the problem becomes a multi-criteria optimization problem. If it is a multi-criteria optimization problem, we sum the individual objective function scores to produce the overall optimization score for a particular solution. We can furthermore weight each of the desired constraints with a priority, so that the overall optimization score then becomes a weighted sum of the individual objective function scores.

Any one of the known existing constraint optimization algorithms is then applied to create the final output document. This invention further describes a means to use a genetic algorithm (one of the many possible constraint optimization algorithms) for doing the constraint optimization and thereby automatically creating a final output document that adheres not only to the required constraints, but also to a set of desired constraints.

In the genetic algorithm formulation of constraint optimization for document creation, the genome is built such that each gene in the genome is a variable of the constraint problem. The unary constraints are used to set up the allowable value domains for each gene. These can be some default range, or input by the user.

The fitness function is defined such that it returns a fitness of 0 for any population members that do not meet the required constraints, and for the members that do meet the required constraints, it returns a fitness score that is a sum of the scores of the individual desired constraints. For instance, if we have the required constraints:

C1: areaA-width<300
C2: areaB-width<300

And the desired constraints:

C3: areaA-width areaB-width, to be maximized (ranges from 0 to 1)
C4: areaA-height=areaB-height, to be maximized (ranges from 0 to 1)

Examples of fitness function for these desired constraints are f3=1−↑areaA-width−areaB-width|/(areaA-width+areaB-width)
f4=1−|areaA-height−areaB-height|/(areaA-width+areaB-height)

If we have a population member with areaA-width=350, areaA-height=350, areaB-width=400, areaB-height=200, the fitness function returns a score of 0. If, however, we have a population member with areaA-width=300, areaA-height=200, areaB-width=300, areaB-height=200, the fitness function returns a score of 2. If we have a population member with areaA-width=225, areaA-height=200, areaB-width=300, areaB-height=200, the fitness function returns a score of 1.875.

Our formulation also extends to allow weighting of the various desired constraints. Thus, the document creator can specify that certain desired constraints are more important than others. For instance, we could have constraint C3 weighted with an importance of 1.5, and C4 weighted with an importance of 0.5, meaning that the two objects having the same width is more important than the two objects having the same height. The fitness function's overall score is then computed as a weighted sum of the individual desired constraints.

For instance, if we have a population member with areaA-width=225, areaA-height=200, areaB-width=300, areaB-height=200, desired constraint C3 returns 0.875, which is multiplied by C3's weight of 1.5, to get 1.286. Desired constraint C4 returns 1, which is multiplied by C4's weight of 0.5, to get 0.5. The overall fitness score is then 1.125+0.5=1.786.

If, on the other hand, we have a population member with areaA-width=300, areaA-height=200, areaB-width=300, areaB-height=150, desired constraint C3 returns 1, which is multiplied by C3's weight of 1.5 to get 1.5. Desired constraint C4 returns 0.875, which is multiplied by C4's weight of 0.5, to get 0.438. The overall fitness score is then 1.5+0.438=1.938, thereby preferring the solution that violates C3 the least.

In the genetic algorithm implementation, an initial population of chromosomes is created by selecting values for each gene, and doing this for the desired number of population members. We evaluate each member of this population according to the fitness function, resulting in a score for each population member. We then select the most fit individuals (i.e., best fitness score) as parents for the new population, and create a new population from the parents using crossover/mutation operations. We iterate through populations until we reach a specified stopping condition (e.g., a certain number of iterations are complete, or until we have crossed a minimum threshold for the fitness function).

Thus, each genome is evaluated according to how well it satisfies or achieves the design qualities along with the other required constraints. This evaluation results in a generated document that not only satisfies the required constraints, but that is also optimized for the specified design qualities.

The document processing system determines an order or sequence for applying the one or more obtained mutators and the one or more determined mutators to the selected portion of the original document. In these particular embodiments, the document processing system determines the order based on the order the obtained mutators were used in the identified, stored document, although other manners for determining the order for applying the mutators could be used.

For example, the ordering may be a learned function based on noting the effectiveness of orderings on the document quality measure. In another example, the selected order for applying mutators could be based on a predetermined priority order for applying mutators which is stored in memory. The document processing system would determine where each of the obtained mutators occurred in the stored priority order and then would base the order of applying the mutators based on this determination.

The document processing system applies the selected one or more obtained mutators and the one or more determined mutators in the determined ordered order to the selected portion of the original document.

The document processing system stores the selected portion of the original document with the applied mutators as one of the stored documents in memory storage device. The newly stored portion of the original document can now be used to assist with determining the layout of other portions of the original document or of other documents to be displayed.

The document processing system determines if another portion of the original document should be selected for determining a dynamic document layout. If one or more additional portions in the original document are desired to be selected, for example if other portions of the original document have not already been selected, the process for determining a dynamic document layout begins again for the newly selected portion of the original document in the same manner as described above. If no more portions in the original document are desired to be selected, for example if the entire original document was selected for processing or all of the portions of the original document have already been selected, the process for determining a dynamic document layout ends.

In this preferred embodiment, although a case-based approach is provided to apply mutators to a document to obtain a desirable document layout, the concepts of the present invention can also continuously store the determined layouts for use in determining the layout of future documents. By combining case-based mutators with genetic algorithms for dynamic document layout, a more efficient and reliable automated scheme for dynamic document layout is realized.

Accordingly, while the present invention has been described with reference to various embodiments as described above, it is not confined to the details set forth above, but is intended to cover such modifications or changes as may come within the scope of the attached claims.

What is claimed is:

1. A method for quantifying a measure of quality of a document, comprising:
   (a) measuring a predetermined set of characteristics of the document;
   (b) quantizing the measured predetermined set of characteristics of the document; and
   (c) generating a quantized convenience value for the document based on a predetermined combining function, the predetermined combining function combining the quantized measured predetermined set of characteristics, the quantized convenience value being a measure of quality of the document.

2. The method as claimed in claim 1, wherein the predetermined combining function is a weighted average of the quantized measured predetermined set of characteristics.

3. The method as claimed in claim 1, wherein the predetermined combining function is a weighted sum of the quantized measured predetermined set of characteristics.

4. The method as claimed in claim 1, wherein the predetermined combining function is a weighted product of the quantized measured predetermined set of characteristics.

5. The method as claimed in claim 1, wherein the predetermined combining function is a non-linear operation performed upon the quantized measured predetermined set of characteristics.

6. The method as claimed in claim 1, wherein one of the quantized predetermined characteristics is consistency of the document.

7. The method as claimed in claim 1, wherein one of the quantized predetermined characteristics is legibility of objects in the document.

8. The method as claimed in claim 1, wherein one of the quantized predetermined characteristics is disability proof of the document.

9. The method as claimed in claim 1, wherein one of the quantized predetermined characteristics is ease of navigation of the document.

10. The method as claimed in claim 1, wherein one of the quantized predetermined characteristics is searchability of objects in the document.

11. The method as claimed in claim 1, wherein one of the quantized predetermined characteristics is locatability of objects in the document.

12. The method as claimed in claim 1, wherein one of the quantized predetermined characteristics is viewable fraction of the document.

13. The method as claimed in claim 1, wherein one of the quantized predetermined characteristics is color harmony of the document.

14. The method as claimed in claim 1, wherein one of the quantized predetermined characteristics is single window displayability of the document.

15. The method as claimed in claim 1, wherein one of the quantized predetermined characteristics is transmission/processing time of the document.

16. The method as claimed in claim 6, wherein the quantized consistency of the document is realized by:
   (i) measuring and quantizing consistency of scan in the document;
   (ii) measuring and quantizing consistency of order in the document;
   (iii) measuring and quantizing consistency of position of objects in the document;
   (iv) measuring and quantizing consistency of luminance in the document;
   (v) measuring and quantizing consistency of size of objects in the document; and
   (vi) measuring and quantizing consistency of style of objects in the document.

17. A method for quantifying a measure of quality of a document, comprising:
   (a) measuring a predetermined set of characteristics of the document;
   (b) quantizing the measured predetermined set of characteristics of the document;
   (c) generating a quantized aesthetics value for the document based on a predetermined aesthetics combining function, the predetermined aesthetics combining function combining a predetermined subset of the quantized measured predetermined set of characteristics;
   (d) generating a quantized convenience value for the document based on a predetermined convenience combining function, the predetermined convenience combining function combining a predetermined subset of the quantized measured predetermined set of characteristics; and
   (e) generating a quantized quality value for the document based on a predetermined quality combining function, the predetermined quality combining function combining the generated quantized aesthetics value and the generated quantized convenience value.

18. A method for quantifying a measure of quality of a document, comprising:
   (a) measuring a predetermined set of characteristics of the document;

(b) quantizing the measured predetermined set of characteristics of the document;
(c) generating a quantized convenience value for the document based on a predetermined convenience combining function, the predetermined convenience combining function combining a predetermined subset of the quantized measured predetermined set of characteristics;
(d) generating a quantized ease of use value for the document based on a predetermined ease of use combining function, the predetermined ease of use combining function combining a predetermined subset of the quantized measured predetermined set of characteristics; and
(e) generating a quantized quality value for the document based on a predetermined quality combining function, the predetermined quality combining function combining the generated quantized convenience value and the generated quantized ease of use value.

* * * * *